(12) United States Patent
Walton et al.

(10) Patent No.: US 9,726,009 B2
(45) Date of Patent: Aug. 8, 2017

(54) WELLBORE SERVICING TOOLS, SYSTEMS AND METHODS UTILIZING NEAR-FIELD COMMUNICATION

(71) Applicant: Halliburton Energy Services, Inc., Houston, TX (US)

(72) Inventors: Zachary William Walton, Coppell, TX (US); Matthew Todd Howell, Duncan, OK (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 374 days.

(21) Appl. No.: 13/914,177

(22) Filed: Jun. 10, 2013

(65) Prior Publication Data

US 2014/0262237 A1 Sep. 18, 2014

Related U.S. Application Data

(60) Provisional application No. 61/778,312, filed on Mar. 12, 2013.

(51) Int. Cl.
*E21B 47/13* (2012.01)
*E21B 34/06* (2006.01)
(Continued)

(52) U.S. Cl.
CPC .......... *E21B 47/122* (2013.01); *E21B 34/066* (2013.01); *E21B 43/116* (2013.01);
(Continued)

(58) Field of Classification Search
CPC .... E21B 2034/007; E21B 34/08; E21B 47/00; E21B 47/06; E21B 47/065; E21B 47/12; E21B 47/122; E21B 43/12
See application file for complete search history.

(56) References Cited

U.S. PATENT DOCUMENTS

| 2,076,308 A | 4/1937 | Wells |
| 2,189,936 A | 2/1940 | Brandfon |

(Continued)

FOREIGN PATENT DOCUMENTS

| WO | 9925070 A2 | 5/1999 |
| WO | 0220942 A1 | 3/2002 |

(Continued)

OTHER PUBLICATIONS

Advisory Action dated Jul. 1, 2014 (3 pages), U.S. Appl. No. 12/688,058, filed Jan. 15, 2010.
(Continued)

*Primary Examiner* — Robert E Fuller
(74) *Attorney, Agent, or Firm* — John W. Wustenberg; Baker Botts L.L.P.

(57) ABSTRACT

A wellbore servicing system comprising two or more sensing, tool nodes is disclosed herein. Each of the sensing, tool nodes are configured to selectively allow, disallow, or alter a route of fluid communication between an axial flowbore thereof and an exterior thereof via one or more ports. Each of the sensing, tool nodes is further configured to monitor at least one parameter. The system also includes a logging controller node wherein the logging controller node communicates with the sensing, tool nodes via a near field communication (NFC) signal.

19 Claims, 10 Drawing Sheets

(51) Int. Cl.
   E21B 47/12      (2012.01)
   E21B 43/116     (2006.01)
   E21B 43/14      (2006.01)
   E21B 43/119     (2006.01)
   E21B 43/12      (2006.01)
   H04B 5/00       (2006.01)

(52) U.S. Cl.
   CPC ............ *E21B 43/119* (2013.01); *E21B 43/12*
          (2013.01); *E21B 43/14* (2013.01); *E21B 47/12*
                  (2013.01); *H04B 5/0025* (2013.01)

(56) References Cited

U.S. PATENT DOCUMENTS

| | | |
|---|---|---|
| 2,189,937 A | 2/1940 | Broyles |
| 2,308,004 A | 1/1943 | Hart |
| 2,330,265 A | 9/1943 | Burt |
| 2,373,006 A | 4/1945 | Baker |
| 2,381,929 A | 8/1945 | Schlumberger |
| 2,618,340 A | 11/1952 | Lynd |
| 2,618,343 A | 11/1952 | Conrad |
| 2,637,402 A | 5/1953 | Baker et al. |
| 2,640,547 A | 6/1953 | Baker et al. |
| 2,695,064 A | 11/1954 | Ragan et al. |
| 2,715,444 A | 8/1955 | Fewel |
| 2,871,946 A | 2/1959 | Bigelow |
| 2,918,125 A | 12/1959 | Sweetman |
| 2,961,045 A | 11/1960 | Stogner et al. |
| 2,974,727 A | 3/1961 | Goodwin |
| 3,029,873 A | 4/1962 | Hanes |
| 3,055,430 A | 9/1962 | Campbell |
| 3,122,728 A | 2/1964 | Lindberg, Jr. |
| 3,160,209 A | 12/1964 | Bonner |
| 3,195,637 A | 7/1965 | Wayte |
| RE25,846 E | 8/1965 | Campbell |
| 3,217,804 A | 11/1965 | Peter |
| 3,233,674 A | 2/1966 | Leutwyler |
| 3,266,575 A | 8/1966 | Owen |
| 3,398,803 A | 8/1968 | Leutwyler et al. |
| 3,556,211 A | 1/1971 | Bohn et al. |
| 3,659,648 A | 5/1972 | Cobbs |
| 4,085,590 A | 4/1978 | Powell et al. |
| 4,282,931 A | 8/1981 | Golben |
| 4,352,397 A | 10/1982 | Christopher |
| 4,377,209 A | 3/1983 | Golben |
| 4,385,494 A | 5/1983 | Golben |
| 4,402,187 A | 9/1983 | Golben et al. |
| 4,598,769 A | 7/1986 | Robertson |
| 4,796,699 A | 1/1989 | Upchurch |
| 4,856,595 A | 8/1989 | Upchurch |
| 4,884,953 A | 12/1989 | Golben |
| 5,024,270 A | 6/1991 | Bostick |
| 5,040,602 A | 8/1991 | Helms |
| 5,058,674 A | 10/1991 | Schultz et al. |
| 5,074,940 A | 12/1991 | Ochi et al. |
| 5,089,069 A | 2/1992 | Ramaswamy et al. |
| 5,101,907 A | 4/1992 | Schultz et al. |
| 5,117,548 A | 6/1992 | Griffith et al. |
| 5,155,471 A | 10/1992 | Ellis et al. |
| 5,163,521 A | 11/1992 | Pustanyk et al. |
| 5,188,183 A | 2/1993 | Hopmann et al. |
| 5,197,758 A | 3/1993 | Lund et al. |
| 5,211,224 A | 5/1993 | Bouldin |
| 5,238,070 A | 8/1993 | Schultz et al. |
| 5,279,321 A | 1/1994 | Krimm |
| 5,316,081 A | 5/1994 | Baski et al. |
| 5,316,087 A | 5/1994 | Manke et al. |
| 5,355,960 A | 10/1994 | Schultz et al. |
| 5,396,951 A | 3/1995 | Ross |
| 5,452,763 A | 9/1995 | Owen |
| 5,476,018 A | 12/1995 | Nakanishi et al. |
| 5,485,884 A | 1/1996 | Hanley et al. |
| 5,490,564 A | 2/1996 | Schultz et al. |
| 5,531,845 A | 7/1996 | Flanigan et al. |
| 5,555,945 A | 9/1996 | Schultz |
| 5,558,153 A | 9/1996 | Holcombe et al. |
| 5,573,307 A | 11/1996 | Wilkinson et al. |
| 5,575,331 A | 11/1996 | Terrell |
| 5,622,211 A | 4/1997 | Martin et al. |
| 5,662,166 A | 9/1997 | Shammai |
| 5,673,556 A | 10/1997 | Goldben et al. |
| 5,687,791 A | 11/1997 | Beck et al. |
| 5,700,974 A | 12/1997 | Taylor |
| 5,725,699 A | 3/1998 | Hinshaw et al. |
| 6,021,093 A | 2/2000 | Birchak et al. |
| 6,128,904 A | 10/2000 | Rosso, Jr. et al. |
| 6,137,747 A | 10/2000 | Shah et al. |
| 6,172,614 B1 | 1/2001 | Robison et al. |
| 6,186,226 B1 | 2/2001 | Robertson |
| 6,196,584 B1 | 3/2001 | Shirk et al. |
| 6,315,043 B1 | 11/2001 | Farrant et al. |
| 6,333,699 B1 | 12/2001 | Zierolf |
| 6,364,037 B1 | 4/2002 | Brunnert et al. |
| 6,378,611 B1 | 4/2002 | Helderle |
| 6,382,234 B1 | 5/2002 | Birckhead et al. |
| 6,438,070 B1 | 8/2002 | Birchak et al. |
| 6,450,258 B2 | 9/2002 | Green et al. |
| 6,450,263 B1 | 9/2002 | Schwendemann |
| 6,470,996 B1 | 10/2002 | Kyle et al. |
| 6,536,524 B1 | 3/2003 | Snider |
| 6,561,479 B1 | 5/2003 | Eldridge |
| 6,568,470 B2 | 5/2003 | Goodson, Jr. et al. |
| 6,583,729 B1 | 6/2003 | Gardner et al. |
| 6,584,911 B2 | 7/2003 | Bergerson et al. |
| 6,598,679 B2 | 7/2003 | Robertson |
| 6,619,388 B2 | 9/2003 | Dietz et al. |
| 6,651,747 B2 | 11/2003 | Chen et al. |
| 6,668,937 B1 | 12/2003 | Murray |
| 6,672,382 B2 | 1/2004 | Schultz et al. |
| 6,695,061 B2 | 2/2004 | Fripp et al. |
| 6,705,425 B2 | 3/2004 | West |
| 6,717,283 B2 | 4/2004 | Skinner et al. |
| 6,776,255 B2 | 8/2004 | West et al. |
| 6,848,503 B2 | 2/2005 | Schultz et al. |
| 6,880,634 B2 | 4/2005 | Gardner et al. |
| 6,915,848 B2 | 7/2005 | Thomeer et al. |
| 6,925,937 B2 | 8/2005 | Robertson |
| 6,971,449 B1 | 12/2005 | Robertson |
| 6,973,993 B2 | 12/2005 | West et al. |
| 6,976,535 B2 * | 12/2005 | Aronstam et al. ........ 166/250.11 |
| 6,998,999 B2 | 2/2006 | Fripp et al. |
| 7,012,545 B2 | 3/2006 | Skinner et al. |
| 7,063,146 B2 | 6/2006 | Schultz et al. |
| 7,063,148 B2 | 6/2006 | Jabusch |
| 7,068,183 B2 | 6/2006 | Shah et al. |
| 7,082,078 B2 | 7/2006 | Fripp et al. |
| 7,083,009 B2 | 8/2006 | Paluch et al. |
| 7,104,276 B2 | 9/2006 | Einhaus |
| 7,152,657 B2 | 12/2006 | Bosma et al. |
| 7,152,679 B2 | 12/2006 | Simpson |
| 7,165,608 B2 | 1/2007 | Schultz et al. |
| 7,191,672 B2 | 3/2007 | Ringgenberg et al. |
| 7,195,067 B2 | 3/2007 | Manke et al. |
| 7,197,923 B1 | 4/2007 | Wright et al. |
| 7,199,480 B2 | 4/2007 | Fripp et al. |
| 7,201,230 B2 | 4/2007 | Schultz et al. |
| 7,210,555 B2 | 5/2007 | Shah et al |
| 7,234,519 B2 | 6/2007 | Fripp et al. |
| 7,237,616 B2 | 7/2007 | Patel |
| 7,246,659 B2 | 7/2007 | Fripp et al. |
| 7,246,660 B2 | 7/2007 | Fripp et al. |
| 7,252,152 B2 | 8/2007 | LoGiudice et al. |
| 7,258,169 B2 | 8/2007 | Fripp et al. |
| 7,301,472 B2 | 11/2007 | Kyle et al. |
| 7,301,473 B2 | 11/2007 | Shah et al. |
| 7,322,416 B2 | 1/2008 | Burris, II et al. |
| 7,325,605 B2 | 2/2008 | Fripp et al. |
| 7,337,852 B2 | 3/2008 | Manke et al. |
| 7,339,494 B2 | 3/2008 | Shah et al. |
| 7,363,967 B2 | 4/2008 | Burris, II et al. |
| 7,367,394 B2 | 5/2008 | Villareal et al. |
| 7,372,263 B2 | 5/2008 | Edwards |
| 7,373,944 B2 | 5/2008 | Smith et al. |
| 7,387,165 B2 | 6/2008 | Lopez de Cardenas et al. |

(56) References Cited

U.S. PATENT DOCUMENTS

| | | |
|---|---|---|
| 7,395,882 B2 | 7/2008 | Oldham et al. |
| 7,398,996 B2 | 7/2008 | Saito et al. |
| 7,404,416 B2 | 7/2008 | Schultz et al. |
| 7,428,922 B2 | 9/2008 | Fripp et al. |
| 7,431,335 B2 | 10/2008 | Khandhadia et al. |
| 7,472,589 B2 | 1/2009 | Irani et al. |
| 7,472,752 B2 | 1/2009 | Rogers et al. |
| 7,508,734 B2 | 3/2009 | Fink et al. |
| 7,510,017 B2 | 3/2009 | Howell et al. |
| 7,557,492 B2 | 7/2009 | Fripp et al. |
| 7,559,363 B2 | 7/2009 | Howell et al. |
| 7,559,373 B2 | 7/2009 | Jackson et al. |
| 7,595,737 B2 | 9/2009 | Fink et al. |
| 7,596,995 B2 | 10/2009 | Irani et al. |
| 7,604,062 B2 | 10/2009 | Murray |
| 7,610,964 B2 | 11/2009 | Cox |
| 7,617,871 B2 | 11/2009 | Surjaatmadja et al. |
| 7,624,792 B2 | 12/2009 | Wright et al. |
| 7,640,965 B2 | 1/2010 | Bosma et al. |
| 7,665,355 B2 | 2/2010 | Zhang et al. |
| 7,669,661 B2 | 3/2010 | Johnson |
| 7,673,506 B2 | 3/2010 | Irani et al. |
| 7,673,673 B2 | 3/2010 | Surjaatmadja et al. |
| 7,699,101 B2 | 4/2010 | Fripp et al. |
| 7,699,102 B2 | 4/2010 | Storm et al. |
| 7,712,527 B2 | 5/2010 | Roddy |
| 7,717,167 B2 | 5/2010 | Storm et al. |
| 7,730,954 B2 | 6/2010 | Schultz et al. |
| 7,777,645 B2 | 8/2010 | Shah et al. |
| 7,781,939 B2 | 8/2010 | Fripp et al. |
| 7,802,627 B2 | 9/2010 | Hofman et al. |
| 7,804,172 B2 | 9/2010 | Schultz et al. |
| 7,832,474 B2 | 11/2010 | Nguy |
| 7,836,952 B2 | 11/2010 | Fripp |
| 7,856,872 B2 | 12/2010 | Irani et al. |
| 7,878,255 B2 | 2/2011 | Howell et al. |
| 7,946,166 B2 | 5/2011 | Irani et al. |
| 7,946,340 B2 | 5/2011 | Surjaatmadja et al. |
| 7,958,715 B2 | 6/2011 | Kinert et al. |
| 7,963,331 B2 | 6/2011 | Surjaatmadja et al. |
| 7,987,914 B2 | 8/2011 | Benton |
| 8,040,249 B2 | 10/2011 | Shah et al. |
| 8,091,637 B2 | 1/2012 | Fripp |
| 8,118,098 B2 | 2/2012 | Hromas et al. |
| 8,140,010 B2 | 3/2012 | Symons et al. |
| 8,146,673 B2 | 4/2012 | Howell et al. |
| 8,162,050 B2 | 4/2012 | Roddy et al. |
| 8,191,627 B2 | 6/2012 | Hamid et al. |
| 8,196,515 B2 | 6/2012 | Streibich et al. |
| 8,196,653 B2 | 6/2012 | Fripp et al. |
| 8,215,404 B2 | 7/2012 | Makowiecki et al. |
| 8,220,545 B2 | 7/2012 | Storm, Jr. et al. |
| 8,225,014 B2 | 7/2012 | Kuhl |
| 8,235,103 B2 | 8/2012 | Wright et al. |
| 8,235,128 B2 | 8/2012 | Dykstra et al. |
| 8,240,384 B2 | 8/2012 | Miller et al. |
| 8,261,839 B2 | 9/2012 | Fripp et al. |
| 8,276,669 B2 | 10/2012 | Dykstra et al. |
| 8,276,675 B2 | 10/2012 | Williamson et al. |
| 8,284,075 B2 | 10/2012 | Fincher et al. |
| 8,297,367 B2 | 10/2012 | Chen et al. |
| 8,302,681 B2 | 11/2012 | Fripp et al. |
| 8,319,657 B2 | 11/2012 | Godager |
| 8,322,426 B2 | 12/2012 | Wright et al. |
| 8,327,885 B2 | 12/2012 | Dykstra et al. |
| 8,356,668 B2 | 1/2013 | Dykstra et al. |
| 8,376,047 B2 | 2/2013 | Dykstra et al. |
| 8,387,662 B2 | 3/2013 | Dykstra et al. |
| 8,397,803 B2 | 3/2013 | Crabb et al. |
| 8,403,068 B2 | 3/2013 | Robison et al. |
| 8,432,167 B2 | 4/2013 | Reiderman |
| 8,459,377 B2 | 6/2013 | Moyes |
| 8,472,282 B2 | 6/2013 | Fink et al. |
| 8,474,533 B2 | 7/2013 | Miller et al. |
| 8,479,831 B2 | 7/2013 | Dykstra et al. |
| 8,505,639 B2 | 8/2013 | Robison et al. |
| 8,517,113 B2 | 8/2013 | Sheffield |
| 8,544,564 B2 | 10/2013 | Moore et al. |
| 8,555,975 B2 | 10/2013 | Dykstra et al. |
| 8,584,762 B2 | 11/2013 | Fripp et al. |
| 8,602,100 B2 | 12/2013 | Dykstra et al. |
| 8,607,863 B2 | 12/2013 | Fripp et al. |
| 8,616,276 B2 | 12/2013 | Tips et al. |
| 8,616,290 B2 | 12/2013 | Dykstra et al. |
| 8,622,136 B2 | 1/2014 | Dykstra et al. |
| 8,636,062 B2 | 1/2014 | Fripp et al. |
| 2001/0043146 A1 | 11/2001 | Beck et al. |
| 2001/0054969 A1 | 12/2001 | Thomeer et al. |
| 2002/0018399 A1 | 2/2002 | Schultz et al. |
| 2002/0050930 A1 | 5/2002 | Thomeer et al. |
| 2003/0151523 A1 | 8/2003 | Skinner et al. |
| 2004/0156264 A1 | 8/2004 | Gardner et al. |
| 2004/0227509 A1 | 11/2004 | Ucan |
| 2005/0039915 A1 | 2/2005 | Murray |
| 2005/0178282 A1 | 8/2005 | Brooks et al. |
| 2005/0241835 A1 | 11/2005 | Burris, II et al. |
| 2005/0260468 A1 | 11/2005 | Fripp et al. |
| 2005/0269083 A1 | 12/2005 | Burris, II et al. |
| 2006/0118303 A1 | 6/2006 | Schultz et al. |
| 2006/0144590 A1 | 7/2006 | Lopez de Cardenas et al. |
| 2006/0146646 A1 | 7/2006 | Fanini et al. |
| 2007/0189452 A1 | 8/2007 | Johnson et al. |
| 2008/0024319 A1 | 1/2008 | Close |
| 2008/0110643 A1 | 5/2008 | Richard et al. |
| 2008/0135248 A1 | 6/2008 | Talley et al. |
| 2008/0137481 A1 | 6/2008 | Shah et al. |
| 2008/0202766 A1 | 8/2008 | Howell et al. |
| 2008/0211687 A1 | 9/2008 | Price et al. |
| 2009/0120637 A1 | 5/2009 | Kirkwood |
| 2009/0146835 A1 | 6/2009 | Xu et al. |
| 2009/0192731 A1 | 7/2009 | De Jesus et al. |
| 2009/0223670 A1* | 9/2009 | Snider .................. 166/308.1 |
| 2009/0272544 A1* | 11/2009 | Giroux et al. ................ 166/382 |
| 2009/0308588 A1 | 12/2009 | Howell et al. |
| 2010/0065125 A1 | 3/2010 | Telfer |
| 2010/0084060 A1 | 4/2010 | Hinshaw et al. |
| 2010/0201352 A1 | 8/2010 | Englert |
| 2010/0231411 A1 | 9/2010 | Tubel |
| 2010/0314106 A1 | 12/2010 | Tubel |
| 2011/0042092 A1 | 2/2011 | Fripp et al. |
| 2011/0168390 A1 | 7/2011 | Fripp et al. |
| 2011/0169656 A1 | 7/2011 | Khan et al. |
| 2011/0174484 A1 | 7/2011 | Wright et al. |
| 2011/0174504 A1 | 7/2011 | Wright et al. |
| 2011/0187556 A1 | 8/2011 | Roddy |
| 2011/0199228 A1 | 8/2011 | Roddy |
| 2011/0199859 A1 | 8/2011 | Fink et al. |
| 2011/0214853 A1 | 9/2011 | Robichaux et al. |
| 2011/0232917 A1 | 9/2011 | Skinner et al. |
| 2011/0253383 A1 | 10/2011 | Porter et al. |
| 2011/0266001 A1 | 11/2011 | Dykstra et al. |
| 2011/0284240 A1 | 11/2011 | Chen et al. |
| 2011/0297393 A1 | 12/2011 | Patel |
| 2011/0308806 A9 | 12/2011 | Dykstra et al. |
| 2012/0018167 A1 | 1/2012 | Konopczynski et al. |
| 2012/0048531 A1 | 3/2012 | Marzouk et al. |
| 2012/0067594 A1 | 3/2012 | Noske et al. |
| 2012/0075113 A1 | 3/2012 | Loi et al. |
| 2012/0111577 A1 | 5/2012 | Dykstra et al. |
| 2012/0126993 A1 | 5/2012 | Samson |
| 2012/0146805 A1 | 6/2012 | Vick, Jr. et al. |
| 2012/0179428 A1 | 7/2012 | Dykstra et al. |
| 2012/0186819 A1 | 7/2012 | Dagenais et al. |
| 2012/0200421 A1 | 8/2012 | Duraj |
| 2012/0205120 A1 | 8/2012 | Howell |
| 2012/0205121 A1 | 8/2012 | Porter et al. |
| 2012/0211243 A1 | 8/2012 | Dykstra et al. |
| 2012/0234557 A1 | 9/2012 | Dykstra et al. |
| 2012/0241143 A1 | 9/2012 | Wright et al. |
| 2012/0255739 A1 | 10/2012 | Fripp et al. |
| 2012/0255740 A1 | 10/2012 | Fripp et al. |
| 2012/0273192 A1 | 11/2012 | Schmidt |
| 2012/0279593 A1 | 11/2012 | Fripp et al. |
| 2012/0313790 A1 | 12/2012 | Heijnen et al. |

(56) References Cited

U.S. PATENT DOCUMENTS

| | | |
|---|---|---|
| 2012/0318511 A1 | 12/2012 | Dykstra et al. |
| 2012/0318526 A1 | 12/2012 | Dykstra et al. |
| 2013/0000922 A1 | 1/2013 | Skinner et al. |
| 2013/0014940 A1 | 1/2013 | Fripp et al. |
| 2013/0014941 A1 | 1/2013 | Tips et al. |
| 2013/0014955 A1 | 1/2013 | Fripp et al. |
| 2013/0020090 A1 | 1/2013 | Fripp et al. |
| 2013/0027216 A1 | 1/2013 | Jantz et al. |
| 2013/0048290 A1 | 2/2013 | Howell et al. |
| 2013/0048291 A1 | 2/2013 | Merron et al. |
| 2013/0048298 A1 | 2/2013 | Merron et al. |
| 2013/0048301 A1 | 2/2013 | Gano et al. |
| 2013/0075107 A1 | 3/2013 | Dykstra et al. |
| 2013/0092382 A1 | 4/2013 | Dykstra et al. |
| 2013/0092393 A1 | 4/2013 | Dykstra et al. |
| 2013/0098614 A1 | 4/2013 | Dagenais et al. |
| 2013/0106366 A1 | 5/2013 | Fripp et al. |
| 2013/0112423 A1 | 5/2013 | Dykstra et al. |
| 2013/0112424 A1 | 5/2013 | Dykstra et al. |
| 2013/0112425 A1 | 5/2013 | Dykstra et al. |
| 2013/0122296 A1 | 5/2013 | Rose et al. |
| 2013/0140038 A1 | 6/2013 | Fripp et al. |
| 2013/0153238 A1 | 6/2013 | Fripp et al. |
| 2013/0180727 A1 | 7/2013 | Dykstra et al. |
| 2013/0180732 A1 | 7/2013 | Acosta et al. |
| 2013/0186634 A1 | 7/2013 | Fripp et al. |
| 2013/0192823 A1 | 8/2013 | Barrilleaux et al. |
| 2013/0192829 A1 | 8/2013 | Fadul et al. |
| 2013/0264053 A1 | 10/2013 | Miller et al. |

FOREIGN PATENT DOCUMENTS

| | | |
|---|---|---|
| WO | 2004018833 A1 | 3/2004 |
| WO | 2004099564 A2 | 11/2004 |
| WO | 2009109788 A1 | 9/2009 |
| WO | 2010002270 A2 | 1/2010 |
| WO | 2010111076 A2 | 9/2010 |
| WO | 2011021053 A2 | 2/2011 |
| WO | 2011087721 A1 | 7/2011 |
| WO | 2011097063 A2 | 8/2011 |
| WO | 2011146866 A2 | 11/2011 |
| WO | 2011149597 A1 | 12/2011 |
| WO | 2012045165 A1 | 4/2012 |
| WO | 2012078204 A1 | 6/2012 |
| WO | 2012082248 A1 | 6/2012 |
| WO | 2012100259 A2 | 7/2012 |
| WO | 2013032687 A2 | 3/2013 |
| WO | 2013032687 A3 | 3/2013 |
| WO | 2014092836 A1 | 6/2014 |

OTHER PUBLICATIONS

Foreign communication from a related counterpart application—Australian Office Action, AU Application No. 2010341610, Feb. 27, 2014, 5 pages.

Notice of Allowance dated Jul. 15, 2014 (28 pages), U.S. Appl. No. 12/688,058, filed Jan. 15, 2010.

Office Action (Final) dated Mar. 10, 2014 (13 pages), U.S. Appl. No. 12/688,058, filed Jan. 15, 2010.

Office Action (Final) dated May 9, 2014 (16 pages), U.S. Appl. No. 12/965,859, filed Dec. 11, 2010.

Office Action (Final) dated Jul. 22, 2014 (21 pages), U.S. Appl. No. 13/905,859, filed May 30, 2013.

Danaher product information, Motion Brakes, http://www.danahermotion.com/website/usa/eng/products/clutches_and_brakes/115836.php, Mar. 4, 2009, 3 pages, Danaher Motion.

Filing receipt and specification for provisional patent application entitled "Wellbore Servicing Tools, Systems and Methods Utilizing Near-Field Communication," by Zachary William Walton, et al., filed Mar. 12, 2013 as U.S. Appl. No. 61/778,312.

Filing receipt and specification for patent application entitled "Remotely Activated Down Hole Systems and Methods," by Frank V. Acosta, et al., filed Mar. 7, 2012 as U.S. Appl. No. 13/414,016.

Filing receipt and specification for patent application entitled "External Casing Packer and Method of Performing Cementing Job," by Lonnie Helms, et al., filed Mar. 7, 2012 as U.S. Appl. No. 13/414,140.

Filing receipt and specification for patent application entitled "Method of Completing a Multi-Zone Fracture Stimulation Treatment of a Wellbore," by Steven G. Streich, et al., filed Sep. 21, 2012 as U.S. Appl. No. 13/624,173.

Filing receipt and specification for patent application entitled "Pressure Relief-Assisted Packer," by Lonnie Carl Helms, et al., filed Oct. 25, 2012 as U.S. Appl. No. 13/660,678.

Filing receipt and specification for patent application entitled "Wellbore Servicing Tools, Systems and Methods Utilizing Downhole Wireless Switches," by Michael Linley Fripp, et al., filed May 31, 2013 as U.S. Appl. No. 13/907,593.

Filing receipt and specification for patent application entitled "Wellbore Servicing Tools, Systems and Methods Utilizing Near-Field Communication," by Zachary William Walton, et al., filed Jun. 10, 2013 as U.S. Appl. No. 13/914,004.

Filing receipt and specification for patent application entitled "Wellbore Servicing Tools, Systems and Methods Utilizing Near-Field Communication," by Zachary William Walton, et al., filed Jun. 10, 2013 as U.S. Appl. No. 13/914,114.

Filing receipt and specification for patent application entitled "Wellbore Servicing Tools, Systems and Methods Utilizing Near-Field Communication," by Zachary William Walton, et al., filed Jun. 10, 2013 as U.S. Appl. No. 13/913,881.

Filing receipt and specification for patent application entitled "Wellbore Servicing Tools, Systems and Methods Utilizing Near-Field Communication," by Zachary William Walton, et al., filed Jun. 10, 2013 as U.S. Appl. No. 13/914,216.

Filing receipt and specification for patent application entitled "Wellbore Servicing Tools, Systems and Methods Utilizing Near-Field Communication," by Zachary William Walton, et al., filed Jun. 10, 2013 as U.S. Appl. No. 13/914,238.

Filing receipt and specification for International application entitled "Pressure Equalization for Dual Seat Ball Valve," filed Feb. 25, 2013 as International application No. PCT/US2013/027666.

Filing receipt and specification for International application entitled "Autofill and Circulation Assembly and Method of Using the Same," filed Feb. 25, 2013 as International application No. PCT/US2013/027674.

Foreign communication from a related counterpart application—International Search Report and Written Opinion, PCT/US2010/061047, Jun. 23, 2011, 7 pages.

Foreign communication from a related counterpart application—International Search Report and Written Opinion, PCT/US2011/036686, Nov. 30, 2011, 8 pages.

Foreign communication from a related counterpart application—International Preliminary Report on Patentability, PCT/US2011/036686, Jun. 12, 2013, 5 pages.

Foreign communication from a related counterpart application—International Search Report and Written Opinion, PCT/US2012/050762, Mar. 11, 2013, 12 pages.

Halliburton brochure entitled "Armada™ Sampling System," Sep. 2007, 2 pages.

Halliburton Drawing 672.03800, May 4, 1994, p. 1 of 2.

Halliburton Drawing 672.03800, May 4, 1994, p. 2 of 2.

Halliburton Drawing 626.02100, Apr. 20, 1999, 2 pages.

Magneta Electromagnetic Clutches and Brakes catalog, Jan. 2004, 28 pages, Magneta GmbH & Co KG.

Office Action dated Dec. 24, 2012 (26 pages), U.S. Appl. No. 12/688,058, filed Jan. 15, 2010.

Office Action dated Dec. 23, 2011 (34 pages), U.S. Appl. No. 12/688,058, filed Jan. 15, 2010.

Office Action dated Dec. 22, 2011 (30 pages), U.S. Appl. No. 12/965,859, filed Dec. 11, 2010.

Ogura product information, "Electromagnetic Clutch/Brake," http://www.ogura-clutch.com/products.html?category=2&by=type&no=1, Mar. 4, 2009, 4 pages, Ogura Industrial Corp.

Paus, Annika, "Near Field Communication in Cell Phones," Jul. 24, 2007, pp. 1-22 plus 1 cover and 1 content pages.

(56) References Cited

OTHER PUBLICATIONS

Sanni, Modiu L., et al., "Reservoir Nanorobots," Saudi Aramco Journal of Technology, Spring 2008, pp. 44-52.
Ward, Matt, et al., "RFID: Frequency, standards, adoption and innovation," JISC Technology and Standards Watch, May 2006, pp. 1-36.
Filing receipt and specification for patent application entitled "Dual Magnetic Sensor Actuation Assembly," by Zachary W. Walton, et al., filed Mar. 14, 2013 as U.S. Appl. No. 13/828,824.
Filing receipt and specification for patent application entitled "Method and Apparatus for Magnetic Pulse Signature Actuation," by Zachary W. Walton, et al., filed Feb. 28, 2013 as U.S. Appl. No. 13/781,093.
Office Action dated Dec. 3, 2013 (46 pages), U.S. Appl. No. 13/905,859, filed May 30, 2013.
Office Action dated Sep. 19, 2013 (17 pages), U.S. Appl. No. 12/688,058, filed Jan. 15, 2010.
Office Action dated Sep. 19, 2013 (30 pages), U.S. Appl. No. 12/965,859, filed Dec. 11, 2010.
Foreign communication from a related counterpart application—International Preliminary Report on Patentability, PCT/US2010/061047, Jul. 17, 2012, 5 pages.
Foreign communication from a related counterpart application—International Search Report and Written Opinion, PCT/US2013/061386, Apr. 10, 2014, 12 pages.
International Search Report and Written Opinion issued in related PCT Application No. PCT/US2014/017315, mailed Nov. 10, 2014 (9 pages).
International Preliminary Report on Patentability issued in related PCT Application No. PCT/US2014/017315 mailed Sep. 24, 2015 (7 pages).
International Search Report and Written Opinion issued in related PCT Application No. PCT/US2014/017308, mailed Nov. 4, 2014 (8 pages).
International Preliminary Report on Patentability issued in related PCT Application No. PCT/US2014/017308, mailed Sep. 24, 2015 (7 pages).
International Search Report and Written Opinion issued in related PCT Application No. PCT/US2014/017313, mailed Nov. 4, 2014 (8 pages).
International Preliminary Report on Patentability issued in related PCT Application No. PCT/US2014/017313, mailed Sep. 24, 2015 (7 pages).
International Search Report and Written Opinion issued in related PCT Application No. PCT/US2014/017316, mailed Nov. 13, 2014 (8 pages).
International Preliminary Report on Patentability issued in related PCT Application No. PCT/US2014/017316 mailed Sep. 24, 2015 (7 pages).
International Preliminary Report on Patentability issued in related PCT Application No. PCT/US2014/017317 mailed Sep. 24, 2015 (7 pages).
International Search Report and Written Opinion issued in related PCT Application No. PCT/US2014/017317, mailed Nov. 17, 2014 (9 pages).
International Search Report and Written Opinion issued in related PCT Application No. PCT/US2014/017312, mailed Nov. 17, 2014 (11 pages).
International Preliminary Report on Patentability issued in related PCT Application No. PCT/US2014/017312 mailed Sep. 24, 2015 (8 pages).

* cited by examiner

WELLBORE SERVICING TOOLS, SYSTEMS AND METHODS UTILIZING NEAR-FIELD COMMUNICATION

CROSS-REFERENCE TO RELATED APPLICATIONS

The present application claims benefit of U.S. Provisional Patent Application No. 61/778,312 filed Mar. 12, 2013 by Zachary W. Walton, et al. and entitled "Wellbore Servicing Tools, Systems and Methods Utilizing Near-Field Communication," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbon-producing wells often are stimulated by hydraulic fracturing operations, wherein a servicing fluid such as a fracturing fluid or a perforating fluid may be introduced into a portion of a subterranean formation penetrated by a wellbore at a hydraulic pressure sufficient to create or enhance at least one fracture therein. Such a subterranean formation stimulation treatment may increase hydrocarbon production from the well.

In the performance of such a stimulation treatment and/or in the performance of one or more other wellbore operations (e.g., a drilling operation, a stimulation operation, a completion operation, a fluid-loss control operation, a cementing operation, production, or combinations thereof), it may be necessary to selectively manipulate one or more downhole tools which will be utilized in such operations.

Moreover, during one or more of such wellbore operations, it may be desirable to obtain data from within the wellbore, for example, data related to the conditions within the wellbore, data related to the operation and/or performance of the tools positioned within the wellbore, or combinations thereof.

However, downhole tools conventionally employed in such wellbore operations and/or the members utilized to communicate with such downhole tools are limited in their manner of usage, are often unreliable, and may be overly time-consuming to use.

As such, there exists a need for improved tools for use in wellbore operations and for methods and system of using such tools.

SUMMARY

Disclosed herein is a wellbore servicing system comprising two or more sensing, tool nodes, wherein each of the sensing, tool nodes are configured to selectively allow, disallow, or alter a route of fluid communication between an axial flowbore thereof and an exterior thereof via one or more ports, and wherein each of the sensing, tool nodes are further configured to monitor at least one parameter, and a logging controller node wherein the logging controller node communicates with the sensing, tool nodes via a near field communication (NFC) signal.

Also disclosed herein is a wellbore servicing method comprising positioning two or more sensing, tool nodes within a wellbore, and wherein each of the sensing, tool nodes are configured to selectively allow, disallow, or alter a route of fluid communication between an axial flowbore thereof and an exterior thereof via one or more ports, and wherein each of the sensing, tool nodes are further configured to monitor at least one wellbore parameter, moving a logging controller node through the wellbore such that the logging controller node comes into communication with the sensing, tool nodes, wherein the controller node communicates with the sensing, tool nodes via a near field communication (NFC) signal, wherein data associated with the at least one wellbore parameter is transferred from the sensing, tool node to the logging controller node via an NFC signal, and wherein one or more commands are transferred from the logging controller node to the sensing, tool node via an NFC signal.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Figure 1:
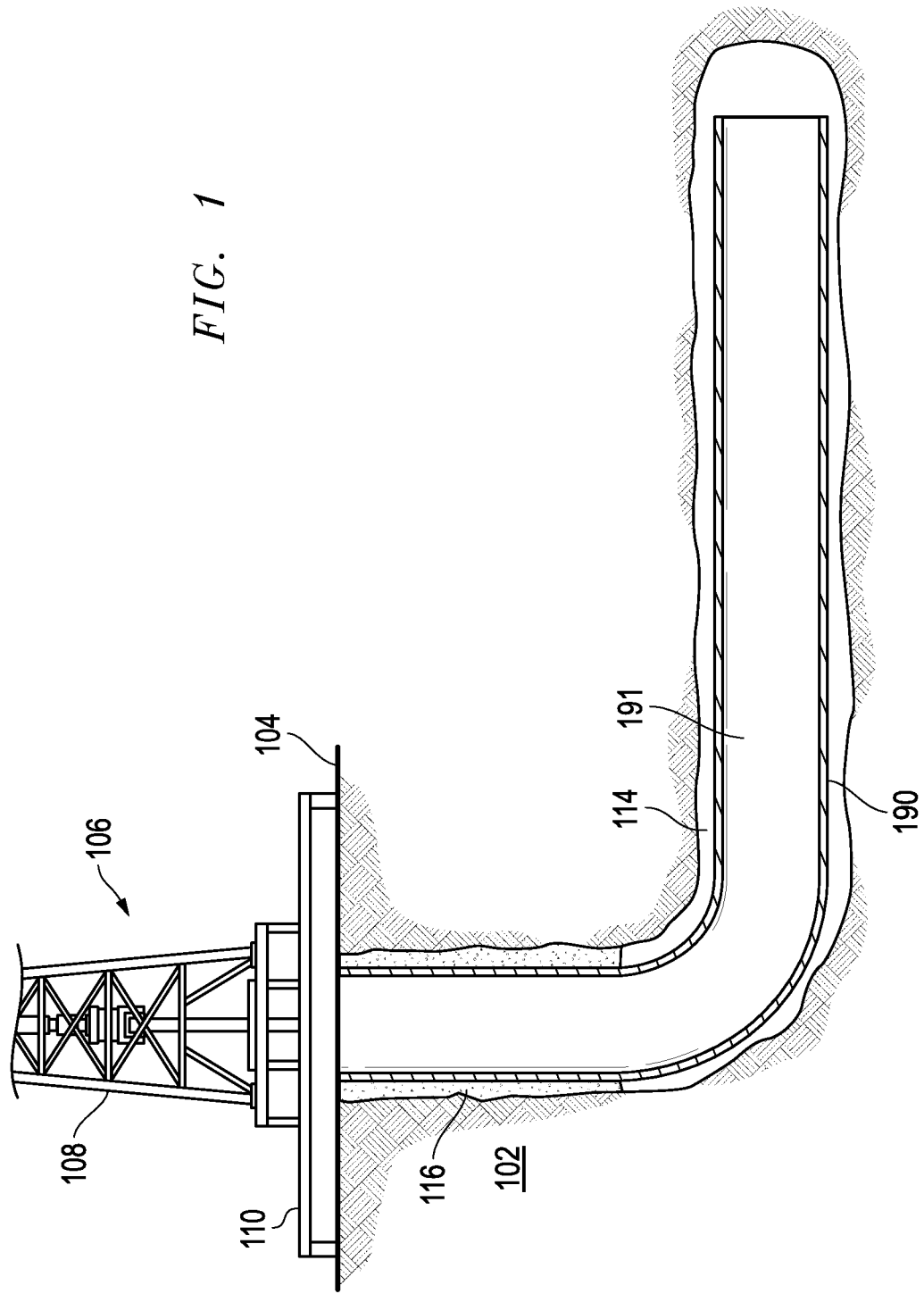
FIG. 1 is a representative partially cross-sectional view of a well system which may embody principles of this disclosure.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

Disclosed herein are one or more embodiments of wellbore servicing systems and wellbore servicing methods utilizing a suitable communication protocol, for example, near-field communication (NFC), as will be disclosed herein, to communicate one or more electromagnetic signals between two or more nodes within a wellbore environment. As used herein, a "node" refers to a device or other member configured to send and/or receive an electromagnetic signal in accordance with a given communication protocol. Also disclosed herein are one or more embodiments of well tools (for example, which may comprise nodes, as will be disclosed herein) that may be utilized in such wellbore servicing systems and/or wellbore servicing methods utilizing NFC.

Referring to FIG. 1, an embodiment of an operating environment in which such a wellbore servicing system and/or wellbore servicing method may be employed is illustrated. It is noted that although some of the figures may exemplify horizontal or vertical wellbores, the principles of the methods, apparatuses, and systems disclosed herein may be similarly applicable to horizontal wellbore configurations, conventional vertical wellbore configurations, and combinations thereof. Therefore, the horizontal or vertical nature of any figure is not to be construed as limiting the wellbore to any particular configuration.

Referring to FIG. 1, the operating environment generally comprises a drilling or servicing rig 106 that is positioned on the earth's surface 104 and extends over and around a wellbore 114 that penetrates a subterranean formation 102, for example, for the purpose of recovering hydrocarbons from the subterranean formation 102, disposing of carbon dioxide within the subterranean formation 102, injecting one or more fluids (such as carbon dioxide, water, and/or steam), or combinations thereof. The wellbore 114 may be drilled into the subterranean formation 102 by any suitable drilling technique. In an embodiment, the drilling or servicing rig 106 comprises a derrick 108 with a rig floor 110 through which a completion string 190 (e.g., a casing string or liner) generally defining an axial flowbore 191 may be positioned within the wellbore 114. The drilling or servicing rig 106 may be conventional and may comprise a motor driven winch and other associated equipment for lowering a tubular, such as the completion string 190 into the wellbore 114, for example, so as to position the completion equipment at the desired depth.

While the operating environment depicted in FIG. 1 refers to a stationary drilling or servicing rig 106 and a land-based wellbore 114, one of ordinary skill in the art will readily appreciate that mobile workover rigs, wellbore completion units (e.g., coiled tubing units) may be similarly employed. One of ordinary skill in the art will also readily appreciate that the systems, methods, tools, and/or devices disclosed herein may be employed within other operational environments, such as within an offshore wellbore operational environment.

In an embodiment the wellbore 114 may extend substantially vertically away from the earth's surface 104 over a vertical wellbore portion, or may deviate at any angle from the earth's surface 104 over a deviated or horizontal wellbore portion. In alternative operating environments, portions or substantially all of the wellbore 114 may be vertical, deviated, horizontal, and/or curved.

In an embodiment, at least a portion of the completion string 190 may be secured into position against the formation 102 in a conventional manner using cement 116. Additionally or alternatively, at least a portion of the completion string may be secured into position with a packer, for example a mechanical or swellable packer (such as Swell-Packers™, commercially available from Halliburton Energy Services). In additional or alternative embodiments, the wellbore 114 may be partially completed (e.g., partially cased and cemented) thereby resulting in a portion of the wellbore 114 being uncompleted (e.g., uncased and/or uncemented) or the wellbore may be completed.

In an embodiment, as will be disclosed herein, one or more well tools may be incorporated within the completion string 190. For example, in such an embodiment, one or more selectively actuatable wellbore stimulation tools (e.g., fracturing tools), selectively actuatable wellbore isolation tools, or the like may be incorporated within the completion string 190.

It is noted that although the environment illustrated with respect to FIG. 1 illustrates a completion string 190 disposed within the wellbore 114, in one or more embodiments, any other suitable wellbore tubular such as a casing string, a work string, a liner, a drilling string, a coiled tubing string, a jointed tubing string, the like, or combinations thereof, may additionally or alternatively be disposed within the wellbore 114.

In an embodiment, one or more nodes, each having a suitable configuration, as will be disclosed herein, may be utilized or otherwise deployed within such an operational environment.

In an embodiment, a node may be characterized as stationary. For example, in an embodiment, such a stationary node or a portion thereof may be in a relatively fixed position, for example, a fixed position with respect to a tubular string disposed within a wellbore.

In an alternative embodiment, a node may be characterized as transitory. For example, in an embodiment, such a transitory node may be mobile and/or positionable, for example, a ball or dart configured to be introduced into the wellbore, communicated (e.g., carried/pumped/flowed) within a wellbore, removed from the wellbore, or any combination thereof.

In an embodiment, two or more nodes may be configured to communicate via a suitable communication protocol. For example, in an embodiment, two or more nodes may be configured to communicate via an electromagnetic signal, for example, via an NFC signal.

As used herein, the term "electromagnetic (EM) signal" refers to an identifiable and distinguishable function of one or more electrical and/or magnetic characteristics or properties, for example, with respect to time. Not intending to be bound by theory, an electrical signal may be transformed into an EM signal by exciting a proximate electric field and/or a proximate magnetic field, thereby generating an EM signal. In such an example, the EM signal may generally comprise an oscillating electric field and/or an oscillating magnetic field propagating at a velocity proportional to or at about the speed of light. As such, the EM signal may generally comprise polarized waves, non-polarized waves, longitudinal waves, transverse waves, or combinations thereof. Additionally, the EM signal may be communicated via a transmitting and/or a receiving antenna (e.g., an electrical conducting material, such as, a copper wire). For example, the EM signal may be receivable and transformable into an electrical signal (e.g., an electrical current) via a receiving antenna (e.g., an electrical conducting material, for example, a copper wire). Further, the EM signal may be transmitted at a suitable magnitude of power transmission as would be appreciated by one of ordinary skill in the art upon viewing this disclosure.

In an embodiment, the NFC signal is an EM signal and is characterized as having any suitable type and/or configuration of waveform or combinations of waveforms, having any suitable characteristics or combinations of characteristics. For example, the NFC signal may comprise one or more modulated digital signals (e.g., amplitude-shift keying (ASK), continuous phase modulation (CPM), frequency-shift keying (FSK), minimum-shift keying, on-off keying (OOK), phase-shift keying (PSK), etc.). In an embodiment, the NFC signal comprises an ASK signal digital modulation. The NFC signal may be transmitted at a predetermined frequency, for example, at a frequency within the radio frequency (RF) spectrum. In an embodiment, the NFC signal comprises one or more frequencies between about 3 kilohertz (kHz) to 30 megahertz (MHz). Additionally, the NFC signal may comprise a suitable carrier frequency for example, a frequency of about 13.56 MHz. Additionally, the NFC signal may be transmitted at a predetermined data rate, for example, at a data rate of about 106 kilobits-per-second (kbps), alternatively, about 212 kbps, alternatively, about 424 kbps, alternatively, any suitable data rate as would be appreciated by one of ordinary skill in the art upon viewing this disclosure. For example, in an embodiment, the NFC signal may comprise an ASK modulated digital signal with a frequency of about 13.56 MHz with a data rate of about 106 kbps. In an alternative embodiment, the NFC signal may comprise an ASK modulated digital signal with a frequency of about 13.56 MHz with a data rate of about 212 kbps. In an alternative embodiment, the NFC signal may comprise an ASK modulated digital signal with a frequency of about 13.56 MHz with a data rate of about 424 kbps. Additionally, in an embodiment, an NFC signal may generate an omni-directional or directional RF field having a range of about 8 inches or less, alternatively, about 6 inches or less, alternatively, about 4 inches or less. Alternatively, the NFC signal may exhibit any suitable frequency, modulation, data rate, transmission power, signal range, or combinations thereof, as would be appreciated by one of ordinary skill in the art upon viewing this disclosure.

Additionally, in an embodiment, the NFC signal may comprise one or more digitally encoded messages, data packets, data frames, or the like. For example, the NFC signal may comprise one or more data signals and/or data frames comprising a preamble portion, a synchronization portion, a frame length portion, an address portion, a command portion, a data or payload portion, an error checking portion, any other suitable data frame portions as would be appreciated by one of ordinary skill in the art upon viewing this disclosure, or combinations thereof. In an embodiment, the address header portion may comprise node identification details (e.g., information uniquely associated with another node, device, or well tool, for example, a media access control (MAC) address, a serial number, etc.). In an embodiment, the command portion and/or the data portion may comprise a communication protocol command (e.g., a request, a response, etc.), a well tool command (e.g., an actuation signal), data (e.g., measurements from one or more transducers), any other type of information as would be appreciated by one of ordinary skill in the art upon viewing this disclosure, or combinations thereof. Additionally, the data frame may comprise a plurality of like portions or subsets (e.g., a first data portion, a second data portion, a third data portion, etc.) and/or delimiters (e.g., a parsing tokens). For example, a first data portion may comprise data associated with a first transducer or well tool and a second data portion may comprise data associated with a second transducer or well tool.

Figure 2:
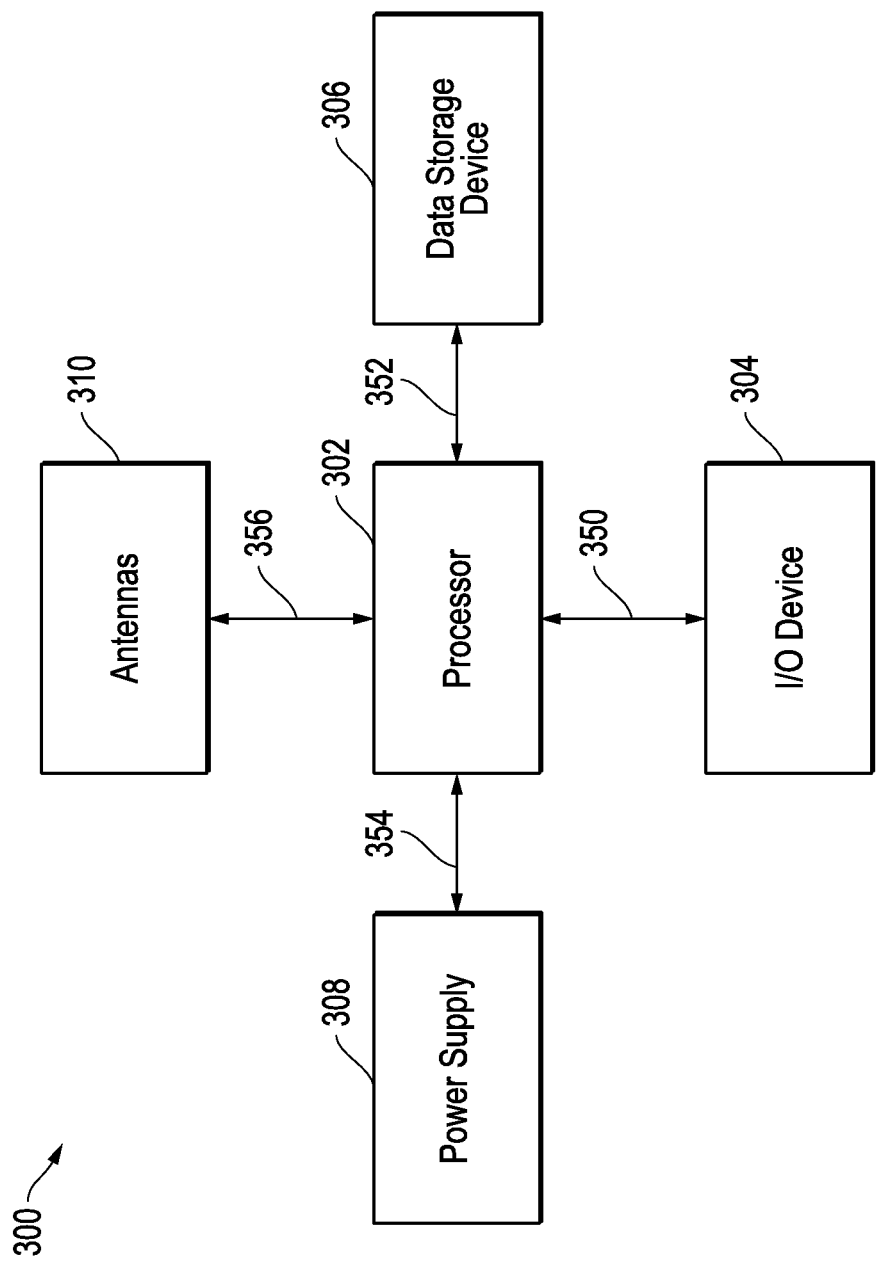
FIG. 2 is a schematic view of an embodiment of an electronic circuit of a node.

Referring to FIG. 2, in an embodiment, a node may comprise an electronic circuit 300 comprising a plurality of functional units. In an embodiment, a functional unit (e.g., an integrated circuit (IC)) may perform a single function, for example, serving as an amplifier or a buffer. The functional unit may perform multiple functions on a single chip. The functional unit may comprise a group of components (e.g., transistors, resistors, capacitors, diodes, and/or inductors) on an IC which may perform a defined function. The functional unit may comprise a specific set of inputs, a specific set of outputs, and an interface (e.g., an electrical interface, a logical interface, and/or other interfaces) with other functional units of the IC and/or with external components. In some embodiments, the functional unit may comprise repeated instances of a single function (e.g., multiple flip-flops or adders on a single chip) or may comprise two or more different types of functional units which may together provide the functional unit with its overall functionality. For example, a microprocessor or a microcontroller may comprise functional units such as an arithmetic logic unit (ALU), one or more floating-point units (FPU), one or more load or store units, one or more branch prediction units, one or more memory controllers, and other such modules. In some embodiments, the functional unit may be further subdivided into component functional units. A microprocessor or a microcontroller as a whole may be viewed as a functional unit of an IC, for example, if the microprocessor shares circuit with at least one other functional unit (e.g., a cache memory unit).

The functional units may comprise, for example, a general purpose processor, a mathematical processor, a state machine, a digital signal processor, a video processor, an audio processor, a logic unit, a logic element, a multiplexer, a demultiplexer, a switching unit, a switching element an input/output (I/O) element, a peripheral controller, a bus, a bus controller, a register, a combinatorial logic element, a storage unit, a programmable logic device, a memory unit, a neural network, a sensing circuit, a control circuit, a digital to analog converter (DAC), an analog to digital converter (ADC), an oscillator, a memory, a filter, an amplifier, a mixer, a modulator, a demodulator, and/or any other suitable devices as would be appreciated by one of ordinary skill in the art.

In the embodiment of FIG. 2, the node may comprise a plurality of distributed components and/or functional units and each functional unit may communicate with one or more other functional units via a suitable signal conduit, for example, via one or more electrical connections, as will be disclosed herein. In an embodiment, the node comprises a plurality of interconnected functional units, for example, for transmitting and/or receiving one or more NFC signals (e.g., EM signals). In the embodiment of FIG. 2, the node may generally comprise various functional units including, but not limited to a processor 302, a I/O device 304, a data storage device 306, a power supply 308, and an antenna 310. In an alternative embodiment, the node may comprise various combinations of such functional unit (e.g., a processor, a I/O device, a data storage device, a power supple, an antenna, etc.). In such an embodiment, the node is configured to provide either one-way or two-way communication (e.g., peer-to-peer communication) and is configured to transmit and/or receive an NFC signal (e.g., an EM signal). For example, in an embodiment, a node may be configured both to send information via an NFC and to receive information via the NFC. While FIG. 2 illustrates a particular embodiment of a node comprising a particular configuration of functional units, upon viewing this disclosure one of ordinary skill in the art will appreciate that a node as will be disclosed herein may be similarly employed with alternative configurations of functional units.

In an embodiment, the processor 302, which may be referred to as a central processing unit (CPU), may be configured to control one or more functional units of the node and/or to control data flow through the node. For example, the processor 302 may be configured to communicate one or more electrical signals (e.g., data packets, control signals, etc.) with the I/O device 304 (e.g., via electrical connection 350), the data storage device 306, (e.g., via electrical connection 352), the power supply 308 (e.g., via electrical connection 354), the antenna 310 (e.g., via electrical connection 356), and/or to perform one or more processes on the electrical signals (e.g., authentication, packet monitoring logic, parsing, etc.). In such an embodiment, one or more of the processes may be performed in software, hardware, or a combination of software and hardware. Although illustrated as a single processor, the processor 302 may be implemented as one or more CPU chips, cores (e.g., a multi-core processor), digital signal processor (DSP), an application specific integrated circuit (ASIC), and/or any other suitable type and/or configuration as would be appreciated by one of ordinary skill in the arts upon viewing this disclosure.

In an embodiment, the processor 302 may be configured to employ and/or conform to one or more protocols and/or standards. For example, the processor 302 may be configured to process (e.g., transmit and/or receive) an electrical signal (e.g., a data packet, a data frame, etc.) using NFC standards and/or protocols in accordance with International Organization for Standards (ISO) 18092, ISO 14443, European Computer Manufacturers Association (ECMA) 340, and European Telecommunications Standards Institute (ETSI) Technical Specifications (TS) 102 190. In an additional or alternative embodiment, any other suitable wireless standard and/or protocol may be employed as would be appreciated by one of ordinary skill in the art upon viewing this disclosure.

In an embodiment, the I/O device 304 may be generally configured to transmit electrical signals and/or data signals between the processor 302 and/or the node and external hardware (e.g., a power source, a computer, etc.).

In an embodiment, the data storage device 306 may be generally configured to store information (e.g., data) for the node and may be configured to read and/or to write data to one or more memory cells of the data storage device 306. In an embodiment, the data storage device 306 may comprise a read-only memory (ROM), a random access memory (RAM), a flash memory, an external memory (e.g., an secure digital (SD) card), any suitable type of memory device as would be appreciated by one of ordinary skill in the art upon viewing this disclosure, or combinations thereof.

In an embodiment, the node may comprise one or more antennas 310. The antennas 310 may be configured to transmit and/or receive an NFC signal (e.g., an EM signal) and to be responsive to one or more predetermined radio frequency bands. For example, the antennas 310 may be configured to be responsive to an NFC signal comprising a frequency within the RF spectrum (e.g., from about 3 hertz (Hz) to 300 gigahertz (GHz)). In an embodiment, the antennas 310 may be responsive to an NFC signal within the 13.56 MHz band. In an additional or alternative embodiment, the antennas 310 may be configured to be responsive to any other suitable frequency band as would be appreciated by one of ordinary skill in the art upon viewing this disclosure. The antennas 310 may generally comprise a monopole antenna, a dipole antenna, a folded dipole antenna, a patch antenna, a microstrip antenna, a loop antenna, an omnidirectional antenna, a directional antenna, a planar inverted-F antenna (PIFA), a folded inverted conformal antenna (FICA), any other suitable type and/or configuration of antenna as would be appreciated by one of ordinary skill in the art upon viewing this disclosure, or combinations thereof. For example, the antenna 310 may be a loop antenna and in response to receiving an NFC signal of about a predetermined frequency the antenna 310 may inductively couple and/or generate a magnetic field which may be converted into an electrical current or an electrical voltage (e.g., via inductive coupling). Additionally, the antennas 310 may comprise a terminal interface and/or may be configured to physically and/or electrically connect to the processor 302. For example, the terminal interface may comprise one or more wire leads, one or more metal traces, a BNC connector, a terminal connector, an optical connector, and/or any other suitable connection interfaces as would be appreciated by one of ordinary skill in the art upon viewing this disclosure.

In an embodiment, the power supply 308 may supply power to the processor 302 and/or any other functional units of the node. The power supply 308 may comprise an on-board battery, a power generation device, a voltage source, a current source, or any other suitable power source as would be appreciated by one of ordinary skill in the art upon viewing this disclosure. For example, the power source 308 is a Galvanic cell. In an embodiment, such a power generation device may comprise a generator, such as a turbo-generator configured to convert fluid movement into electrical power; alternatively, a thermoelectric generator, which may be configured to convert differences in temperature into electrical power. In such embodiments, such a power generation device may be carried with, attached, incorporated within or otherwise suitably coupled to the well tool and/or a component thereof. Suitable power generation devices, such as a turbo-generator and a thermoelectric generator are disclosed in U.S. Pat. No. 8,162,050 to Roddy, et al., which is incorporated herein by reference in its entirety. In an embodiment, the power source 308 may supply power in the range of about 0.5 milliwatts to 10 watts, alternatively, from about 0.5 watts to about 1.0 watts.

In an embodiment, the electronic circuit 300 may be programmable and/or reprogrammable, for example, via a wired connection or a wireless connection. Additionally, in an embodiment, the electronic circuit 300 may be configured to operate in either a low-power consumption mode or "sleep" mode, alternatively, in an active mode or "wake" mode. Additionally, the electronic circuit 300 may be configured in enter the active mode (e.g., to "wake") in response to an NFC signal.

As will be disclosed herein, for any communication between two or more nodes, unless otherwise noted, either of such nodes may initiate communication with the other node or nodes, while the other node or nodes is the target of that communication. In an embodiment, a node may be configured to operate as an initiator (e.g., a transmitter)

and/or a target (e.g., a receiver). Also, a node may be configured to communicate via an active mode and/or a passive mode.

In an embodiment, a node operating as an initiator may be configured to begin or initiate the communication between two or more nodes, for example, via transmitting an NFC signal. Alternatively, a node operating as a target may be configured to be responsive to an NFC signal (e.g., from a node operating as an initiator) and may not be configured to initiate communication between the two or more nodes. For example, the target may be configured to only transmit an NFC signal (e.g., a data frame) in response to an NFC signal (e.g., a data frame request) from the initiator. In an embodiment, a node may be configured to operate as both an initiator and a target. For example, a first node may operate as an initiator to communicate with a second node via an NFC signal and may also operate as a target to communicate with a third node via an NFC signal. Additionally or alternatively, the first node may operate as an initiator to communicate with a second node for a first duration of time and may then operate as a target to communicate with the second node for a second duration of time.

In an embodiment, two or more nodes (e.g., an initiator and a target) may be configured to communicate in an active mode or a passive mode. For example, in an active mode both the initiator and the target generate an RF field to enable communication between the initiator and the target. For example, the initiator may generate an RF field and transmit an NFC signal via the RF field generated by the initiator. Additionally, the target may generate an RF field and transmit a response to the initiator via the RF field generated by the target. Alternatively, in a passive mode the initiator generates the RF field and initiates communication (e.g., via transmitting an NFC signal) between the initiator and the target. For example, the initiator may generate an RF field and transmit an NFC signal via the RF field generated by the initiator. Additionally, the target may transmit a response to the initiator via the RF field generated by the initiator. Additionally, during passive mode communication, the target may be configured to respond to a command (e.g., from the initiator) via load modulated scheme (e.g., a sub-carrier frequency). In an embodiment, a node may be selectively configurable between communicating in an active mode and passive mode. For example, the node may be programmed or reprogrammed (e.g., via a wired connection or a wireless connection) to operate in active mode or passive mode.

Additionally or alternatively, in an embodiment, a node may be configured to operate as an active mode in some circumstances and as a passive mode in other circumstances. For example, a node may be configured to operate in a passive mode until a predetermined condition is met and, upon the predetermined condition being met, to transition from the passive mode to an active mode. Additionally or alternatively, in an embodiment a node may be configured to operate in an active mode until a predetermined condition is met and, upon the predetermined condition being met, to transition from the passive mode to the active mode. For example, such a predetermined condition may comprise the passage of a predetermined time interval, the receipt of a predetermined NFC signal (e.g., data frames), the receipt of a predetermined number or combination of NFC signals, or combinations thereof.

In an additional or alternative embodiment, a plurality of nodes may be configured to form an ad-hoc network. For example, the nodes may form an array (e.g., a chain) of nodes spanning some distance (e.g., a portion of a wellbore) and may be configured to receive and/or rebroadcast (e.g., repeat) an NFC signal (e.g., one or more data frames) throughout the ad-hoc network.

In an additional embodiment, a node may be configured to employ a collision avoidance and/or collision detection protocol while transmitting an NFC signal. For example, prior to generating an RF field, a node (e.g., an initiator) may be configured to test for the presence of an external RF field (e.g., an RF field generated by another node). As such, the node (e.g., the initiator) may be configured to not generate an RF field during the presence of an external RF fields.

As will be disclosed herein, in an embodiment one or more of the nodes may be configured and/or functional as a logging device, as a wellbore tool (e.g., a stimulation tool, a production tool, a completion tool, an isolation tool, etc.), as a controller, as a wellbore monitoring device, or combinations thereof. For example, while various specific node configurations and/or functionalities are disclosed herein, this disclosure should not be construed to mean that any particular configuration/functionality associated with a node is exclusive of any other configuration/functionality. Moreover, a given node may exhibit different functionalities with respect to various other nodes. For example, a first node may exhibit a first subset of functionalities with respect to (e.g., when communicating with) a second node and may exhibit a second subset of functionalities with respect to (e.g., when communicating with) a third node.

In an embodiment, a node may be configured as a logging device (e.g., a logging or recording node). For example, such a logging node may be configured to retrieve and/or receive data, alternatively, one or more subsets of data, from a data sensing and/or collecting device (e.g., a sensing node, as will be disclosed herein).

In such an embodiment, such a logging node may be configured to be communicated through the wellbore or a portion thereof. For example, the logging node may comprise a flowable or pumpable component, a disposable member, a ball, a dart, or other like. In such an embodiment, a logging node comprising a ball, a dart, or the like may be configured to be communicated through at least a portion of the wellbore and/or a tubular disposed within the wellbore along with a fluid being communicated therethrough. For example, such a logging node may be communicated downwardly through a wellbore (e.g., while a fluid is forward-circulated into the wellbore). Additionally or alternatively, such a logging node may be communicated upwardly through a wellbore (e.g., while a fluid is reverse-circulated out of the wellbore or along with formation fluids flowing out of the wellbore). Alternatively, in an embodiment a logging node may be configured for incorporation within and/or attachment to a tubular string (e.g., a drill string, a work string, a coiled tubing string, or the like) and/or a wire. The wire may be a braided cable like an electrical line, a single-strand cake like a slickline, or a multi-strand cable like a sandline. For example, such a logging node may be communicated (e.g., upwardly and/or downwardly) through at least a portion of a wellbore along with the tubing string or wire.

In an embodiment, the electronic circuit 300 of such a logging node may be configured to obtain, record, and/or store data or a subset of data from another node (e.g., a sensing node), for example, upon initiation of communication with another node (e.g., a sensing node).

In an embodiment, the logging node may be configured as an initiator. In such an embodiment, as the logging node travels (e.g., within a wellbore), the logging node may be configured to generate an RF field and to transmit an NFC signal (e.g., one or more commands and/or data requests), for example, to one or more sensing nodes, as will be disclosed herein. Additionally, the logging node may be configured to receive one or more responses (e.g., data frames), for example, from the sensing nodes.

In an embodiment, the logging node may be configured as a target. In such an embodiment, as the logging node travels (e.g., within a wellbore), the logging node may be configured to be in an idle or "sleep" mode (e.g., not generating an RF field) until activated by an RF field (e.g., an NFC signal from an initiator). Upon being activated, the logging node may be configured to receive one or more data frames. Additionally, the logging node may be configured to return to an idle or "sleep" mode upon the completion of receiving/transmitting one or more data frames.

Additionally, in an embodiment upon receiving one or more data frames, the logging node may be configured to process (e.g., parse) the data frames, for example, for the purpose of evaluating and/or identifying another node. In such an embodiment, the logging node may be configured to respond in response to the recognition of a node, for example, a data frame request. Additionally or alternatively, the logging node may be configured to process the data frames to extract and/or parse one or more data subsets (e.g., a first data portion, a second data portion, etc.) from the data frames.

Additionally, in an embodiment the logging node may be configured to store one or more data frames and/or data subsets, for example, saving the data frames and/or data subsets (e.g., onto the data storage device of the electronic circuit of the logging node).

In an embodiment, the electronic circuit may be further configured to transmit or upload one or more data frames to another node, for example, data retrieved from other nodes.

In an embodiment, the data communicated between two or more nodes may comprise data associated with a wellbore (such as temperatures, pressures, flow-rates, or the like), data associated with other nodes (node configurations, node status, node power supply, or the like), or combinations thereof.

In an embodiment, a node may be configured as a sensor (e.g., a sensing node). For example, in such an embodiment such a sensing node may be configured to measure and/or store data, for example, data associated with a wellbore (such as temperatures, pressures, flow-rates, or the like), data associated with a tool disposed within the wellbore (such as tool status, tool power availability, tool configuration, or the like), or combinations thereof.

In such an embodiment, such a sensing node may be configured to be disposed (e.g., permanently or removably) within a wellbore. In an embodiment, the sensing node may be affixed to or a part of a component (e.g., a tool or tubular) within the wellbore. For example, a sensing node may be incorporated within and/or attached to a tubular string, for example, a casing string, production string, completion string, the like, or combinations thereof. For example, in such an embodiment, a sensing node may comprise a tool (e.g., a tubular member) suitably sized and configured to be made a part of such a tubular string during placement of such a tubular string.

Alternatively, in an embodiment, the sensor node is transitory, for example, the sensor node may be incorporated with a disposable member (e.g., a ball, a dart, a plug, etc.) and may be configured to measure and/or store data while being transmitted or communicated through a wellbore.

Alternatively, in an embodiment a sensing node may be configured to be incorporated within a wellbore fluid, for example, so as to be communicated into the wellbore and/or the subterranean formation as a part of a wellbore fluid such as a fracturing fluid, a cementitious fluid, or the like. For example, in such an embodiment a sensing node may comprise one or more micro or nano-scaled electronic sensing devices, for example, as disclosed in U.S. patent application Ser. No. 11/695,329 to Roddy filed on Apr. 2, 2007 and issued as U.S. Pat. No. 7,712,527, which is incorporated herein by reference in its entirety.

In an embodiment, such a sensing node may comprise one or more transducers. In an embodiment, a transducer may be in electrical signal communication with the electronic circuit 300 and may be employed to sense and/or measure conditions (e.g., a temperature, a pressure, a flow-rate, a magnetic field, pH, etc.), for example, within a wellbore. Additionally, the transducer may be configured to output a suitable signal (e.g., an electrical signal) which may be indicative of and/or proportional to the measured or sensed conditions (e.g., a temperature, a pressure, a flow-rate, a magnetic field, pH, etc.).

In an embodiment, the sensing node may be configured to employ a transducer to capture wellbore data (e.g., temperature, pressure, flow-rate, pH, etc.). For example, the transducer may be configured to measure a pressure (e.g., a pressure within a wellbore) and may include, but are not limited to, capacitive sensors, piezoresistive strain gauge sensors, electromagnetic sensors, piezoelectric sensors, optical sensors, or the like. Additionally or alternatively, the transducer may be configured to measure a temperature (e.g., a temperature within a wellbore) and may include, but are not limited to, a thermocouple, a thermistor, a resistance temperature detector, or the like. Additionally or alternatively, the transducer may be configured to measure a flow-rate (e.g., a flow-rate of a fluid within a wellbore) and may include, but are not limited to, a differential pressure flowmeter, a velocity flowmeter, a positive displacement flowmeter, a mass flowmeter, an open channel flowmeter, or the like. Additionally or alternatively, the transducer may be configured to measure any other suitable wellbore data as would be appreciated by one of ordinary skill in the art upon viewing this disclosure.

In an additional or alternative embodiment, the sensing node may be configured to employ a transducer to capture data associated with a tool, for example, position indicators, movement indicators, status indicators, force indicators, etc. For example, the transducer may be configured to measure the status (e.g., position and/or motion) of a tool, for example, employing one or more magnetic sensors to detect the actuation of a ferromagnetic sliding sleeve. Suitable magnetic sensors may include, but are not limited to, a magneto-resistive sensor, a giant magneto-resistive (GMR) sensor, a microelectromechanical systems (MEMS) sensor, a Hall-effect sensor, a conductive coils sensor, a super conductive quantum interference device (SQUID) sensor, or the like. Additionally or alternatively, the sensing node may be configured to employ one or more accelerometers to detect and/or measure motion (e.g., motion of a sliding sleeve). Additionally or alternatively, the sensing node may be configured to employ one or more potentiometers to detect and/or measure partial movement and/or the position of a tool. Additional, suitable types and/or configurations of transducers may include, but are not limited to, a gyroscope, an accelerometer, a strain gauge, a potentiometer, an acoustic sensor, or the like.

In an embodiment, the electronic circuit 300 of such a sensing node may be configured to cause the sensing node to communicate data to another node (e.g., a logging node), for example data obtained via the operation of a transducer, to another node. For example, in response to a data frame request (e.g., from a logging node), the sensing node may be configured to communicate a data frame comprising all stored and/or measured data; alternatively, a subset of the stored and/or measured data (e.g., a first data portion, a second data portion, etc.). Additionally or alternatively, in an embodiment the sensing node may communicate data substantially in real-time, for example, the data is communicated substantially proximate in time to when it is sensed.

In an embodiment, a node may be configured as a wellbore tool (e.g., a tool node). For example, in such an embodiment such a tool node may be configured for the performance of one or more wellbore servicing operations. In an embodiment, such a tool node may be selectively actuatable. For example, such a tool node may be configured such that, upon the receipt of a communication from another node, the tool node may be actuated, for example, so as to allow, disallow, or alter a route of fluid communication through the tool and/or a route of fluid communication between an axial flowbore of the tool and the exterior of the tool.

In an embodiment, the tool node may comprise and/or be configured as an actuatable flow assembly (AFA). In such an embodiment, the AFA may generally comprise a housing and one or more sleeves movably (e.g., slidably) positioned within the housing. For example, the one or more sleeves may be movable from a position in which the sleeves and housing cooperatively allow a route of fluid communication to a position in which the sleeves and housing cooperatively disallow a route of fluid communication, or vice versa. In various embodiments, a node comprising an AFA may be configured for use in a stimulation operation (such as a fracturing, perforating, or hydrojetting operation, an acidizing operation), for use in a drilling operation, for use in a completion operation (such as a cementing operation or fluid loss control operation), for use during production of formation fluids, for use in a secondary recovery operation (such as a carbon dioxide, water, and/or steam injection operation), or combinations thereof. Suitable examples of such an AFA are disclosed in U.S. patent application Ser. No. 13/781,093 to Walton et al. filed on Feb. 28, 2013, U.S. patent application Ser. No. 13/828,824 filed on Mar. 14, 2013, International Application No. PCT/US 2013/025424 filed Feb. 8, 2013 and International Application No. PCT/US 2013/026534 filed Feb. 15, 2013 to Fripp/Bonner, each of which is incorporated herein by reference in its entirety.

In another embodiment, the tool node may comprise and/or be configured as an actuatable packer. In such an embodiment, the actuatable packer may generally comprise a packer mandrel and one or more packer elements that exhibit radial expansion upon being longitudinally compressed. The actuatable packer may be configured such that, upon actuation, the actuatable pack is caused to longitudinally compress the one or more packer elements, thereby causing the packer elements to radially expand into sealing contact with the wellbore walls or with an inner bore surface of a tubular string in which the actuatable packer is disposed. Suitable examples of such an actuatable packer are disclosed in U.S. patent application Ser. No. 13/660,678 to Helms et al. filed on Oct. 25, 2012, which is incorporated herein by reference in its entirety.

In another embodiment, the tool node may comprise and/or be configured as an actuatable valve assembly (AVA). In such an embodiment, the AVA may generally comprise a housing generally defining an axial flowbore therethrough and an actuatable valve. The actuatable valve may be positioned within the housing (e.g., within the axial flowbore) and may be transitionable from a first configuration in which the actuatable valve allows fluid communication via the axial flowbore in at least one direction to a second configuration in which the actuatable valve does not allow fluid communication via the flowbore in that direction, or vice versa. Suitable configurations of such an actuatable valve include a flapper valve and a ball valve. In an embodiment, the actuatable valve may be transitioned from the first configuration to the second configuration, or vice versa, via the movement of a sliding sleeve also positioned within the housing, for example, which may be moved or allowed to move upon the actuation of an actuator. Suitable examples of such an AVA are disclosed in International Application No. PCT/US13/27674 filed Feb. 25, 2013 and International Application No. PCT/US13/27666 filed Feb. 25, 2013.

In an embodiment, the electronic circuit 300 of such a tool node may be configured to cause the tool node to receive an NFC signal (e.g., a data frame response, a data frame request, etc.) and to process (e.g., parse) the data frame, for example, to extract an address portion or data portion of the data frame to determine if the data frame is addressed for that particular tool node. For example, an address portion may be extracted from a data frame and compared to a predetermined address to determine if the received NFC signal is intended for a particular tool node.

Additionally or alternatively, in an embodiment, the tool node may be configured to determine the direction of movement of the device (node) from which an NFC signal was received. For example, the tool node may comprise two or more magnetic transducers/sensors and be configured to employ the magnetic transducers/sensors (e.g., Hall Effect sensors) to sense a magnetic field and/or magnetic field disturbance from the movement of the transmitting device (e.g., an initiator). Additionally or alternatively, the tool node may be configured to determine the direction of movement of a device (node) transmitting a signal (e.g., NFC signal) addressed to the particular tool node.

Additionally or alternatively, the tool node may be configured such that upon coming into signal communication (e.g., NFC signal communication) with a well tool or node the electronic circuit of the tool node increments or decrements a counter (e.g., a software and/or hardware counter). Additionally or alternatively, the tool node may be configured such that upon coming into signal communication (e.g., NFC signal communication) with a predetermined well tool or node (e.g., a node having a predetermined data frame identifier, for example, a MAC address) the electronic circuit of the tool node increments or decrements a counter (e.g., a software and/or hardware counter). Additionally or alternatively, the tool node may be configured such that upon coming into signal communication (e.g., NFC signal communication) with a well tool or node moving in first direction (e.g., moving in a down-hole through a wellbore), the electronic circuit may increment a counter and movement of the well tool or node in a second direction (e.g., moving in an up-hole direction through the wellbore) may cause the electronic circuit to decrement a counter. Alternatively, the electronic circuit may decrement a counter in response to a well tool or node traveling in the first direction and increment a counter in response to the well tool or node traveling in a second direction.

Additionally or alternatively, the tool node may be configured to transition to/from a "sleep"/"wake" mode in response to an NFC signal. Additionally or alternatively, the tool node may be configured to transition to/from a "sleep"/"wake" mode in response to identifying a predetermined command and/or a predetermined well tool or node. For example, the tool node may be configured to process (e.g., parse) a received data frame (e.g., a data frame request, a data frame response, etc.) from a node (e.g., an initiator), for example, to identify one or more predetermined commands for the tool node. Additionally or alternatively, the tool node may be configured transition to/from a "sleep"/"wake" mode in response to a node moving in a predetermined direction. Additionally or alternatively, the tool node may be configured transition to/from a "sleep"/"wake" mode upon achieving a predetermined counter threshold (e.g., an upper numerical threshold and lower numerical threshold).

Additionally or alternatively, upon receiving an NFC signal, the electronic circuit of such a tool node may be configured to output one or more suitable responses (e.g., an actuation, activation, or triggering signal). Additionally or alternatively, the tool node may be configured to output one or more actuation, activation, or triggering signals (e.g., an electrical voltage or current) in response to determining a particular well tool or node (e.g., a node having a predetermined data frame identifier). Additionally or alternatively, the tool node may be configured to output one or more actuation signals (e.g., an electrical voltage or current) in response to identifying one or more predetermined commands. For example, the tool node may be configured to output actuation signals to a plurality of actuators (e.g., a first actuator, a second actuator, etc.). Additionally or alternatively, the tool node may be configured to output one or more actuation, activation, or triggering signals (e.g., an electrical voltage or current) in response to determining the movement of a particular well tool or node (e.g., an initiator having a predetermined data frame identifier) in predetermined direction (e.g., in an up-hole direction or in a down-hole direction). Additionally, the tool node may be configured to output one or more actuation, activation, or triggering signals (e.g., an electrical voltage or current) upon achieving a predetermined counter threshold (e.g., an upper numerical threshold and lower numerical threshold). Additionally, the tool node may be configured to output one or more actuation, activation, or triggering signals (e.g., an electrical voltage or current) upon transition from a "sleep" mode to a "wake" mode.

Additionally, in an embodiment the tool node may be configured to indicate the status, for example, active mode communication, passive mode communication, idle/"sleep" mode, active/"wake" mode, fully actuated, partially actuated, any other suitable status indicators as would be appreciated by one of ordinary skill in the art upon viewing this disclosure, or combinations thereof. For example, in an embodiment, the tool node may be configured to output a data frame response (e.g., having one or more data portions) indicating the status of the tool node. For example, the electronic circuit 300 of the tool node may be configured to output a signal indicating the position and/or configuration of the tool node, the mode of the tools, a log of the activities of the tool, the amount of power remaining in any associated power supply, the health of the tool node and/or one or more components of the tool. For example, in an embodiment, the tool node may comprise a pressure transducer and may be configured to determine and/or indicate the position of the tool node (e.g., depth of a tool node below the earth's surface within a wellbore), for example, based on hydrostatic pressure measurements. Additionally or alternatively, in an embodiment, the tool node may be configured such that actuation of the tool node may cover (e.g., blocking or prohibiting the recognition/generation of an RF field) or uncover (e.g., allowing or enabling the recognition/generation of an RF field) the tool node and, thereby indicate the status and/or configuration of the tool node. Additionally or alternatively, the tool node may be configured transition to/from a "sleep" mode (e.g., prohibiting the recognition/generation of an RF field) or a "wake" mode (e.g., allowing or enabling the recognition/generation of an RF field) and, thereby indicate the status and/or configuration of the tool node.

In an embodiment, a node may be configured as a controller (e.g., a controller node). For example, in such an embodiment such a controller node may be configured to communicate one or more signals to another node (e.g., to a tool node) effective to cause the other node to output a given response, for example, as disclosed herein.

In an embodiment, such a controller node may be configured to be communicated (e.g., flowed or pumped) through the wellbore or a portion thereof. For example, the controller node may comprise a ball, a dart, or other like. In such an embodiment, a controller node comprising a ball, a dart, or the like may be configured to be communicated through at least a portion of the wellbore and/or a tubular disposed within the wellbore along with a fluid being communicated therethrough. For example, such a controller node may be communicated downwardly through a wellbore (e.g., while a fluid is forward-circulated into the wellbore). Additionally or alternatively, such a controller node may be communicated upwardly through a wellbore (e.g., while a fluid reverse-circulated out of the wellbore or along with formation fluids flowing out of the wellbore). Alternatively, in an embodiment a controller node may be configured for incorporation within and/or attachment to a tubular string (e.g., a drill string, a work string, a coiled tubing string, or the like) and/or a wire. For example, such a controller node may be communicated (e.g., upwardly and/or downwardly) through at least a portion of a wellbore along with the tubing string or wire.

In an alternative embodiment, a controller node may be configured to be disposed (e.g., permanently or removably) within a wellbore. In an embodiment, the sensing node may be affixed to or a part of a component (e.g., a tool or tubular) within the wellbore. For example, a controller node may be incorporated within and/or attached to a tubular string, for example, a casing string, production string, completion string, the like, or combinations thereof. For example, in such an embodiment, a controller node may comprise a tubular member suitably sized and configured to be made a part of such a tubular string during placement of such a tubular string.

In an embodiment, the electronic circuit of such a controller node may be configured to cause the controller node to communicate an NFC signal (e.g., a data frame) thereby causing another node to output a particular response. For example, the signal may cause another node to increment/decrement a hardware or software counter, transition to/from a "sleep"/"wake" mode, output an electrical signal (e.g., an actuation signal), to start or stop a timer (e.g., a fluidic timer or a software timer), or any other suitable response as would be appreciated by one of ordinary skill in the art upon viewing this disclosure, or combinations thereof.

In an embodiment, one or more nodes communicating via an NFC signal and having, for example, a configuration and/or functionality as disclosed herein, or a combination of such configurations and functionalities, may be employed in a wellbore servicing system and/or a wellbore servicing method, as will be disclosed herein.

Figure 3:
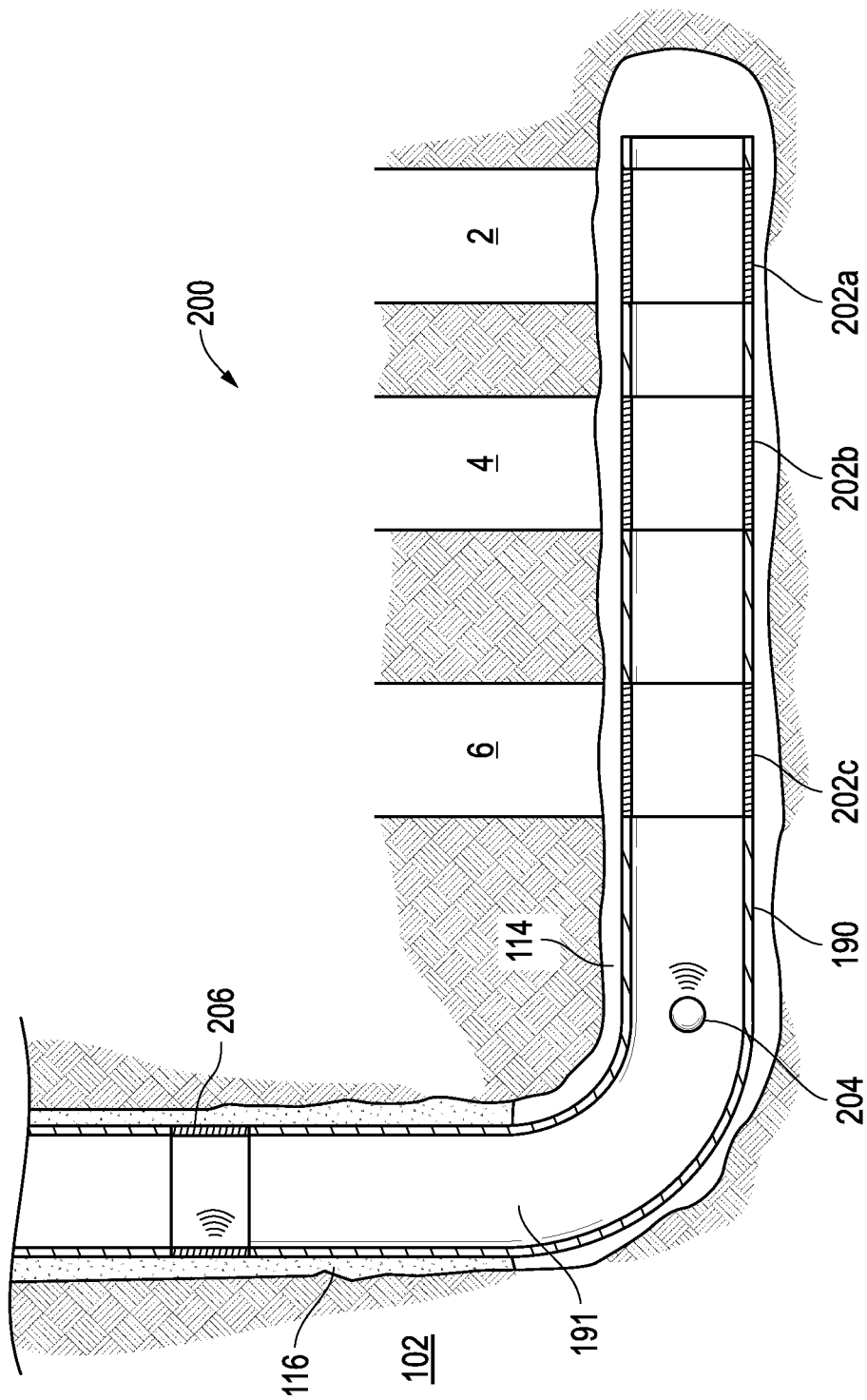
FIGS. 3 through 10 are representative partially cross-sectional views of embodiments of wellbore servicing systems.

Referring to FIG. 3, an embodiment of a wellbore servicing system having at least two nodes communicating via an NFC signal is illustrated. In the embodiment of FIG. 3, the wellbore servicing system comprises a wellbore information-gathering system 200, for example, a system generally configured to gather and/or log data from within the wellbore. For example, such data may comprise data associated with the wellbore (e.g., temperature data, pressure data, flow-rate data, or combinations thereof), data associated with one or more tools (e.g., tool nodes, as disclosed herein) within the wellbore (e.g., tool status, tool power availability, tool configuration, etc.), or combinations thereof.

In the embodiment of FIG. 3, the wellbore-information gathering system 200 comprises one or more sensing nodes 202 (particularly, three sensing nodes, 202a, 202b, and 202c) disposed within the wellbore 114. While the embodiment of FIG. 3 illustrates an embodiment in which there are three sensing nodes 202, in another embodiment any suitable number of sensing nodes may be employed. In the embodiment of FIG. 3, each of the sensing nodes 202 may be generally configured and/or functional to obtain/measure one or more data points within the wellbore (e.g., via the operation of a transducer) and, optionally, to store that data. In an embodiment, one or more of the nodes 202 may additionally or alternatively be configured and/or functional as a tool node, as disclosed herein. For example, in such an embodiment, such nodes may be further configured to output an NFC signal indicating the position and/or configuration of the tool node, the mode of the tools, a log of the activities of the tool, the amount of power remaining in any associated power supply, the health of the tool node (and/or one or more components of the tool), or combinations thereof.

In the embodiment of FIG. 3, each of the sensing nodes 202 is incorporated within (e.g., a part of) the casing string 190 and is positioned within the wellbore 114. Particularly, in the embodiment of FIG. 3, each of the sensing nodes 202 is positioned within the wellbore such that each of the sensing nodes 202 is generally associated with a subterranean formation zone (particularly, one of subterranean formation zones 2, 4, and 6). In such an embodiment, each of the sensing nodes 202a, 202b, and 202c, may thereby obtain data relevant to or associated with each of zones 2, 4, and 6, respectively.

Also in the embodiment of FIG. 3, the wellbore-information gathering system 200 comprises a first logging node 204. In the embodiment of FIG. 3, the first logging node 204 is generally configured to retrieve and/or receive data from the one or more sensing nodes 202, particularly, sensing nodes 202a, 202b, and 202c. In the embodiment of FIG. 3, the first logging node 204 comprises a ball, for example, such that the first logging node 204 may be communicated through the casing string 190 via the axial flowbore 191 thereof. In alternative embodiments, a logging node functionally similar to the first logging node 204 may comprise a dart, a wiper, a member incorporated within a tubing string or attached to a wire, or combinations thereof.

Also in the embodiment of FIG. 3, the wellbore-information gathering system 200 further comprises a second logging node 206. In the embodiment of FIG. 3, the second logging node 206 is generally configured to transmit and/or receive data from the first logging node 204. In the embodiment of FIG. 3, the second logging node 206 is incorporated within the casing string 190 at a location uphole relative to the sensing nodes 202 (e.g., uphole from the "heel" of the wellbore 114, alternatively, substantially near the surface 104). Alternatively, a second logging node may be positioned at the surface (e.g., not within the wellbore). In an embodiment, the second logging node 206 may be in signal communication with one or more components located at the surface (e.g., a computer or other data processor, a data storage device, a long-range data transmission device, etc.), for example, via a wired or other suitable connection. In an alternative embodiment, an additional logging node (such as the second logging node 206) need not be present as a part of the wellbore-information gathering system.

In an embodiment, a wellbore servicing system such as the wellbore-information gathering system 200 disclosed with respect to FIG. 3 may be employed to gather and/or log information measured and/or obtained within the wellbore. For example, such an information-gathering method may generally comprise the steps of positioning one or more sensing nodes within a wellbore, communicating a logging node through at least a portion of the wellbore to receive or retrieve data from one or more of the sensing nodes, and obtaining the data from the logging node.

Referring again to FIG. 3, in an embodiment, one or more sensing nodes, such as sensing nodes 202 may be positioned within a wellbore, such as wellbore 114. For example, in the embodiment of FIG. 3 where the sensing nodes 202 are incorporated within the casing string 190, the sensing nodes 202 may be run into the wellbore 114 (e.g., positioned at a desired location within the wellbore 114) along with the casing string 190. In other embodiments, one or more sensing nodes may be configured to be deployed following the installation of a casing string or other tubular. For example, in an embodiment a sensing node or a portion thereof may be deployed into one or more side-pocket mandrels of a casing string following completion.

In an embodiment, the sensing nodes 202 may begin collecting data immediately upon placement within a wellbore 114, for example, the sensing nodes 202 may be placed within the wellbore in an active state. In an alternative embodiment, the sensing nodes may be placed within the wellbore in an inactive state, for example, where the sensing nodes do not perform any data-collection function until activated. In such an embodiment, the sensing nodes may be activated via the operation of another node (e.g., a controller node), as will be disclosed herein. Similarly, in an embodiment, after positioning the sensing nodes within the wellbore, a controller node may be used to transition the sensing nodes to low-power mode (e.g., to "sleep"), to transition the sensing nodes to an active mode (e.g., to "wake"), or the like.

In an embodiment, when it is desired to gather at least a portion of the data obtained by the sensing nodes 202, the first logging node 204 may be introduced in the wellbore 114 (e.g., into the casing string 190) and communicated downwardly through the wellbore 114. For example, in an embodiment, the first logging node 204 may be communicated downwardly through the wellbore 114, for example, via the movement of fluid into the wellbore 114 (e.g., the forward-circulation of a fluid). As the first logging node is communicated through the wellbore 114, the first logging node 204 comes into signal communication with one or more of the sensing nodes 202, for example, one or more of sensing nodes 202c, 202b, and 202a, respectively. In an embodiment, as the first logging node 204 comes into signal communication with each of the sensing nodes 202, the first logging node 204 may initiate communication (e.g., via an NFC signal) with each of the nodes 202 (e.g., the first logging node 204 operates as an active initiator). Upon establishing communication (e.g., via the NFC signal) with a given sensing node, 202c, 202b, or 202a, the first logging node 204 may receive and/or retrieve and store at least a portion of the data residing with a given sensing node 202. For example, in an embodiment, the first logging node 204 may receive data comprising environmental conditions (e.g., a temperature, a pressure, a flow-rate, a magnetic field, etc.), well tool performance conditions (e.g., battery life, depth below surface, actuation status, orientation, etc.), or any other suitable data set as would be appreciated by one of ordinary skill in the art upon viewing this disclosure.

In an embodiment, downward communication of the first logging node 204 may continue at least until the first logging node 204 has been transmitted through a sufficient portion of the wellbore 114 (e.g., the casing string 190) to communicate with each of the sensing nodes from which data is to be collected.

In an embodiment, after the first logging node 204 has collected data from each desired sensing node 202, the first logging node 204 may be removed from the wellbore 114. For example, in an embodiment, the first logging node 204 may be communicated upwardly through the wellbore 114 via the movement of fluid upwardly through the wellbore 114 (e.g., via the reverse-circulation of a fluid). Alternatively, the first logging node 204 may be allowed carried upwardly through the wellbore 114 along with a formation fluid being produced via the wellbore 114 (e.g., a produced fluid).

In an embodiment, as the first logging node 204 passes each of the sensing nodes 202 again, the first logging node 204 may again establish communication (e.g., via an NFC signal) with one or more of the sensing nodes 202, for example, for the purpose of verifying and/or error-checking the data received from the sensing nodes 202, receiving or retrieving additional data, sending one or more commands to the sensing nodes 202, or combinations thereof.

Alternatively, in an embodiment, while being communicated downward through a sufficient portion of the wellbore 114 (e.g., the casing string 190) to communicate with each of the sensing nodes from which data is to be collected, the first logging node 204 may transition to a "wake" or active mode. Additionally, while being communicated upwardly through the wellbore 114, the first logging node 204 may establish communication (e.g., via an NFC signal) with one or more of the sensing nodes 202, for example, for the purpose of verifying and/or error-checking the data received from the sensing nodes 202, receiving or retrieving data, sending one or more commands to the sensing nodes 202 (e.g., a "sleep" command), or combinations thereof. Alternatively, while being communicated downward through a sufficient portion of the wellbore 114 (e.g., the casing string 190) to communicate with each of the sensing nodes from which data is to be collected, the first logging node 204 may establish communication (e.g., via an NFC signal) with one or more of the sensing nodes 202, for example, for the purpose of receiving or retrieving data. Additionally, while being communicated upwardly through the wellbore 114, the first logging node 204 may transition to a "sleep" or idle mode.

For example, in the embodiment of FIG. 3, as the first logging node 204 moves upwardly through the wellbore 114, the first logging node 204 may come into signal communication with the second logging node 206. In an embodiment, as the first logging node 204 comes into communication with the second logging node 206, one of the first or second logging nodes, 204 and 206, may initiate communication (e.g., via an NFC signal) with the other. Upon establishing communication, the first logging node 204 may upload at least a portion of the data stored on the first logging node 204 (e.g., data obtained from the sensing nodes 202a, 202b, and/or 202c) to the second logging node 206. Additionally, in an embodiment there may be a plurality of logging nodes configured to carry out the functions of the second logging node, for example, disposed along the wellbore 114 over a given length, for example, so as to allow a greater quantity of data to be exchanged as the first logging node 204 transits upwardly through the wellbore 114.

In an alternative embodiment, for example, in an embodiment where an additional logging node (such as the second logging node 206) is absent, the first logging node 204 may be communicated upwardly through the wellbore 114 and removed from the wellbore 114. The data stored on the first logging node 204 may be downloaded to another device, (e.g., a computer or other data processor, a data storage device, a long-range data transmission device, etc.). Alternatively, the data may be stored onto a removable removable device (e.g., a flash drive, an SD card).

In an embodiment, and as will be appreciated by one of skill in the art upon viewing this disclosure, the data obtained via the operation of a wellbore-information gathering system and/or method, as disclosed herein, may be employed to by a wellbore operator to monitor various portions of the wellbore and/or the subterranean formation, to optimize production from the wellbore and/or the formation, to monitor and/or verify the status of various downhole equipment, or combinations thereof.

Figure 4:
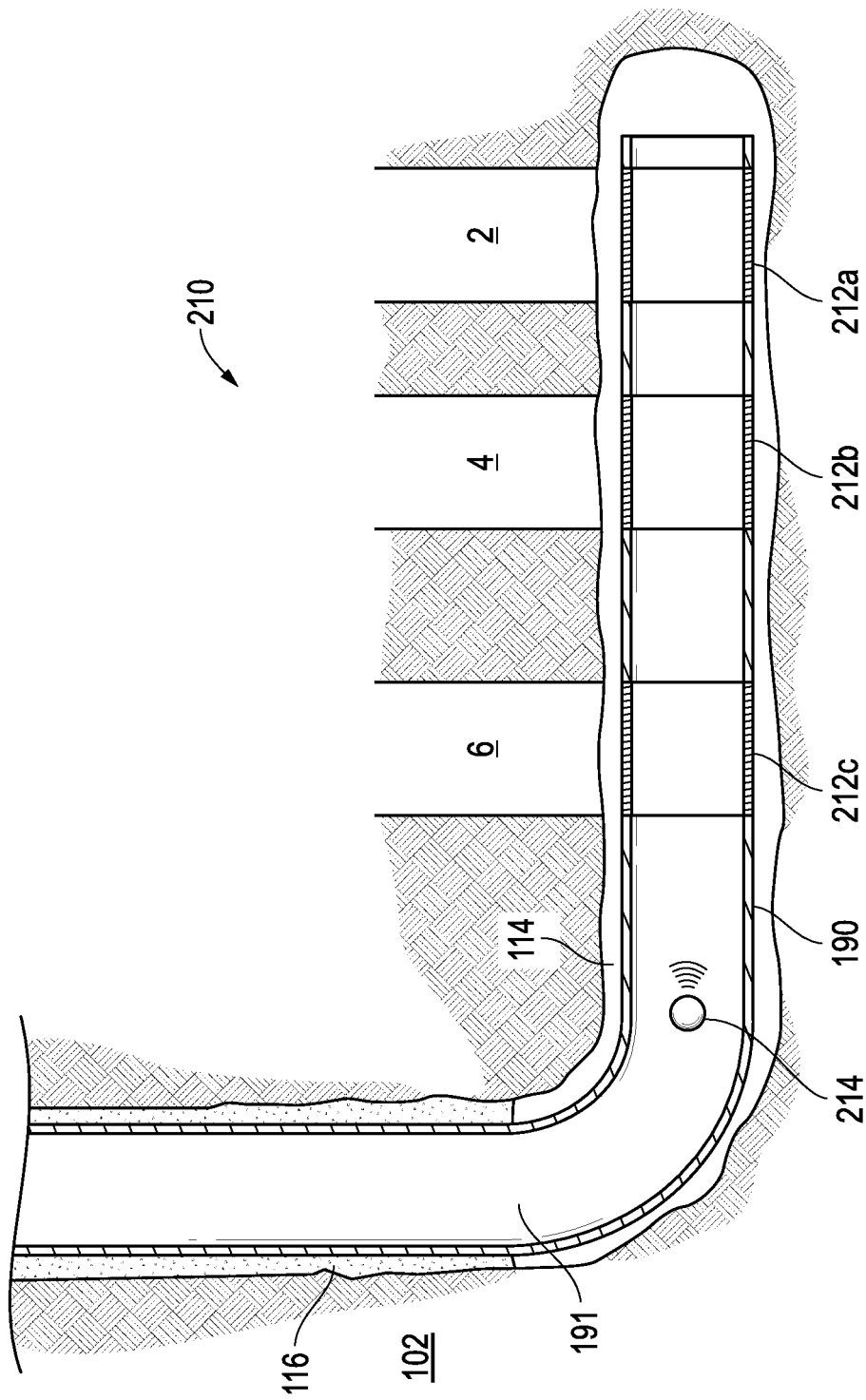

Referring to FIG. 4, another embodiment of a wellbore servicing system having at least two nodes communicating via an NFC signal is illustrated. In the embodiment of FIG. 4, the wellbore servicing system comprises a first embodiment of a wellbore stimulation system 210, for example, a first system generally configured for the stimulation of one or more zones of a subterranean formation, for example, a fracturing, perforating, hydrojetting, acidizing, or like system.

In the embodiment of FIG. 4, the first wellbore stimulation system 210 comprises one or more tool nodes 212 (particularly, tool nodes 212a, 212b, and 212c) disposed within the wellbore 114. While the embodiment of FIG. 4 illustrates an embodiment in which there are three tool nodes 212, in another embodiment any suitable number of tool nodes may be employed. In the embodiment of FIG. 4, each of the tool nodes 212 may be generally configured for the performance of a subterranean formation stimulation treatment, for example, via the selective delivery of a wellbore servicing fluid into the formation. For example, each of the tool nodes 212 may comprise an AFA as disclosed herein, such that each of the tool nodes may be selectively caused to allow, disallow, or alter a route of fluid communication between the wellbore (e.g., between the axial flowbore 191 of the casing string 190) and one or more subterranean formation zones, such as formation zones 2, 4, and 6. The tool nodes 212 may be configured to deliver such a wellbore servicing fluid at a suitable rate and/or pressure. For example, the rate of fluid communication through one or more of the tool nodes 212 may comprise a nozzle or other flow rate altering device.

In the embodiment of FIG. 4, each of the tool nodes 212 is incorporated within (e.g., a part of) of the casing string 190 and is positioned within the wellbore 114. Particularly, in the embodiment of FIG. 4, each of the tool nodes 212 is positioned within the wellbore such that each of the sensing nodes 202 is generally associated with a subterranean formation zone (particularly, one of subterranean formation zones 2, 4, and 6). In such an embodiment, each of the tool nodes 212a, 212b, and 212c, may thereby selectively communicate fluid to each of zones 2, 4, and 6, respectively. In an alternative embodiment, a tool node like tool nodes 212 may be associated with two or more zones, alternatively, two or more tool nodes may be associated with a single tool node. In another alternative embodiment, the tool nodes 212 may be incorporated within any suitable wellbore tubular, for example, a work string, coiled tubing string, jointed tubing string, drill string, the like, or combinations thereof.

Also in the embodiment of FIG. 4, the wellbore stimulation system 210 further comprises a first controller node 214. In the embodiment of FIG. 4, the first controller node 214 is generally configured to communicate one or more signals to one or more of the tool nodes 212 effective to cause one or more of the tool nodes to output a given response. In the embodiment of FIG. 4, the first controller node 214 comprises a ball, for example, such that the first controller node 214 may be communicated through the casing string 190 via the axial flowbore 191 thereof. In alternative embodiments, a controller node functionally similar to the first controller node 214 may comprise a dart, a wiper, a member incorporated within a tubing string or attached to a wire, or combinations thereof.

In an embodiment, a wellbore servicing system such as the first wellbore stimulation system 210 disclosed with respect to FIG. 4 may be employed in the performance of a wellbore servicing operation, particularly, a wellbore stimulation operation, such as a fracturing operation, a perforating operation, a hydrojetting operation, an acidizing operation, or combinations thereof. For example, such a wellbore stimulation operation may generally comprise the steps of positioning one or more tool nodes within a wellbore, communicating a controller node through the wellbore to configure one or more of the tool nodes for the communication of a wellbore stimulation fluid, communicating the wellbore stimulation fluid via the one or more tools configured for the communication of the wellbore stimulation fluid, optionally, communicating a controller node (e.g., the same or another controller node) through the wellbore to reconfigure the one or more tool nodes configured for the communication of a wellbore stimulation fluid, and, optionally, repeating the process of configuring one or more of the tool nodes, communicating a wellbore servicing fluid, and, optionally, reconfiguring the one or more of the tool nodes with respect to one or more additional tool nodes.

Referring again to FIG. 4, in an embodiment, one or more tool nodes, such as tool nodes 212 may be positioned within a wellbore, such as wellbore 114. For example, in the embodiment of FIG. 4 where the tool nodes 212 are incorporated within the casing string 190, the tool nodes 212 may be run into the wellbore 114 (e.g., positioned at a desired location within the wellbore 114) along with the casing string 190.

In an embodiment, the tool nodes 212a, 212b, and 212c may initially be positioned within the wellbore 114 in a first configuration in which the tool nodes 212 do not allow a route of fluid communication from the axial flowbore thereof (and, from the axial flowbore 191 of the casing string 190) to the proximate and/or associated subterranean formation zone, 2, 4, and 6, respectively.

In an embodiment, when it is desired to service one or more subterranean formation zones, for example, one or more of formation zones 2, 4, and/or 6, the controller node 214 may be communicated downwardly through the wellbore 114, for example, via the movement of fluid into the wellbore 114 (e.g., the forward-circulation of fluid). In an embodiment, as the controller node 214 is communicated through the wellbore 114, the controller node 214 comes into signal communication with each of the tool nodes, 212c, 212b, and 212a, respectively. In an embodiment, as the controller node 214 comes into signal communication with each of the tool nodes 212, the controller node 214 may initiate communication (e.g., via an NFC signal) with each of the tool nodes 212. Alternatively, the controller node 214 may initiate communications with one or more of the tool nodes 212.

In an embodiment, upon establishing communication (e.g., via an NFC signal) with a given tool node, 212c, 212b, or 212a, the controller node 214 may obtain the identity of such tool node 212. In an embodiment, based upon the identity of the tool node 212 with which the controller node 214 is communicating, the controller node 214 may communicate one or more commands (e.g., a data frame request, a data frame response, etc.) to the tool node 212. In an alternative embodiment, based upon the identity of the tool node 212, the controller node 214 may not communicate any command to the tool node.

In an embodiment, the one or more commands (e.g., a data frame request, a data frame response, etc.) communicated to a given tool node 212a, 212b, or 212c may be effective to elicit a response by the tool node 212. For example, in an embodiment, one or more of the commands communicated to the tool node 212 may comprise a particular command associated with a particular response by the tool node 212, for example, a command for the tool to wake, to sleep, to increment a counter, to decrement a counter, to output one or more actuating signals, or combinations thereof. Alternatively, in an embodiment the commands may not be associated with any particular response, for example, in which case the tool node 212 receiving the command may output a response not particularly associated with the command received.

In an embodiment, upon the tool node 212 receiving a command (e.g., a data frame request, a data frame response, etc.) effective to cause the tool node 212 to output an actuating signal (e.g., upon receiving a predetermined NFC signal, a predetermined quantity of NFC signals, or a predetermined combination of predetermined NFC signals), the electronic circuit within the tool node 212 may cause the tool node to output an actuating signal (e.g., an electrical voltage or current), for example, to an actuator, thereby causing the tool node 212 to transition from the first configuration (in which the tool node 212 does not allow a route of fluid communication from the axial flowbore thereof to the proximate formation zone) to a second configuration (in which the tool node 212 allows a route of fluid communication from the axial flowbore thereof to the proximate formation zone). In an embodiment, causing the tool node to be actuated may further comprise one or more additional steps, for example, applying a fluid pressure to the axial flowbore of the tool node. For example, upon the tool node 212 receiving a predetermined NFC signal, the tool node 212 may to output an actuating signal (e.g., an electrical voltage or current) to an actuator. In an embodiment, the actuator may be configured to retain a fluid within a fluid chamber and, thereby retain a sliding sleeve in a first position (e.g., a position in which does not allow a route of fluid communication from the axial flowbore thereof to the proximate formation zone via one or more ports of the tool node 212). Additionally, the actuator may be configured such that upon receiving an actuation signal, at least a portion of the fluid retained within the fluid chamber in no longer retained by the actuator and, thereby causes a sliding sleeve to transition to a second position (e.g., a position in which allows a route of fluid communication from the axial flowbore thereof to the proximate formation zone via one or more ports of the tool node 212).

In an embodiment, the controller node 214 may communicate one or more signals (e.g., one or more NFC signal, etc.) effective to cause one or more tool nodes 212 to be actuated. For example, two or more tool nodes 212 may be caused to actuate with a single controlling node 214. Also, the tool nodes 212 may be caused to actuate in any suitable, desired order. For example, the tool nodes 212 may be actuated beginning with a lower-most tool node (e.g., tool node 212a, in the embodiment of FIG. 4), followed by an intermediate tool node (e.g., tool node 212b, in the embodiment of FIG. 4) and an upper-most tool node (e.g., tool node 212c, in the embodiment of FIG. 4). Alternatively, the tool nodes 212 may be actuated in the reverse (e.g., tool node 212c, then tool node 212b, then tool node 212a). Alternatively, the tool nodes 212 may be actuated in an alternating sequence (e.g., tool node 212a, then tool node 212c, then tool node 212b).

In an embodiment, when at least one of the tool nodes 212 has been configured to communicate a wellbore servicing fluid (e.g., a formation stimulation fluid) from the axial flowbore thereof to the proximate formation zone, such a wellbore servicing fluid (e.g., a fracturing fluid, a perforating fluid, a hydrojetting fluid, the like, or combinations thereof), may be introduced into and through the axial flowbore 191 of the casing string 190, through the one or more actuated tool nodes, and into one or more zones of the subterranean formation (e.g., one or more of formation zones, 2, 4, and/or 6). The wellbore servicing fluid may be communicated at a suitable rate and/or pressure, for example, at a rate and/or pressure sufficient to initiate or extend one or more routes of fluid communication to or into the subterranean formation, for example, one or more fractures or perforations.

In an embodiment, when a desired amount of fluid has been communicated, for example, when the fractures or perforations have formed as desired, the communication of fluids may be ceased. For example, upon ceasing to communicate fluid via the one or more tool nodes 212 configured to allow a route of fluid communication from the axial flowbore thereof to the subterranean formation, the route of fluid communication via the one or more tool nodes may be blocked or obstructed, for example, such that the tool node 212 will not provide a route of fluid communication into the subterranean formation.

For example, in an embodiment blocking or obstructing the route of fluid communication through the one or more tool nodes 212 configured provide to a route of fluid communication from the axial flowbore thereof to the subterranean formation may comprise reconfiguring the one or more so-configured tool nodes 212. For example, in an embodiment, a controller node (e.g., a second controller node, like controller node 214) may be communicated downwardly through the wellbore 114 to establish communication (e.g., via an NFC signal) with each of the tool nodes 212. In an embodiment, upon establishing communication (e.g., via an NFC signal) with each of the tool nodes 212, the second controller node may identify the tool node 212 with which the second controller node is communicating, for example, so as to communicate one or more commands (e.g., a data frame request, a data frame response, etc.) based upon the identity of the tool node 212 with which it is communicating. For example, the second controller node may issue a command only to the tool nodes 212 already configured to allow a route of fluid communication from the axial flowbore thereof to the subterranean formation. In an embodiment, the second controller node may communicate one or more commands to a given tool node effective to elicit a response by the tool node 212. For example, in an embodiment the command may be effective to cause the tool node 212 to output an actuating signal (e.g., upon receiving a predetermined NFC signal, a predetermined quantity of NFC signals, or a predetermined combination of predetermined NFC signals). For example, upon the tool node 212 receiving a command, the electronic circuit of the tool node may output an actuating signal (e.g., a second actuating signal) to an actuator (e.g., a second actuator) thereby causing the tool node 212 to transition from the second configuration (in which the tool node 212 allows a route of fluid communication from the axial flowbore thereof to the proximate formation zone) to a third configuration or back to the first configuration (in either of which the tool node 212 does not allow a route of fluid communication from the axial flowbore thereof to the proximate formation zone). For example, upon the tool node 212 receiving a predetermined NFC signal, the tool node 212 may output an actuating signal (e.g., an electrical voltage or current) to an actuator. In an embodiment, the actuator may be configured such that upon receiving an actuation signal, an additional portion of the fluid retained within the fluid chamber in no longer retained by the actuator and, thereby causes a sliding sleeve to transition to a third position (e.g., a position in which no longer allows a route of fluid communication from the axial flowbore thereof to the proximate formation zone via one or more ports of the tool node 212).

Alternatively, in an embodiment blocking or obstructing the route of fluid communication through the one or more so-configured tool nodes 212 may comprise introducing an obturating member, such as a ball or dart, to engage a seat and thereby block fluid communication through at least a portion of the axial flowbore 191, deploying a plug (e.g., a mechanical plug), deploying a packer, deploying a sand plug within the formation and/or the axial flowbore 191, or combinations thereof.

In an embodiment, the process of configuring one or more of the tool nodes for the communication of a wellbore servicing fluid, communicating the wellbore servicing fluid, and, optionally, reconfiguring the one or more of the tool nodes with respect to one or more additional tool nodes may be repeated with respect to one or more additional tool nodes (e.g., with respect to one or more additional subterranean formation zones).

Additionally, in an embodiment, following the stimulation operation, a controller node may again be communicated downwardly through the wellbore and may communicated one or more signals to one or more of the tool nodes effective to cause such tool nodes to again be opened (e.g., to allow a route of fluid communication to the subterranean formation), for example, such that a fluid may be produced from the subterranean formation via such flowpath.

Figure 5:
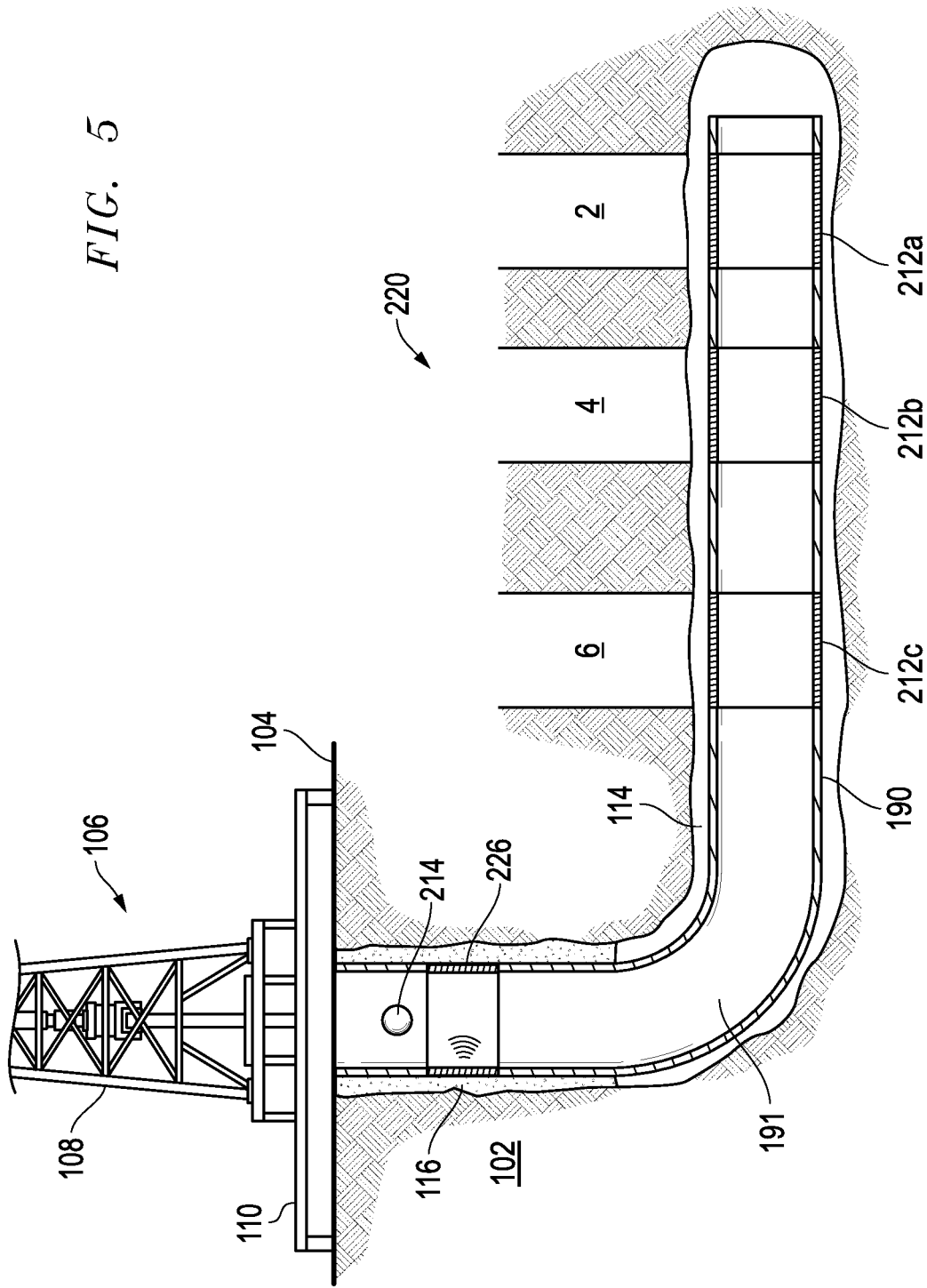

Referring to FIG. 5, another embodiment of a wellbore servicing system having at least two nodes communicating via an NFC signal is illustrated. In the embodiments of FIG. 5, the wellbore servicing system 220 comprises a second embodiment of a wellbore stimulation system 220, for example, a second system generally configured for the stimulation of one or more zones of a subterranean formation, for example, a fracturing, perforating, hydrojetting, acidizing, or like system.

In the embodiments of FIG. 5, the second wellbore stimulation system 220 comprises one or more tool nodes 212 (particularly, tool nodes 212a, 212b, and 212c) incorporated within (e.g., a part of) of the casing string 190 and disposed within the wellbore 114 proximate to one or more formation zones, such as formation zones 2, 4, and 6, for example, as in the first wellbore stimulation system 210 disclosed with respect to FIG. 4. The second wellbore stimulation system 220 also comprises a first controller node 214 as shown in FIG. 5, and as in the first wellbore stimulation system 210 disclosed with respect FIG. 4.

In the embodiments of FIG. 5, the second wellbore stimulation system 220 further comprises a second controller node 226. In the embodiments of FIG. 5, the second controller node is generally configured to communicate one or more NFC signals to one or more other nodes, particularly, one or more other controller nodes, such as the first controller node 214 of FIG. 5, effective to cause one or more of the other controller nodes (e.g., the first controller node 214) to output a given response. In the embodiments of FIG. 5, the second controller node 226 is incorporated within the casing string 190 at a location uphole relative to the tool nodes 212 (e.g., uphole from the "heel" of the wellbore 114, alternatively, substantially near the surface 104). In an embodiment, the second controller node 226 may be in signal communication with one or more components located at the surface (e.g., a computer or other data processor, a data storage device, a long-range data transmission device, etc.), for example, via a wired or other suitable connection. In an embodiment, the second controller node 226 may comprise and/or be incorporated with a casing collar.

In an embodiment, a wellbore servicing system such as the second wellbore stimulation system 220 disclosed with respect to FIG. 5 may be employed in the performance of a wellbore servicing operation, particularly, a wellbore stimulation operation, such as a fracturing operation, a perforating operation, a hydrojetting operation, an acidizing operation, or combinations thereof. In an embodiment, such a wellbore stimulation operation may generally comprise the steps of positioning one or more tool nodes within a wellbore, communicating a controller node through the wellbore to configure one or more of the tool nodes for the communication of a wellbore stimulation fluid, communicating the wellbore stimulation fluid via the one or more tools configured for the communication of the wellbore stimulation fluid, optionally, communicating a controller node (e.g., the same controller node or another controller node) through the wellbore to reconfigure the one or more tool nodes configured for the communication of a wellbore stimulation fluid, and, optionally, repeating the process of configuring one or more of the tool nodes, communicating a wellbore servicing fluid, and, optionally, reconfiguring the one or more of the tool nodes with respect to one or more additional tool nodes, as disclosed with reference to the first wellbore stimulation system 210 of FIG. 4. In an embodiment where the wellbore servicing method utilizes a wellbore stimulation system like the second wellbore stimulation system 220 of FIG. 5, the step of communicating a controller node (e.g., such as the first controller node 214) through the wellbore to configure one or more of the tool nodes for the communication of a fluid may comprise configuring the controller node (e.g., the first controller node 214) to communicate with one or more of the tool nodes.

For example, in the embodiment of FIG. 5, configuring the first controller node 214 to communicate with one or more of the tool nodes 212 may comprise communicating a command (e.g., a data frame request, a data frame response, etc.) or other signal (e.g., an NFC signal) from the second controller node 226 to the first controller node 214. For example, in an embodiment, as the first controller node is communicated downwardly through the axial flow bore 191 of the casing string 190 (e.g., en route to one or more of the tool nodes 212), the second controller node 226 may establish communication (e.g., via an NFC signal) with the first controller node 214 (e.g., the second controller node 226 may act as an active initiator). In an embodiment, upon establishing communication (e.g., via an NFC signal) with the first controller node 214, the second controller node 226 may obtain the identity of the first controller node 214 and, based upon the identity of the first controller node 214, the second controller node 226 may communicate one or more commands to the first control node 214. Additionally or alternatively, the commands communicated from the second controller node 226 to the first controller node 214 may be based upon any other suitable and/or relevant factors, for example, the number of other controller nodes previously communicated into or out of the wellbore 114, various wellbore parameters, or the like.

In an embodiment, the one or more commands (e.g., a data frame request, a data frame response, etc.) communicated from the second controller node 226 to the first controller node 214 may be effective to cause the first controller node 214 to begin transmissions. For example, such one or more commands may be effective to cause the first controller node 214 to enter an "awakened" mode or to "wake" from a low-power mode, for example, so as to preserve battery power.

Additionally or alternatively, such one or more commands (e.g., a data frame request, a data frame response, etc.) may be effective to program instructions into the first controller node 214. For example, such instructions may include which tool nodes 212 to actuate, which tool nodes 212 with which to communicate, which tool nodes 212 with which to not communicate, which signal(s) (e.g., NFC signals) to send to which tool nodes 212, or combinations thereof. For example, by so-programming the controller node (e.g., the first controller node 214) en route to the tool nodes 212, the operator can be assured that the wrong controller node will not be deployed (e.g., in the wrong order, for example, where multiple controller nodes are utilized).

Additionally or alternatively, such one or more commands (e.g., a data frame request, a data frame response, etc.) may be effective to convert the first controller node 214 from a passive target (e.g., operating in passive mode communication) to an active initiator. For example, such commands may be effective to cause the first controller node 214 to transition to operating via active mode communication (e.g., as an active target).

Alternatively, such one or more commands (e.g., a data frame request, a data frame response, etc.) may be effective to suspend transmissions from (or otherwise inactivate) the first controller node 214. For example, such commands may be effective to cause the first controller node 214 to not communicate any signal (e.g., an NFC signal) to any of the tool nodes 212. For example, where a first controller node 214 is inadvertently released at the surface 104 (e.g., where a controller node is released in the wrong order, where the wrong controller node is released in error, etc.), the first controller node 214 may be caused to not communicate with the tool nodes, to not communicate a command to the tool nodes, to become inactive, to sleep, or the like.

Additionally or alternatively, in an embodiment, communication between the first controller node 214 and the second controller node 226 may be utilized to verify that the first controller node 214 has been released and/or has been communicated through the casing string. In an embodiment, where such a verification is the only function to be performed, the second controller node 226 may be configured as a logging node (e.g., configured to receive a command from the first controller node 214 during communication of the first controller node 214 through the wellbore).

Figure 6:
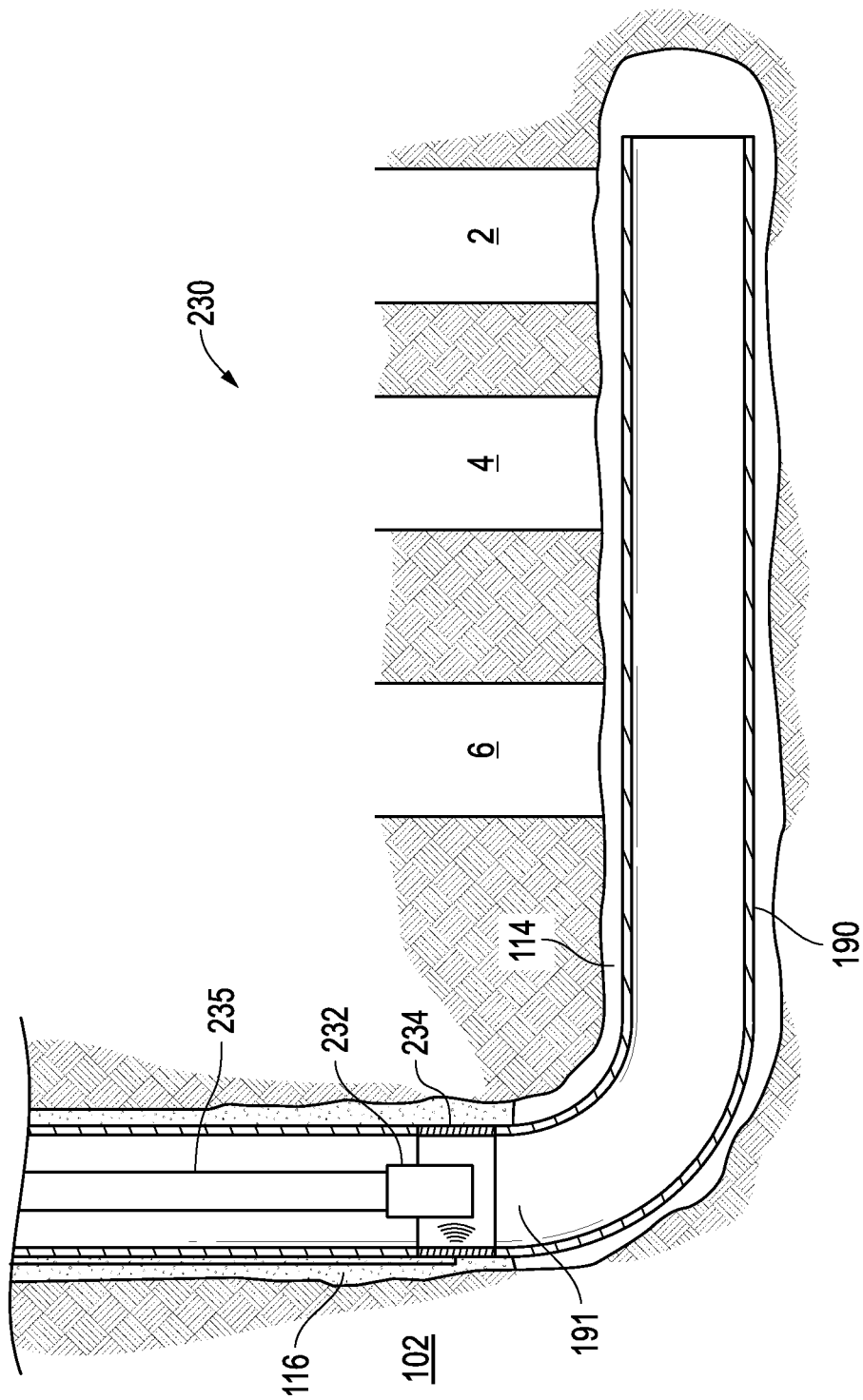

Referring to FIG. 6, another embodiment of a wellbore servicing system having at least two nodes communicating via an NFC signal is illustrated. In the embodiments of FIG. 6, the wellbore servicing system 230 comprises a third embodiment of a wellbore stimulation system 230, for example, a second system generally configured for the stimulation of one or more zones of a subterranean formation, for example, a perforating system.

In the embodiment of FIG. 6, the third wellbore stimulation system 230 comprises a tool node 232 incorporated within a work string 235 (e.g., a coiled tubing string, a jointed tubing string, or combinations thereof). Alternatively, the tool node 232 may be similarly incorporated within (e.g., attached to or suspended from) a wire or the like. In the embodiment of FIG. 6, the tool node 232 may be configured as a perforating tool, for example, a perforating gun. In such an embodiment, the tool node 232 (e.g., a perforating gun) may be configured to perforate a portion of a well and/or a tubular string (e.g., a casing string) disposed therein. For example, in an embodiment, the perforating gun may comprise a plurality of shaped, explosive charges which, when detonated, will explode outwardly into the tubular string and/or formation so as to form a plurality of perforations.

In the embodiment of FIG. 6, the third wellbore stimulation system 230 also comprises a first controller node 234. In the embodiment of FIG. 6, the first controller node 234 is incorporated within the casing string 190 at desired location within the wellbore 114. For example, various embodiments, the first controller node 234 may be located at a depth slightly above or substantially proximate to a location at which it is desired to introduce a plurality of perforations. Alternatively, the first controller node 234 may be located at any suitable depth within the wellbore 114, for example, a depth of about 100 ft., alternatively, about 250 ft., alternatively, about 500 ft., alternatively, about 750 ft., alternatively, about 1,000 ft., alternatively, about 1,500 ft., alternatively, about 2,000 ft., alternatively, about 2,500 ft., alternatively, about 3,000 ft., alternatively, about 4,000 ft., alternatively, about 5,000 ft. In an additional embodiment, a wellbore servicing system may comprise one or more additional controller nodes, like the first controller node 234, incorporated within the casing string at various locations.

In an embodiment, a wellbore servicing system such as the third wellbore stimulation system 230 disclosed with respect to FIG. 6 may be employed in the performance of a wellbore servicing operation, particularly, wellbore stimulation operation such as a perforating operation. In an embodiment, such a wellbore stimulation operation may generally comprise the steps of positioning a first controller node like the first controller node 234 within the wellbore, introducing a tool node like tool node 232 (e.g., a perforating gun) into the wellbore such that the tool node communicates with first controller node 234 and, as a result of the communication with the first controller node, becomes operable for a particular function, and operating the tool node 232.

For example, in the embodiment of FIG. 6, one or more controller nodes, such as controller node 234 may be positioned within a wellbore, such as wellbore 114. For example, in the embodiment of FIG. 6 where the controller node 234 are incorporated within the casing string 190, the controller node 234 may be run into the wellbore 114 (e.g., positioned at a desired location within the wellbore 114) along with the casing string 190.

In an embodiment, when it is desired to service, particularly, to perforate, a subterranean formation zone, for example, one or more of formation zones 2, 4, and/or 6, the tool node 232 may be run into the wellbore 114 (e.g., lowered into the wellbore), for example, suspended from a tubing string (e.g., a coiled tubing string), wire, or the like. In an embodiment, the tool node 232 may be, initially, run into the wellbore in a configuration in which the tool node 232 is inoperable to perform one or more functions. For example, in the embodiment of FIG. 6, where the tool node 232 comprises a perforating gun, the tool node 232 may be configured such that the perforating gun cannot be fired, for example, such that the explosive charges of the perforating gun cannot be detonated (e.g., the perforating gun is run-in in a "disarmed" or "safe" configuration).

In an embodiment, as the tool node 232 is run into the wellbore 114, the tool node 232 comes into signal communication with the controller node 234. In an embodiment, as the tool node 232 comes into signal communication with the controller node 234, the controller node 234 may initiate communication (e.g., via an NFC signal) with the tool node 232. Alternatively, the tool node 232 may initiate communications with the controller node 234.

In an embodiment, upon establishing communication (e.g., via an NFC signal) with the tool node 232, the controller node 234 may obtain the identity of the tool node 232. In an embodiment, based upon the identity of the tool node 232 with which the controller node 234 is communicating, the controller node 234 may communicate one or more commands (e.g., a data frame request, a data frame response, etc.) to the tool node 232. In an alternative embodiment, based upon the identity of the tool node 212, the controller node 214 may not communicate any command to the tool node.

In an embodiment, the one or more commands (e.g., a data frame request, a data frame response, etc.) communicated to the tool node 232 may be effective to elicit a response by the tool node 232. For example, in an embodiment, the one or more of the commands communicated to the tool node 232 may comprise a particular command associated with a particular response by the tool node 232, for example, a command for the tool to wake, to sleep, to increment a counter, to decrement a counter, to output one or more actuating signals, or combinations thereof. Alternatively, in an embodiment the commands may not be associated with any particular response, for example, in which case the tool node 232 receiving the command may output a response not particularly associated with the command received.

In an embodiment, the command (e.g., a data frame request, a data frame response, etc.) communicated from the controller node 234 may be effective to transition the tool node 232 from a first mode, for example, in which the tool node 232 is inoperable to perform one or more given functions, to a second mode, for example, in which the tool node is operable to perform one or more of such functions. For example, in the embodiment of FIG. 6, where the tool node comprises a perforating gun and where the perforating gun is introduced into the wellbore 114 "disarmed," (e.g., such that the explosive charges cannot be caused to detonate), the command communicated from the controller node 234 may be effective to "arm" the tool node 232 (e.g., the perforating gun), for example, to transition the tool node 232 to an active or ready mode (e.g., such that the explosive charges may be selectively detonated).

In an embodiment, after controller node 234 has communicated with the tool node 232, for example, thereby rendering the tool node 232 operable, the tool node 232 may be positioned within the wellbore 114 proximate/adjacent to the portion of the formation to be serviced (e.g., perforated). When the tool node 232 (e.g., the perforating gun) has reached the desired location within the wellbore 114, the tool node 232 may be selectively operated. For example, in the embodiment of FIG. 6 where the tool node 232 comprises a perforating gun, the perforating gun may be fired so as to form perforations in the casing string 114 and/or a portion of the subterranean formation. As such, in an embodiment, the controller node 234 may be positioned/disposed within the location such that the tool node 232 will not operate until reaching a particular (e.g., a "safe") depth/location within the wellbore 114.

In an embodiment where a system like the third wellbore servicing system 260 comprises two or more controller nodes like controller node 234, each of the controller nodes may be configured to communicate with only certain tool nodes, for example, such that a given tool node will not be "armed" until reaching a particular one or more controller nodes. Additionally, a tool node like tool node 232 may be configured such that the tool node will not be armed until communicating with a predetermined number and/or combination of controller nodes.

While the embodiment of FIG. 6 has been disclosed, generally, with reference to a perforating gun, one of skill in the art will appreciate that additionally or alternative wellbore tools (e.g., packers, sampling devices, sensors, etc.) may similarly activated upon placement within a wellbore and/or upon reaching a particular location within a wellbore, for example, via interaction with a controller node disposed therein.

Figure 7:
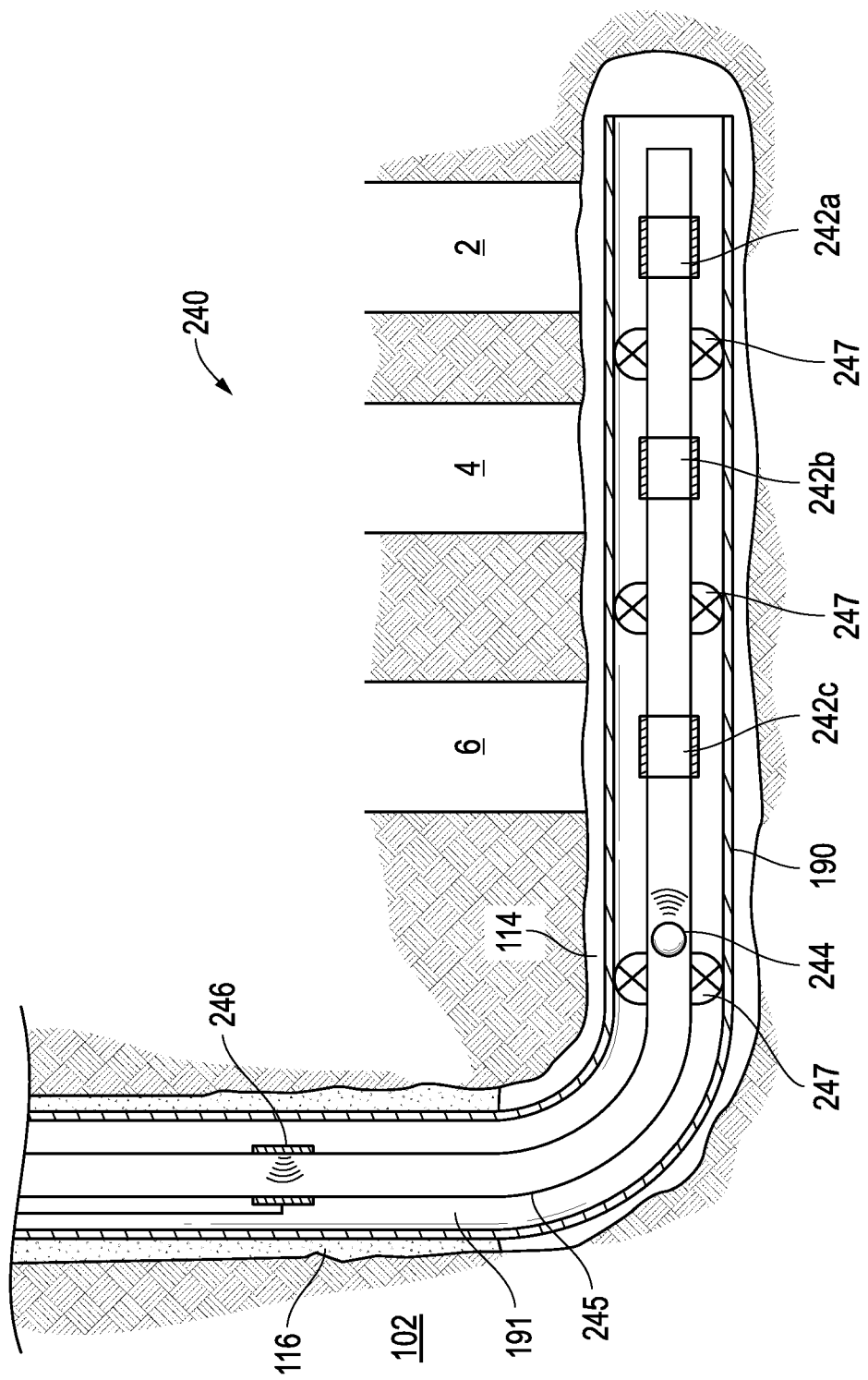
Figure 8:
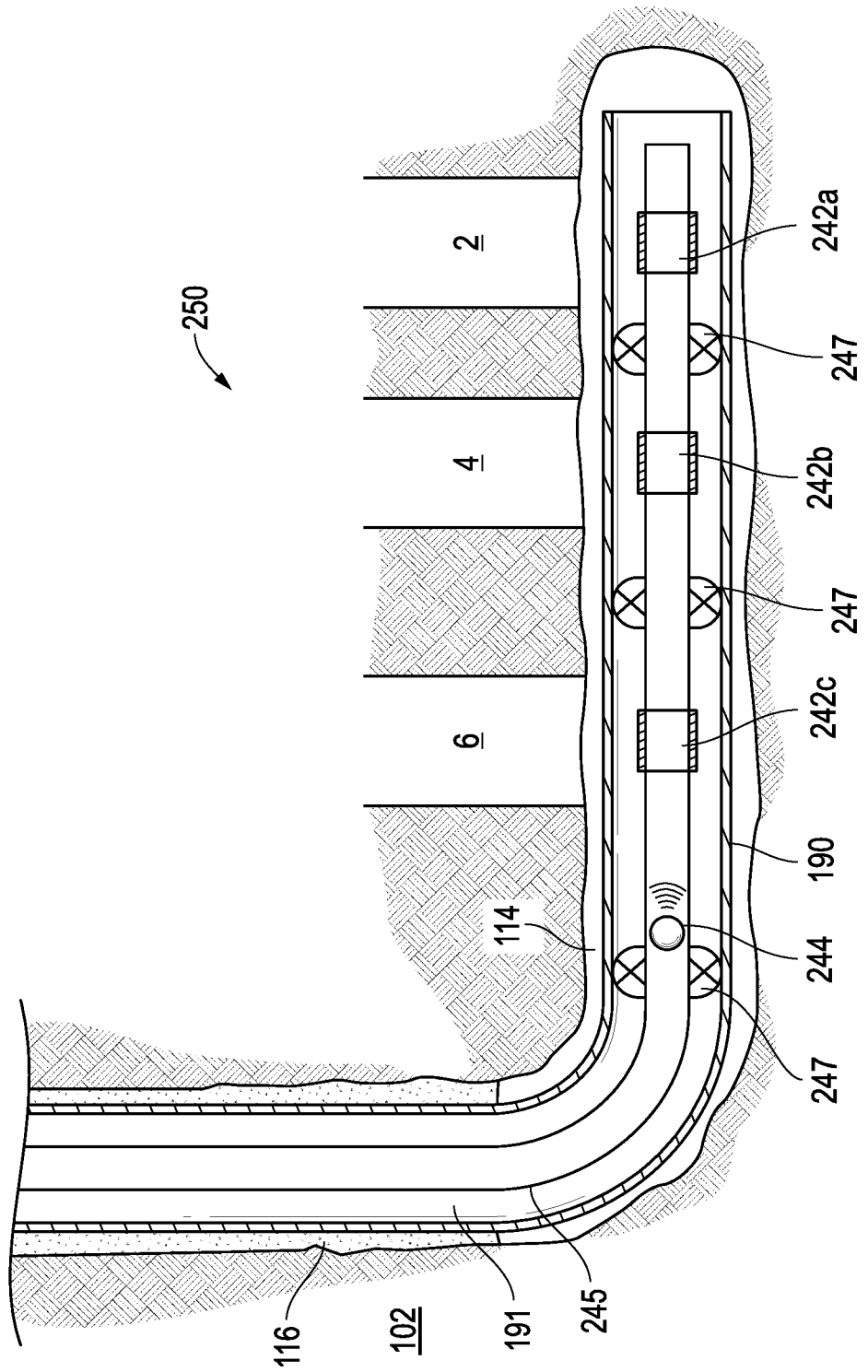

Referring to FIGS. 7 and 8, embodiments of a wellbore servicing system having at least two nodes communicating via NFC are illustrated. In the embodiment of FIGS. 7 and 8, the wellbore servicing systems each comprise a first inflow control system 240 in the embodiment of FIG. 7 and a second inflow control system 250 in the embodiment of FIG. 8. For example, both the first inflow control system 240 and the second inflow control system 250 are generally configured to gather and/or log data from within the wellbore (e.g., production data) and to control production from the wellbore (and/or one or more zones thereof) based upon the wellbore data. For example, such data may comprise data associated with the wellbore (e.g., temperature data, pressure data, flow-rate data, the presence or absence of a particular fluid or compound, or combinations thereof). For example, such data may include flow-rates (e.g., the relative flow-rate of experienced at two or more positions within the wellbore) and/or fluid compositions (e.g., the relative fluid composition at two or more positions within the wellbore). In such an embodiment, the rate of change of the fluid flow-rate and/or the fluid composition may be employed to model the formation (e.g., the producing formation) or a portion thereof, for example, so as to control the production of fluids there from based on that model, the data obtained, and/or changes in the data obtained over time.

In the embodiments of FIGS. 7 and 8, the first inflow control system 240 and the second inflow control system 250 each comprise two or more sensing, tool nodes 242 (particularly, three sensing, tool nodes 242a, 242b, and 242c) disposed within the wellbore 114. While the embodiments of FIGS. 7 and 8 illustrate embodiments in which there are three sensing, tool nodes 242, in another embodiment any suitable number of sensing, tool nodes 242 may be employed. In the embodiments of FIGS. 7 and 8 each of the sensing, tool nodes 242 may be generally configured and/or functional to obtain/measure one or more data points within the wellbore (e.g., via the operation of a transducer) and, optionally, to store that data. In an embodiment, one or more of the sensing, tool nodes 242 may additionally be configured and/or functional as a tool node, as disclosed herein. For example, each of the sensing, tool nodes 242 may also generally comprise an AFA as disclosed herein, for example, being generally configured to control (e.g., selectively) the movement (e.g., communication) of fluid therethrough, for example, to control the movement (e.g., inflow) of fluid from the formation into the sensing, tool node 242. For example, in an embodiment, the sensing, inflow control systems 240 and 250 of FIGS. 7 and 8 may be configured to maximize production from a subterranean formation or a portion thereof. Additionally or alternatively, the inflow control systems 240 and 250 may be configured to stop the movement of fluid, for example, upon the detection of one or more undesirable conditions, such as the presence of a harmful substance (e.g., hydrogen sulfide, arsenic, methane, etc.) or in the event of an over-pressuring situation.

In the embodiment of FIGS. 7 and 8, each of the sensing, tool nodes 242 is incorporated within (e.g., a part of) of a production string 245 positioned within the casing string 190. Particularly, in the embodiment of FIGS. 7 and 8, the production string 245 is positioned and/or secured within the axial flowbore 191 of the casing string 190 such that each of the sensing, tool nodes 242 is generally associated with a subterranean formation zone (particularly, one of subterranean formation zones 2, 4, and 6). In such an embodiment, each of the sensing, tool nodes 242a, 242b, and 242c, may be thereby selectively configured to allow fluid to flow into the production string 245. In an embodiment, the production string 245 may be secured via one or more production packers 247. Additionally, the production packers 247 may be actuated or set via an NFC signal, as will be disclosed herein.

Also in the embodiments of FIGS. 7 and 8, the first inflow control system 240 and the second inflow control system 250 each comprise a first logging, controller node 244. In the embodiments of FIGS. 7 and 8, the first logging, controller node is generally configured to retrieve and/or receive data from the one or more sensing, tool nodes 242, particularly, sensing, tool nodes 242a, 242b, and 242c. Also in the embodiments of FIGS. 7 and 8, the first logging, controller node 244 is generally configured to communicate one or more NFC signals to one or more of the sensing, tool nodes 242 effective to cause one or more of the sensing, tool nodes 242 to output a given response. In the embodiments of FIGS. 7 and 8, the first logging, controller node 244 comprises a ball, for example, such that the first logging, controller node 244 may be communicated through the production string 245. Alternatively, the first logging, controller node 244 may comprise any suitable type or configuration.

In the embodiment of FIG. 7, the first inflow control system 240 further comprises a second logging, controller node 246. In the embodiment of FIG. 7, the second logging, controller node 246 is generally configured to retrieve and/or receive data from the one or more other nodes, particularly, the first logging, controller node 244. The second logging, controller node 246 is also generally configured to communicate one or more NFC signals to one or more other nodes, particularly, one or more other logging, controller nodes, such as the first logging, controller node 244, effective to cause one or more of the other controller nodes (e.g., the first logging, controller node 244) to output a given response. In the embodiment of FIG. 7, the second logging, controller node 246 is incorporated within the production string 245 at a location uphole relative to the sensing, tool nodes 242 (e.g., uphole from the "heel" of the wellbore 114, alternatively, substantially near the surface 104). In an embodiment, the second logging, controller node 246 may be in signal communication with one or more components located at the surface (e.g., a computer or other data processor, an operator input device, a long-range data transmission device, etc.), for example, via a wired or other suitable connection.

In an embodiment, a wellbore servicing system, such as the first inflow control system 240 and/or the second inflow control system 250 may be employed in the performance of a wellbore servicing operation, for example, the production of formation fluids from the subterranean formation associated with the wellbore. For example, in such an embodiment, the first inflow control system 240 and/or the second inflow control system 250 may be utilized to optimize (e.g., maximize) production of formation fluids from the wellbore utilizing data obtained from two or more of the sensing, tool nodes 242 to control the operation of one or more of the sensing, tool nodes 242. In such an embodiment, such a wellbore servicing operation may generally comprise positioning a production string within the wellbore 114 and communicating the first logging, controller node 244 through the work string 245.

Referring again to FIGS. 7 and 8, in an embodiment, one or more sensing, tool nodes 242 may be positioned within the wellbore 114, for example, as a part of a production string such as production string 245. For example, in the embodiment of FIGS. 7 and 8, where the sensing, tool nodes 242 are incorporated within the production string 245, the tool nodes 242 may be run into the wellbore 114 (e.g., positioned at a desired location within the wellbore 114) along with the production string 245 and secured into position within the casing string 190. In an embodiment where production string 245 is secured with one or more production packers 247, the production packers 247 may be actuated by an NFC signal. For example, as the first logging, controller 244 node is communicated downwardly through the wellbore 114, the production packers 247 may come into signal communication with and receive an NFC signal from the first logging, controller node 244. As such, the production packer 247 may actuate or set in response to the received NFC signal.

In an embodiment, the sensing, tool nodes 242 may begin collecting data immediately upon placement within a wellbore 114, for example, the sensing, tool nodes 242 may be placed within the wellbore in an active state. In an alternative embodiment, the sensing, tool nodes may be placed within the wellbore in an inactive state, for example, where the sensing, tool nodes do not perform any data-collection function until activated. For example, in an embodiment, after positioning the sensing, tool nodes within the wellbore 114, a controller node may be used to transition the sensing nodes to low-power mode (e.g., to "sleep"), to transition the sensing nodes to an active mode (e.g., to "wake"), or the like.

In the embodiment of FIG. 7, with the production string 245 positioned within the wellbore 114, the first logging, controller node 244 may be communicated downwardly through the production string 245, for example, via the movement of fluid into the wellbore 114 (e.g., the forward circulation of fluid). As the first logging, controller node 244 is communicated through the work string 245, the first logging, controller node 244 comes into signal communication with the second logging, controller node 246. In an embodiment, as the first logging, controller node 244 comes into signal communication with the second logging, controller node 246, the first logging, controller node 244 and the second logging, controller node 246 may establish communication (e.g., via an NFC signal).

In an embodiment, upon establishing communication (e.g., via an NFC signal) between the first logging, controller node 244 and the second logging, controller node 246, the second controller node 246 may communicate one or more commands (e.g., a data frame request, a data frame response, etc.) to the first logging, controller node 244. In such an embodiment, the one or more commands communicated from the second logging, controller node 246 may be effective to program instructions into the first logging, controller node 244. For example, such instructions may include programming instructions for one or more of the sensing, tool nodes 242, for example, instructions as to optimization of one or more of the sensing, tool nodes.

Also in the embodiment of FIG. 7, as the first logging, controller node 244 continues to be communicated downwardly through the production string 245, the first logging, controller node 244 comes into signal communication with one or more of the sensing, tool nodes 242 (e.g., sensing, tool nodes 242a, 242b, and 242c). In an embodiment, as the first logging, controller node 244 comes into signal communication with the sensing, tool nodes 242, the first logging, control node 244 may establish communication with and obtain the identity of the sensing, tool node 242 with which it is communicating and, based upon the identity of the sensing, tool node 242, communicate one or more commands (e.g., a data frame request, a data frame response, etc.) to the sensing, tool node 242. For example, in an embodiment, the commands sent to a sensing, tool node 242 may be dependent upon and specific to the sensing, tool node involved in the communication. In an embodiment, the commands sent to sensing, tool nodes 242 may be effective to cause the sensing, tool nodes to alter a route of fluid communication therethrough (for example, to open, close, increase the flow-rate through, or decrease the flow-rate through a fluid pathway into or out of the sensing, tool node 242, for example, as AFA, as disclosed herein).

Also, in an embodiment, upon establishing communication with one or more of the sensing, tool nodes 242 (e.g., sensing, tool nodes 242a, 242b, and 242c) the first logging, control node 244 may receive and/or retrieve and store at least a portion of the data residing with a given sensing, tool node 242 (e.g., data associated with the flow of fluids through that sensing, tool node).

In an embodiment, downward communication of the first logging, control node 244 may continue at least until the first logging, control node has been transmitted through a sufficient portion of the wellbore 114 (e.g., the production string 245) to communicate with each of the sensing, tool nodes 242 to which a command is to be communicated and/or from which data is to be collected.

In an embodiment, after the first logging, control node 244 has collected data from and/or sent data to each desired sensing, tool node 242, the first logging, control node 244 may be removed from the wellbore 114. For example, in an embodiment, the first logging, control node 244 may be carried upwardly through the wellbore via the movement of a produced fluid or a reverse-circulated fluid.

In an embodiment, as the first logging, control node 244 moves upwardly through the production string 245, the first logging, control node 244 may again come into signal communication with, and establish communication with, one or more of the sensing, tool nodes 242, and may again send commands to the sensing, tool nodes 242 and/or collect obtain data from the sensing, tool nodes 242.

In the embodiment of FIG. 7, as the first logging, control node 244 continues to move upwardly through the production string 245, the first logging, control node 244 may again come into signal communication with, and establish communication with, the second logging, control node 246. In an embodiment, upon establishing communication with the second logging, control node 246, the first logging, control node 244 may upload at least a portion of the data stored on the first logging, control node 244 (e.g., data obtained from the sensing, tool nodes 242) to the second logging node 246. In an embodiment, the data uploaded from the first logging, control node 246 to the second logging, control node may be transmitted to a data processor (e.g., at the surface). Also, in an embodiment, the data may be employed to model adjustments to one or more of the sensing, tool nodes 242, to optimize total production from the wellbore 114 by adjusting the flow-rate allowed by one or more of the sensing, tool nodes 242 and/or the flow-restriction imposed by one or more of the sensing, tool nodes 242, to optimize production from one or more zones of the subterranean formation by adjusting one or more of the sensing, tool nodes 242, or combinations thereof. For example, such goals may be effective to maintain consistent fluid and/or flow properties across multiple zones of a formation, to maximize the time until breakthrough occurs (e.g., as based on a reservoir model), to maximize total fluid (e.g., oil) recovery from the reservoir, or combinations thereof.

In an embodiment, when it is determined that adjustments to one or more of the sensing, tool nodes 242 are desired, for example to optimize production based on the data obtained from the sensing, tool nodes 242 by way of the first logging, controller node 244, another logging, controller node (like the first logging, controller node 244) may be communicated downwardly through the wellbore 114 to again communicate one or more commands (e.g., a data frame request, a data frame response, etc.) to one or more of the sensing, tool nodes 242 and/or to obtain updated data from one or more of the sensing, tool nodes 242. In such an embodiment, the first inflow control system 240 may thereby be utilized to control flow through each of the sensing, tool nodes 242 so as to optimize production.

For example, as the first logging, controller node 244 is communicated downwardly through the wellbore 114, the first logging, controller node 244 may measure (e.g., via one or more transducers) and/or receive (e.g., via the second logging, controller 246, the sensing, tool 242, etc.) optimization data, for example, data employed for well tool setting optimization. In such an embodiment, the first logging, controller node 244 may process and/or perform one or more calculations on the optimization data and, thereby determine or generate optimized settings (e.g., for a well tool). As such, the first logging, controller node 244 may communicate the optimized settings (e.g., via an NFC signal) to one or more of the sensing, tool nodes 242, for example, for the purpose of adjusting one or more well tools (e.g., one or more sensing, tools 242). Additionally, in an embodiment, the process of obtaining optimization data, generating optimized settings, and communicating the optimized settings via an NFC signal may be repeated in multiple iterations, for example, at suitable time intervals (e.g., weekly, monthly, yearly, etc.).

Alternatively, in the embodiment of FIG. 8, each of the sensing, tool nodes 242 is controlled as a part of a distributed hierarchic control system. For example, in the embodiment of FIG. 8, each of the sensing, tool nodes 242 is configured to automatically control fluid flow therethrough (e.g., inflow of a produced fluid) based upon the data sensed by that particular sensing, tool node 242 and based upon data obtained from one or more other sensing, tool nodes 242. For example, in such an embodiment, upon being communicated through the wellbore (e.g., through the production string 245) the first logging, controller node 244 may be configured to receive and/or retrieve and store at least a portion of the data residing with a given sensing, tool node 242 (e.g., sensing, tool node 242c).

As the first logging, controller node 244 continues to be communicated downwardly through the production string 245, the first logging, controller node 244 also obtains data from other sensing, tool nodes 242 (e.g., sensing, tool nodes 242b and 242a) and shares at least a portion of the data obtained from a given sensing, tool node 242 (e.g., sensing, tool node 242c) with other sensing, tool nodes 242 (e.g., sensing, tool nodes 242b and 242a). Likewise, as the first logging, control node 244 is returned upwardly through the production string 245, the first logging, control node 244 may continue to obtain data from various sensing, tool nodes 242 and to share that data with other sensing, tool nodes 242.

In an embodiment, upon receiving the data from another sensing, tool node 242, a given sensing, tool node 242 may be configured to control (e.g., alter, manipulate, increase, decrease, open, close, choke, etc.) a least one route of fluid communication therethrough (e.g., a route of fluid communication extending between the axial flowbore thereof and the subterranean formation). As such, the second inflow control system 250 may thereby be utilized to control flow through each of the sensing, tool nodes 242 so as to optimize production, for example, as a part of a distributed control system.

Figure 9:
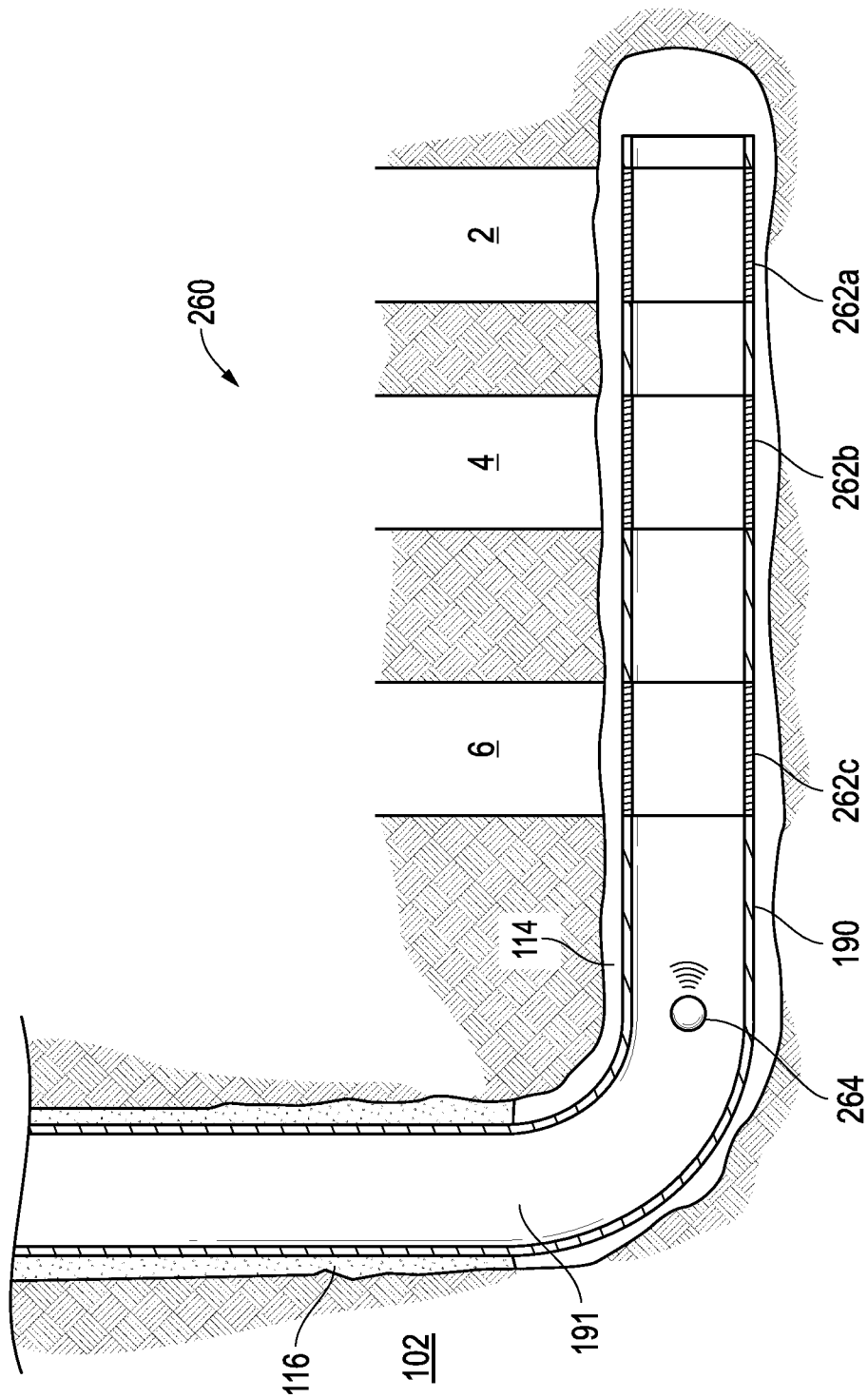

Referring to FIG. 9, another embodiment of a wellbore servicing system having at least two nodes communicating via an NFC signal is illustrated. In the embodiment of FIG. 9 the wellbore servicing system comprises an embodiment of a wellbore stimulation and feedback system 260, for example, a system generally configured for the stimulation of one or more zones of a subterranean formation, for example, a fracturing, perforating, hydrojetting, acidizing, or like system, and also configured to obtain various data related to the operation/function of one or more of the tools employed as a part of the system, the stimulation operation, or combinations thereof.

In the embodiment of FIG. 9, the wellbore stimulation and feedback system 260 comprises one or more sensing, tool nodes 262 (particularly, sensing, tool nodes 262a, 262b, and 262c) disposed within the wellbore 114. While the embodiment of FIG. 9 illustrates an embodiment in which there are three sensing, tool nodes 262, in another embodiment any suitable number of sensing, tool nodes 262 may be employed. In the embodiment of FIG. 9, each of the sensing, tool nodes 262 may be generally configured for the performance of a subterranean formation stimulation treatment, for example, via the selective delivery of a wellbore servicing fluid into the formation. For example, each of the sensing, tool nodes 262 may comprise an AFA as disclosed herein, such that each of the sensing, tool nodes may be selectively caused to allow, disallow, or alter a route of fluid communication between the wellbore (e.g., between the axial flowbore 191 of the casing string 190) and one or more subterranean formation zones, such as formation zones 2, 4, and 6. The sensing, tool nodes 262 may be configured to deliver such a wellbore servicing fluid at a suitable rate and/or pressure.

Also, in the embodiment of FIG. 9, each of the sensing, tool nodes 262 may also be generally configured and/or functional to obtain/measure one or more data points associated with the wellbore (such as temperature, pressure, flow rate, pressure drop, or the like), data associated with the sensing, tool node itself (such as the position and/or configuration of the tool node, the mode of the tools, a log of the activities of the tool, the amount of power remaining in any associated power supply, the health of the tool node and/or one or more components of the tool). The sensing, tool node 262 may also be configured to store that data and/or to output an NFC signal (e.g., one or more data frames) indicative of all or a portion of that data.

Also in the embodiment of FIG. 9, the wellbore stimulation and feedback system 260 further comprises a logging, controller node 264. In the embodiment of FIG. 9, the logging, controller node 264 is generally configured to retrieve and/or receive data from the one or more sensing, tool nodes 262, particularly, sensing, tool nodes 262a, 262b, and 262c. Also in the embodiment of FIG. 9, the logging, controller node 264 is generally configured to communicate one or more NFC signals to one or more of the sensing, tool nodes 262 effective to cause one or more of the sensing, tool nodes 262 to output a given response. In the embodiment of FIG. 9, the logging, controller node 264 comprises a ball, for example, such that the logging, controller node 264 may be communicated through the casing string 190. Alternatively, the logging, controller node 264 may comprise any suitable type or configuration.

In an embodiment, a wellbore servicing system such as the wellbore stimulation and feedback system 260 disclosed with respect to FIG. 9 may be employed in the performance of a wellbore servicing operation, for example, a wellbore stimulation operation, such as a fracturing operation, a perforating operation, a hydrojetting operation, an acidizing operation, or combinations thereof. In an embodiment, and as similarly disclosed with reference to the first wellbore stimulation system 210 of FIG. 4, such a wellbore stimulation operation may generally comprise the steps of positioning one or more sensing, tool nodes within a wellbore, communicating a controller node (e.g., the same or another controller node) (alternatively, a logging, controller node) through the wellbore to configure one or more of the sensing, tool nodes for the communication of a wellbore stimulation fluid, communicating the wellbore stimulation fluid via the one or more sensing, tool nodes configured for the communication of the wellbore stimulation fluid, optionally, communicating a controller node (alternatively, a logging controller node) through the wellbore to reconfigure the one or more sensing, tool nodes configured for the communication of a wellbore stimulation fluid, and, optionally, repeating the process of configuring one or more of the sensing, tool nodes, communicating a wellbore servicing fluid, and, optionally, reconfiguring the one or more of the sensing, tool nodes with respect to one or more additional sensing, tool nodes.

Additionally, in the embodiment of FIG. 9, the wellbore stimulation operation may further comprise the step of obtaining data from one or more of the sensing, tool nodes 262. For example, in an embodiment, obtaining data from one or more of the sensing, tool nodes 262 may comprise verifying the configuration of a sensing, tool node 262. For example, in such an embodiment, upon transitioning from a first configuration to a second configuration (alternatively, from a second configuration to a third configuration, etc.) a sensing, tool node 262 (alternatively, a tool node), may be configured to output an NFC signal indicating that the sensing, tool node 262 has been so-configured (e.g., that the sensing, tool node 262 has transitioned from one configuration to another). For example, in an embodiment, the electronic circuit of a node 262 may be configured to communicate a given NFC signal upon outputting an actuating signal to one or more actuators. Alternatively, in an embodiment the sensing, tool node may comprise one or more transducers capable of detecting the relative movement of one or more components of the sensing, tool node (e.g., the movement of a sliding sleeve from a first position to a second position relative to a housing, for example, upon movement, the sliding sleeve completes a circuit enabling an NFC signal to be communicated). Alternatively, in an embodiment the sensing, tool node may be configured such that movement of one or more components of the sensing, tool node relative to another component of the sensing, tool node (e.g., the movement of a sliding sleeve from a first position to a second position relative to a housing) may cause one or more additional signaling members (e.g., NFC targets) to become "visible" (alternatively, "invisible") to the logging, controller node 264, for example, thereby indicating that the sensing, tool node 262 has been so-configured (e.g., that the sensing, tool node 262 has transitioned from one configuration to another). Additionally, in an embodiment, multiple NFC targets could be similarly employed to determine the degree of actuation of a given tool.

In additional or alternative embodiments, obtaining data from one or more of the sensing, tool nodes 262 may comprise receiving and/or retrieving data captured by the sensing, tool nodes 262. In an embodiment, such data may comprise data associated with the wellbore (e.g., temperature data, pressure data, flow-rate data, or combinations thereof), data associated with one or more tools (e.g., tool nodes, as disclosed herein) within the wellbore (e.g., tool status, tool power availability, tool configuration, etc.), or combinations thereof. Additionally, in an embodiment, the data may comprise data associated with a servicing operation. For example, in an embodiment, a sensing, tool node may be utilized to capture data about flow rate, pressure, the effect on the formation (e.g., fracture extension), acoustic data, or the like.

While these systems and methods are disclosed with respect to a stimulation operation, a downhole tool capable of obtaining (e.g., recording) data and later conveying that data may be similarly utilized in various other wellbore servicing operations.

Figure 10:
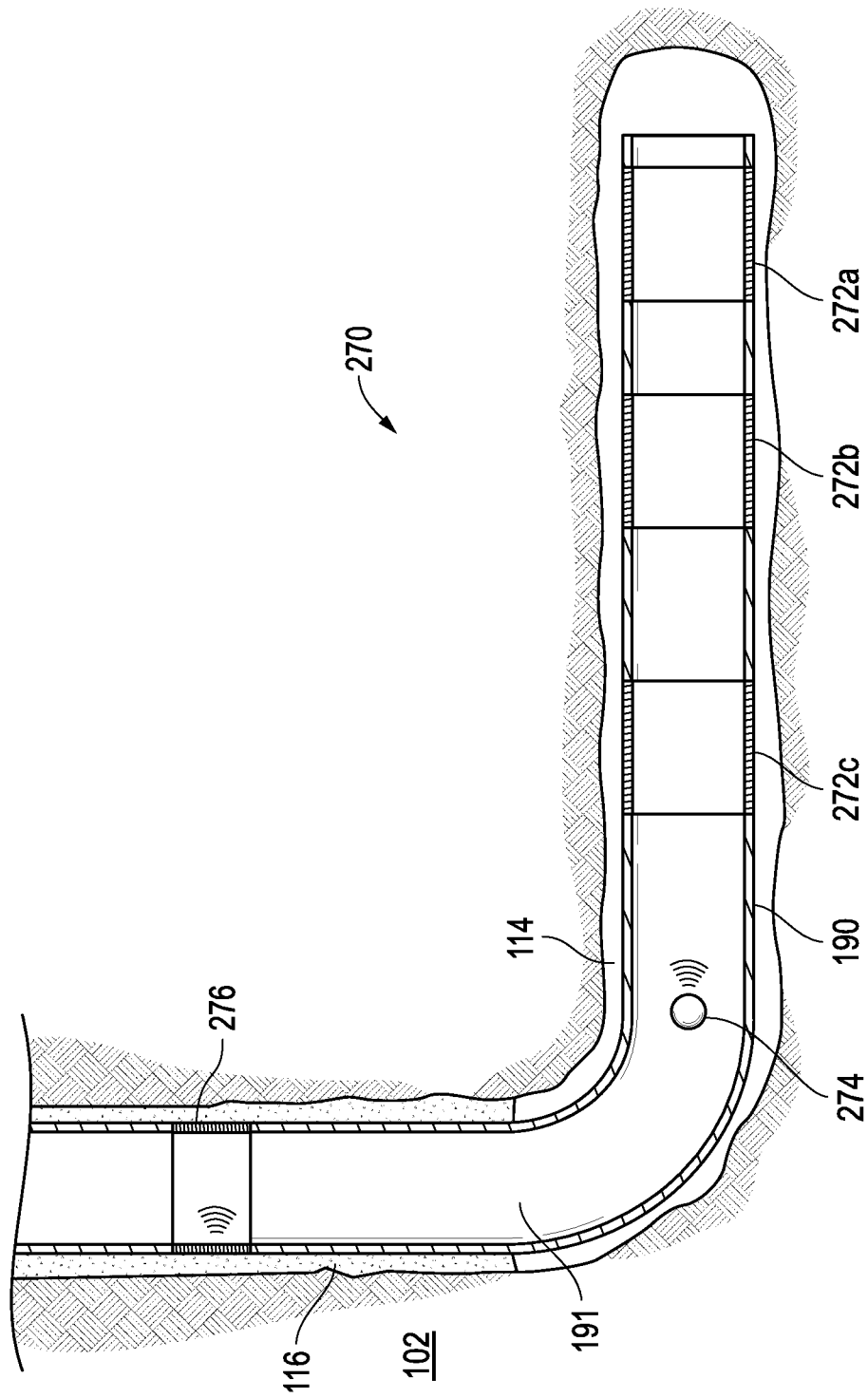

Referring to FIG. 10, another embodiment of a wellbore servicing system having at least two nodes communicating via an NFC signal is illustrated. In the embodiment of FIG. 10, the wellbore servicing system comprises a wellbore sensing system 270, for example, a system generally configured to gather and/or log data from within the wellbore. For example, such data may comprise data associated with the wellbore (e.g., temperature data, pressure data, flow-rate data, or combinations thereof), data associated with one or more tools (e.g., nodes) within the wellbore (e.g., toll status, tool power availability, tool configuration, etc.), or combinations thereof.

In the embodiment of FIG. 10, the wellbore sensing system 270 comprises a transitory sensing node 274 and one or more tool nodes 272 (particularly, three tool nodes, 272a, 272b, and 272c) disposed within the wellbore 114. While the embodiment of FIG. 10 illustrates an embodiment in which there are three tool nodes 272, in another embodiment any suitable number of tool nodes may be employed. In an embodiment, one or more of the nodes 272 may additionally or alternatively be configured and/or functional as a logging node, a controller node, a sensing node, or any combinations thereof. For example, in such an embodiment, such nodes may be further configured to output an NFC signal indicating the position and/or configuration of the tool node, the mode of the tools, a log of the activities of the tool, the amount of power remaining in any associated power supply, the health of the tool node (and/or one or more components of the tool), or combinations thereof.

In the embodiment of FIG. 10, each of the tool nodes 272 is incorporated within (e.g., a part of) the casing string 190 and is positioned within the wellbore 114. In an embodiment, each of the tool nodes 272 is positioned within the wellbore such that each of the tool nodes 272 is generally associated with a subterranean formation zone. In such an embodiment, each of the tool nodes 272a, 272b, and 272c, may thereby obtain and/or comprise data relevant to or associated with each of zones, respectively.

Also in the embodiment of FIG. 10, the wellbore sensing system 270 comprises a transitory sensing node 274. In the embodiment of FIG. 10, the transitory sensing node 274 is generally configured to retrieve and/or receive data from the one or more tool nodes 272, particularly, tool nodes 272a, 272b, and 272c, to obtain/measure one or more data points within the wellbore 114 (e.g., via the operation of a transducer), and optionally, to store that data. In the embodiment of FIG. 10, the transitory sensing node 274 comprises a ball, for example, such that the transitory sensing node 274 may be communicated through the casing string 190 via the axial flowbore 191 thereof. In alternative embodiments, a logging node functionally similar to the transitory sensing node 274 may comprise a dart, a wiper, a member incorporated within a tubing string or attached to a wire, or combinations thereof.

Also in the embodiment of FIG. 10, the wellbore sensing system 270 further comprises a logging node 276. In the embodiment of FIG. 10, the logging node 276 is generally configured to transmit and/or receive data from the transitory sensing node 274. In the embodiment of FIG. 10, the logging node 276 is incorporated within the casing string 190 at a location uphole relative to the tool nodes 272 (e.g., uphole from the "heel" of the wellbore 114, alternatively, substantially near the surface 104). Alternatively, a logging node may be positioned at the surface (e.g., not within the wellbore). In an embodiment, the logging node 276 may be in signal communication with one or more components located at the surface (e.g., a computer or other data processor, a data storage device, a long-range data transmission device, etc.), for example, via a wired or other suitable connection. In an alternative embodiment, an additional logging node (such as the logging node 276) need not be present as a part of the wellbore sensing system.

In an embodiment, a wellbore servicing system such as the wellbore sensing system 270 disclosed with respect to FIG. 10 may be employed to gather and/or log information measured and/or obtained within the wellbore. For example, such an wellbore sensing method may generally comprise the steps of positioning one or more nodes (e.g., tool nodes, controller nodes, logging nodes, sensing nodes, etc.) within a wellbore, communicating a transitory sensing node through at least a portion of the wellbore to receive or retrieve data from one or more of the nodes, and obtaining the data from the transitory sensing node.

Referring again to FIG. 10, in an embodiment, one or more nodes, such as tool nodes 272 may be positioned within a wellbore, such as wellbore 114. For example, in the embodiment of FIG. 10 where the tool nodes 272 are incorporated within the casing string 190, the tool nodes 272 may be run into the wellbore 114 (e.g., positioned at a desired location within the wellbore 114) along with the casing string 190. In other embodiments, one or more sensing nodes may be configured to be deployed following the installation of a casing string or other tubular.

In an embodiment, a transitory sensing node 274 may begin collecting data immediately upon placement within a wellbore 114, for example, the transitory sensing node 274 may be placed within the wellbore in an active state. In an alternative embodiment, the transitory sensing nodes may be placed within the wellbore in an inactive state, for example, where the transitory sensing node(s) 274 does not perform any data-collection function until activated. In such an embodiment, the transitory sensing nodes may be activated via the operation of another node (e.g., a logging node, a controller node, etc.), as will be disclosed herein. Similarly, in an embodiment, a logging node may be used to transition the transitory sensing node to low-power mode (e.g., to "sleep"), to transition the transitory sensing nodes to an active mode (e.g., to "wake"), or the like.

In an embodiment, the transitory sensing node 274 may be introduced in the wellbore 114 (e.g., into the casing string 190) and communicated downwardly through the wellbore 114. For example, in an embodiment, the transitory sensing node 274 may be communicated downwardly through the wellbore 114, for example, via the movement of fluid into the wellbore 114 (e.g., the forward-circulation of a fluid). As the transitory sensing node 274 is communicated through the wellbore 114, the transitory sensing node 274 comes into signal communication with one or more of the tool nodes 272, for example, one or more of tool nodes 272c, 272b, and 272a, respectively. In an embodiment, as the transitory sensing node 274 comes into signal communication with each of the tool nodes 272, the transitory sensing node 274 may initiate communication (e.g., via an NFC signal) with each of the tool nodes 272 (e.g., the transitory sensing node 274 operates as an active initiator). Upon establishing communication (e.g., via the NFC signal) with a given tool node, 272c, 272b, or 272a, the transitory sensing node 274 may receive and/or retrieve and store at least a portion of the data residing with a given tool node 272 and/or may measure data from within the wellbore (e.g., via one or more transducers). For example, in an embodiment, the transitory sensing node 274 may receive data related to orientation and/or position of the transitory sensing node 274 (e.g., data related to the position of the tool node 272 within the wellbore with which the transitory sensing node 274 is communicating). Additionally or alternatively, the transitory sensing node 274 may receive data related to environmental conditions (e.g., a temperature, a pressure, a flow-rate, a magnetic field, etc.) or any other suitable data set as would be appreciated by one of ordinary skill in the art upon viewing this disclosure, and correlate/associate the measured data with the position of the tool node 272 within the wellbore. In an embodiment, the communication (e.g., via NFC) between the tool node and the transitory sensing node 274 may cause the transitory sensing node 274 to measure a certain one or more parameters and/or subset or parameters. For example, communications with different nodes at varying positions within the wellbore may cause the transitory sensing node 274 to measure or not measure certain parameters as the transitory sensing node is communicated through the wellbore.

In an embodiment, downward communication of the transitory sensing node 274 may continue at least until the transitory sensing node 274 has been transmitted through a sufficient portion of the wellbore 114 (e.g., the casing string 190) to communicate with each of the tool nodes 272 from which data is to be collected.

In an embodiment, after the transitory sensing node 274 has collected data from each desired tool node 272, the transitory sensing node 274 may be removed from the wellbore 114. For example, in an embodiment, the transitory sensing node 274 may be communicated upwardly through the wellbore 114 via the movement of fluid upwardly through the wellbore 114 (e.g., via the reverse-circulation of a fluid). Alternatively, the transitory sensing node 274 may be allowed carried upwardly through the wellbore 114 along with a formation fluid being produced via the wellbore 114 (e.g., a produced fluid).

In an embodiment, as the transitory sensing node 274 passes each of the tool nodes 272 again, the transitory sensing node 274 may again establish communication (e.g., via an NFC signal) with one or more of the tool nodes 272, for example, for the purpose of verifying and/or error-checking the observed data, receiving or retrieving additional data, sending one or more commands to the tool nodes 272, or combinations thereof.

Alternatively, in an embodiment, while being communicated downward through a sufficient portion of the wellbore 114 (e.g., the casing string 190) to collect data, the transitory sensing node 274 may "wake" or transition to an active mode. Additionally, while being communicated upwardly through the wellbore 114, the transitory sensing node 274 may establish communication (e.g., via an NFC signal) with one or more of the tool nodes 272, for example, for the purpose of verifying and/or error-checking the data received from the tool nodes 272, receiving or retrieving data, sending one or more commands to the tool nodes 272, or combinations thereof. Alternatively, while being communicated downward through a sufficient portion of the wellbore 114 (e.g., the casing string 190) to communicate with each of the tool nodes from which data is to be collected, the transitory sensing node 274 may establish communication (e.g., via an NFC signal) with one or more of the tool nodes 272, for example, for the purpose of receiving or retrieving data. Additionally, while being communicated upwardly through the wellbore 114, the transitory sensing node 274 may transition to a "sleep" or idle mode.

For example, in the embodiment of FIG. 10, as the transitory sensing node 274 moves upwardly through the wellbore 114, the transitory sensing node 274 may come into signal communication with the logging node 276. In an embodiment, as the transitory sensing node 274 comes into communication with the logging node 276, the logging node 276 or the transitory sensing node 274 may initiate communication (e.g., via an NFC signal) with the other. Upon establishing communication, the transitory sensing node 274 may upload at least a portion of the data stored on the transitory sensing node 274 (e.g., data obtained from the tool nodes 272a, 272b, and/or 272c, data from the wellbore, etc.) to the logging node 276. Additionally, in an embodiment there may be a plurality of logging nodes configured to carry out the functions of the logging node 276, for example, disposed along the wellbore 114 over a given length, for example, so as to allow a greater quantity of data to be exchanged as the transitory sensing node 274 transits upwardly through the wellbore 114.

In an alternative embodiment, for example, in an embodiment where an additional logging node (such as the logging node 276) is absent, the transitory sensing node 274 may be communicated upwardly through the wellbore 114 and removed from the wellbore 114. The data stored on the transitory sensing node 274 may be downloaded to another device, (e.g., a computer or other data processor, a data storage device, a long-range data transmission device, etc.). Alternatively, the data may be stored onto a removable removable device (e.g., a flash drive, a SD card).

In an embodiment, and as will be appreciated by one of skill in the art upon viewing this disclosure, the data obtained via the operation of a wellbore sensing system and/or method, as disclosed herein, may be employed to by a wellbore operator to monitor various portions of the wellbore and/or the subterranean formation, to optimize production from the wellbore and/or the formation, to monitor and/or verify the status of various downhole equipment, or combinations thereof.

While one more examples of systems and/or methods having various components (e.g., tools) communicating via an NFC signal have been disclosed herein, various additional uses of wellbore servicing systems and/or methods are also envisaged and, as such, this disclosure should not be construed so necessarily limited to the embodiments specifically set forth.

In an embodiment, a well tool (e.g., a node), a wellbore servicing system comprising one or more nodes, a wellbore servicing method employing such a wellbore servicing system and/or such a well tool, or combinations thereof may be advantageously employed in the performance of a wellbore servicing operation. In an embodiment, as previously disclosed, employing two or more nodes enables an operator to perform two-way communication (e.g., via one or more NFC signals) between the nodes. For example, each node may be configured to receive one or more NFC signals (e.g., data frame requests) and/or to transmit one or more NFC signals (e.g., data frame responses). Conventional, well tools and/or wellbore servicing systems may not have the ability to perform two-way or peer-to-peer communication between a plurality of well tools. As such, the nodes may be employed to perform two-way communication or peer-to-peer communication, for example, to retrieve data (e.g., transducer data, status information, identification information, etc.) from one or more nodes, to transmit one or more commands (e.g., an actuation signal), to transmit data (e.g., controller data, a software update, a firmware update, etc.), any other suitable wellbore servicing operations via the transmission and/or reception of one or more NFC signal as would be appreciated by one of ordinary skill in the art upon viewing this disclosure, or combinations thereof.

For example, in an embodiment, employing two or more nodes allows an operator to form and employ a network of well tools (e.g., nodes) to perform one or more wellbore servicing operations. As such, a well tool (e.g., a node) may be communicated within a wellbore to perform one or more operations (e.g., measuring data, retrieving data, transmitting data, etc.) in response to the NFC signal communication between the well tool and other downhole well tools (e.g., other nodes). For example, the well tool may perform one or more operations dependent on the data received by one or more other well tools, on the identity of the other well tool in NFC signal communication with the well tool, on the location of the well tool, etc.

ADDITIONAL EMBODIMENTS

A first embodiment, which is a wellbore servicing tool comprising a body, a near field communication (NFC) system disposed within the body and comprising a processor configured to communicate via NFC, one or more antennas each in signal communication with the processor, at least one input/output (I/O) device in signal communication with the processor, and a power supply in electrical communication with the processor.

A second embodiment, which is the tool of the first embodiment, wherein the at least one I/O device comprises an actuator in electrical signal communication with the processor.

A third embodiment, which is the tool of one of the first through the second embodiments, wherein the body comprises a housing comprising one or more ports and generally defining a flow passage.

A fourth embodiment, which is the tool of one of the second through the third embodiments, further comprising a sleeve slidably positioned within the housing and transitional from a first position to a second position, wherein the sleeve is transitioned from the first position to the second position upon actuation of the actuator.

A fifth embodiment, which is the tool of one of the first through the fourth embodiments, wherein the tool is configured to be incorporated with a tubular string.

A sixth embodiment, which is the tool of one of the first through the fourth embodiments, wherein the at least one I/O device comprises a transducer in electrical signal communication with the processor.

A seventh embodiment, which is the tool of the sixth embodiment, wherein the tool is configured to be transitory within a wellbore.

An eighth embodiment, which is the tool of one of the first through the seventh embodiments, wherein the tool is configured to be incorporated with a tubular string.

A ninth embodiment, which is the tool of one of the first through the eighth embodiments, wherein the NFC system is configured to communicate via an active mode, a passive mode, or combinations thereof.

A tenth embodiment, which is the tool of one of the first through the ninth embodiments, wherein the NFC system is configurable between the active mode communication and the passive mode.

An eleventh embodiment, which is a wellbore servicing method comprising positioning a first node within a wellbore, moving a second node through the wellbore such that the second node comes into communication with the first node, wherein the first node and the second node establish signal communication via a near field communication (NFC) signal, wherein data is communicated from the first node to the second node via NFC, from the second node to the first node via NFC, or combinations thereof.

A twelfth embodiment, which is the wellbore servicing method of the eleventh embodiment, wherein the first node is incorporated within a tubular string.

A thirteenth embodiment, which is the wellbore servicing method of the twelfth embodiment, wherein the tubular string further comprises a third node incorporated therein.

A fourteenth embodiment, which is the wellbore servicing method of one of the eleventh through the thirteenth embodiments, wherein the first node comprises a wellbore servicing tool.

A fifteenth embodiment, which is the wellbore servicing method of the fourteenth embodiment, wherein the data is communicated from the second node to the first node, and wherein the data is effective to configure the wellbore servicing tool so as to provide a route of fluid communication between a flowbore of the wellbore servicing tool and a subterranean formation zone.

A sixteenth embodiment, which is the wellbore servicing method of the fifteenth embodiment, further comprising communicating a wellbore servicing fluid via the route of fluid communication.

A seventeenth embodiment, which is the wellbore servicing method of one of the eleventh through the sixteenth embodiments, wherein the first node comprises a sensing tool, wherein the logging tool is configured to monitor at least one wellbore parameter.

An eighteenth embodiment, which is the wellbore servicing method of the seventeenth embodiment, wherein the data is communicated from the second node to the first node, and wherein the data is effective to transition the sensing tool from an inactive mode to an active mode.

A nineteenth embodiment, which is the wellbore servicing method of one of the seventeenth through the eighteenth embodiments, wherein the data is communicated from the first node to the second node, and wherein the data comprises at least one wellbore parameter, wherein the wellbore parameter comprises temperature, pressure, flow rate, flow composition, or combinations thereof.

A twentieth embodiment, which is the wellbore servicing method of one of the eleventh through the nineteenth embodiments, wherein the second node is a ball, a dart, or a wiper.

A twenty-first embodiment, which is a wellbore servicing system comprising a first node disposed within a wellbore, and a logging node configured for movement through the wellbore, wherein the logging node communicates with the first node via a near field communication (NFC) signal.

A twenty-second embodiment, which is the wellbore servicing system of the twenty-first embodiment, wherein the first node comprises a sensor node comprising a transducer.

A twenty-third embodiment, which is the wellbore servicing system of the twenty-second embodiment, wherein the sensor node is configured to monitor at least one wellbore parameter.

A twenty-fourth embodiment, which is the wellbore servicing system of the twenty-third embodiment, wherein the wellbore parameter comprises temperature, pressure, flow rate, or flow composition.

A twenty-fifth embodiment, which is the wellbore servicing system of one of the twenty-first through the twenty-fourth embodiments, wherein the first node comprises a tool node transitionable from a first configuration to a second configuration.

A twenty-sixth embodiment, which is the wellbore servicing system of the twenty-fifth embodiment, wherein the tool node is configured to monitor the tool configuration.

A twenty-seventh embodiment, which is the wellbore servicing system of one of the twenty-fifth through the twenty-sixth embodiments, wherein the tool node comprises a transducer.

A twenty-eighth embodiment, which is the wellbore servicing system of one of the twenty-fifth through the twenty-seventh embodiments, wherein NFC communication between the tool node and the logging node is not enabled when the tool node is in the first configuration, and wherein NFC communication between the tool node and the logging node is enabled when the tool node is in the second configuration.

A twenty-ninth embodiment, which is the wellbore servicing system of one of the twenty-fifth through the twenty eighth embodiments, wherein the tool node comprises, a housing comprising one or more ports and generally defining a flow passage, and a sliding sleeve, wherein the sliding sleeve is movable between a first position relative to the housing and a second position relative to the housing.

A thirtieth embodiment, which is the wellbore servicing system of one of the twenty-first through the twenty-ninth embodiments, wherein the first node is incorporated within a tubular string.

A thirty-first embodiment, which is the wellbore servicing system of one of the twenty-first through the thirtieth embodiments, wherein the logging node is a ball, a dart, or a wiper.

A thirty-second embodiment, which is the wellbore servicing system of one of the twenty-first through the thirtieth embodiments, wherein the logging node is a member attached to a coil-tubing string or a member attached to a wire.

A thirty-third embodiment, which is the wellbore servicing system of one of the twenty-first through the thirty-second embodiments, further comprising a second logging node.

A thirty-fourth embodiment, which is the wellbore servicing system of the thirty-third embodiment, wherein the second logging node is disposed within the wellbore and uphole of the sensing node.

A thirty-fifth embodiment, which is the wellbore servicing system of one of the thirty-third through the thirty-fourth embodiments, wherein the second logging node is positioned exterior to the wellbore.

A thirty-sixth embodiment, which is the wellbore servicing system of one of the twenty-first through the thirty-fifth embodiments, wherein the first node is configured to send information via the NFC signal and to receive information via the NFC signal.

A thirty-seventh embodiment, which is the wellbore servicing system of one of the twenty-first through the thirty-sixth embodiments, wherein the logging node is configured to send information via the NFC signal and to receive information via the NFC signal.

A thirty-eighth embodiment, which is a wellbore servicing method comprising positioning a first node within a wellbore, moving a logging node through the wellbore such that the logging node comes into communication with the first node, wherein the logging node communicates with the first node via a near field communication (NFC) signal, wherein data is transferred from the first node to the logging node via NFC.

A thirty-ninth embodiment, which is the wellbore servicing method of the thirty-eighth embodiment, wherein the first node comprises a sensor node, wherein the sensor node is configured to monitor at least one wellbore parameter.

A fortieth embodiment, which is the wellbore servicing method of one of the thirty-eighth through the thirty-ninth embodiments, wherein the data comprises data associated with at least one wellbore parameter, wherein the wellbore parameter comprises temperature, pressure, flow rate, flow composition, or combinations thereof.

A forty-first embodiment, which is the wellbore servicing method of one of thirty-eighth through the fortieth embodiments, wherein the first node comprises a tool node.

A forty-second embodiment, which is the wellbore servicing method of the forty-first embodiment, wherein the tool node is transitionable from a first configuration to a second configuration.

A forty-third embodiment, which is the wellbore servicing method of one of the forty-first through the forty-second embodiments, wherein the data comprises data associated with the tool node.

A forty-fourth embodiment, which is the wellbore servicing method of the forty-third embodiment, wherein the data associated with the tool node comprises a battery power, an indication of tool configuration, a mode of operation, a history of the operation of the tool node, or combinations thereof.

A forty-fifth embodiment, which is the wellbore servicing method of one of the thirty-eighth through the forty-fourth embodiments, further comprising removing the logging node from the wellbore and downloading at least a portion of the data to another device.

A forty-sixth embodiment, which is the wellbore servicing method of one of the thirty-eighth through the forty-fifth embodiments, further comprising moving the logging node through the wellbore, wherein the logging node comes into communication with a second logging node located uphole from the sensor node, wherein the logging node communicates with the second logging node via NFC, wherein at least a portion of the data is transferred to the second logging node via NFC.

A forty-seventh embodiment, which is the wellbore servicing method of one of the thirty-eighth through the forty-sixth embodiments, further comprising moving the logging node through the wellbore, wherein the logging node comes into communication with a second logging node located uphole from the first node, wherein the logging node communicates with the second logging node via NFC, wherein the logging node transitions from a low-power mode to an active mode in response to communicating with the second logging node.

A forty-eighth embodiment, which is the wellbore servicing method of the forty-seventh embodiment, further comprising retrieving the logging node from the wellbore, wherein the logging node comes into communication with the second logging node, wherein the logging node communicates with the second logging node via NFC, wherein the logging node transitions from the active mode to the low-power mode in response to communicating with the second logging node.

A forty-ninth embodiment, which is a wellbore servicing system comprising one or more wellbore tool nodes disposed within a wellbore, wherein each of the one or more wellbore tool nodes is configurable from a first configuration to a second configuration, and a controller node, wherein the controller node communicates with the wellbore tool node via a near field communication (NFC) signal.

A fiftieth embodiment, which is the wellbore servicing system of the forty-ninth embodiment, wherein the controller node is configured to communicate a signal to the wellbore tool node effective to cause the wellbore tool to output a response, wherein the response comprises an actuating signal.

A fifty-first embodiment, which is the wellbore servicing system of one of the forty-ninth through the fiftieth embodiments, wherein the controller node is configured to communicate a signal to the wellbore tool node effective to cause the wellbore tool node to wake, to sleep, to start a timer, to stop a timer, to increment a counter, to decrement a counter, or combinations thereof.

A fifty-second embodiment, which is the wellbore servicing system of one of the forty-ninth through the fifty-first embodiments, wherein in the first configuration the wellbore tool node does not allow a route of fluid communication from an axial flowbore thereof to an exterior thereof via one or more ports, and wherein in the second configuration the wellbore tool node allows the route of fluid communication from the axial flowbore thereof to the exterior thereof via the one or more ports.

A fifty-third embodiment, which is the wellbore servicing system of the fifty-second embodiment, wherein the wellbore tool node is configurable from the second configuration back to the first configuration.

A fifty-fourth embodiment, which is the wellbore servicing system of one of the fifty-second through the fifty-third embodiments, wherein the wellbore tool node comprises a housing comprising one or more ports and generally defining a flow passage; and a sliding sleeve, wherein the sliding sleeve is movable between a first position relative to the housing and a second position relative to the housing, wherein, when the sliding sleeve is in the first position, the wellbore tool node is in the first configuration and, when the sliding sleeve is in the second position, the wellbore tool node is in the second configuration.

A fifty-fifth embodiment, which is the wellbore servicing system of one of the fifty-second through the fifty-fourth embodiments, wherein the wellbore tool node further comprises an actuator, wherein, when the actuator is actuated, the sliding sleeve is allowed to transition from the first position to the second position.

A fifty-sixth embodiment, which is the wellbore servicing system of one of the fifty-second through the fifty-fifth embodiments, wherein the wellbore tool node is configurable from the second configuration to a third configuration in which the wellbore tool node does not allow a route of fluid communication from an axial flowbore thereof to an exterior thereof via one or more ports.

A fifty-seventh embodiment, which is the wellbore system of one of the forty-ninth through the fifty-sixth embodiments, wherein at least one of the one or more tool nodes comprises a packer, wherein in the first configuration the at least one tool node is unset, and wherein in the second configuration the at least one tool node is set.

A fifty-eighth embodiment, which is the wellbore servicing system of one of the forty-ninth through the fifty-seventh embodiments, further comprising a second controller node, wherein the second controller node is located uphole from the wellbore tool node, wherein the second controller node is configured to communicate a signal to the controller node effective to activate the controller node, to cause the controller node to begin making signal transmissions, to program instructions into the controller node, to deactivate the controller node, to convert the controller node from a passive target to an active initiator, or combinations thereof.

A fifty-ninth embodiment, which is the wellbore servicing system of the fifty-eighth embodiment, wherein the second controller node is incorporated within a casing string or other tubular string disposed within the wellbore.

A sixtieth embodiment, which is the wellbore servicing system of one of the forty-ninth through the fifty-ninth embodiments, wherein the wellbore tool node is further configured to monitor at least one wellbore parameter, to monitor one or more parameters associated with the wellbore tool, or combinations thereof, and wherein the wellbore tool node is also configured to store data related to the at least one wellbore parameter, the one or more parameters associated with the wellbore tool, or combinations thereof.

A sixty-first embodiment, which is the wellbore servicing system of the sixtieth embodiment, wherein the controller node is further configured to obtain at least a portion of the data stored by the wellbore tool node from the wellbore tool node.

A sixty-second embodiment, which is the wellbore servicing system of one of the sixtieth through the sixty-first embodiments, wherein the wellbore parameter comprises temperature, pressure, flow rate, or flow composition.

A sixty-third embodiment, which is the wellbore servicing system of one of the sixtieth through the sixty-second embodiments, wherein one or more parameters associated with the wellbore tool node comprises battery power, configuration, mode of operation, operational history, or actuation status.

A sixty-fourth embodiment, which is the wellbore servicing system of one of the forty-ninth through the sixty-third embodiments, wherein the one or more wellbore tool nodes are configured to send information via the NFC signal and to receive information via the NFC signal.

A sixty-fifth embodiment, which is the wellbore servicing system of one of the forty-ninth through the sixty-fourth embodiments, wherein the controller node is configured to send information via the NFC signal and to receive information via the NFC signal.

A sixty-sixth embodiment, which is a wellbore servicing method comprising positioning one or more wellbore tool nodes within a wellbore, wherein each of the one or more wellbore tool nodes is configurable from a first configuration to a second configuration, moving a controller node through the wellbore, wherein the controller node communicates with at least one of the wellbore tool nodes via a near field communication (NFC) signal, and wherein the controller node communicates a signal to the wellbore tool node effective to cause the wellbore tool node to transition from the first configuration to the second configuration; and communicating a wellbore servicing fluid via the route of fluid communication from the axial flowbore thereof to the exterior thereof via the one or more ports.

A sixty-seventh embodiment, which is the wellbore servicing method of the sixty-sixth embodiment, wherein when moving the controller node through the wellbore, the controller node communicates with a second controller node via NFC.

A sixty-eighth embodiment, which is the wellbore servicing method of the sixty-seventh embodiment, wherein communication between the controller node and the second controller node is effective to activate the controller node, to cause the controller node to begin making signal transmissions, to program instructions into the controller node, to deactivate the controller node, to convert the controller node from a passive target to an active initiator, or combinations thereof.

A sixty-ninth embodiment, which is the wellbore servicing method of one of the sixty-sixth through the sixty-eighth embodiments, wherein the wellbore tool node is further configured to monitor at least one wellbore parameter or one or more parameters associated with the wellbore tool node and the wellbore tool node is configured to store data related to the at least one wellbore parameter or one or more parameters associated with the wellbore tool node.

A seventieth embodiment, which is the wellbore servicing method of the sixty-ninth embodiment, further comprising communicating at least a portion of the data stored by the wellbore tool node to the controller node.

A seventy-first embodiment, which is the wellbore servicing method of one of the sixty-ninth through the seventieth embodiments, further comprising communicating at least a portion of the data stored by the wellbore tool node to a logging node.

A seventy-second embodiment, which is the wellbore servicing method of one of the sixty-ninth through the seventy-first embodiments, wherein the wellbore parameter comprises temperature, pressure, flow rate, or flow direction.

A seventy-third embodiment, which is the wellbore servicing method of one of the sixty-ninth through the seventy-second embodiments, wherein one or more parameters associated with the wellbore tool node comprises battery power, configuration, mode of operation, operational history, or actuation status.

A seventy-fourth embodiment, which is the wellbore servicing method of one of the sixty-sixth through the seventy-third embodiments, wherein in the first configuration the wellbore tool node does not allow a route of fluid communication from an axial flowbore thereof to an exterior thereof via one or more ports, and wherein in the second configuration the wellbore tool node allows the route of fluid communication form the axial flowbore thereof to the exterior thereof via the one or more ports.

A seventy-fifth embodiment, which is the wellbore servicing method of one of the sixty-sixth through the seventy-fourth embodiments, wherein at least one of the one or more tool nodes comprises a packer, wherein in the first configuration the at least one tool node is unset, and wherein in the second configuration the at least one tool node is set.

A seventy-sixth embodiment, which is a wellbore servicing system comprising two or more sensing, tool nodes, wherein each of the sensing, tool nodes are configured to selectively allow, disallow, or alter a route of fluid communication between an axial flowbore thereof and an exterior thereof via one or more ports, and wherein each of the sensing, tool nodes are further configured to monitor at least one parameter; and a logging controller node wherein the logging controller node communicates with the sensing, tool nodes via a near field communication (NFC) signal.

A seventy-seventh embodiment, which is the wellbore servicing system of the seventy-sixth embodiment, wherein the two or more sensing, tool nodes are incorporated within a production string disposed within the wellbore.

A seventy-eighth embodiment, which is the wellbore servicing system of one of the seventy-sixth through the seventy-seventh embodiments, wherein the wellbore servicing system is utilized to optimize production from the wellbore.

A seventy-ninth embodiment, which is the wellbore servicing system of one of the seventy-sixth through the seventy-eighth embodiments, wherein the at least one parameter comprises temperature, pressure, flow rate, flow composition, or combinations thereof.

An eightieth embodiment, which is the wellbore servicing system of one of the seventy-sixth through the seventy-ninth embodiments, wherein the at least one parameter comprises one or more parameters associated with the sensing, tool nodes.

An eighty-first embodiment, which is the wellbore servicing system of the eightieth embodiment, wherein the one or more parameters associated with the sensing, tool node comprises battery power, configuration, mode of operation, operational history, or actuation status.

An eighty-second embodiment, which is the wellbore servicing system of one of the seventy-sixth through the eighty-first embodiments, further comprising a second logging controller node, wherein the second logging controller node is disposed within the wellbore and uphole of the sensing, tool nodes.

An eighty-third embodiment, which is the wellbore servicing system of one of the seventy-sixth through the eighty-second embodiments, wherein each of the sensing, tool nodes comprises a housing comprising one or more ports and generally defining a flow passage, and a sliding sleeve, wherein the sliding sleeve is movable relative to the housing.

An eighty-fourth embodiment, which is the wellbore servicing system of the eighty-third embodiment, wherein movement of the sliding sleeve relative to the housing is effective to allow fluid communication via the one or more ports, to disallow fluid communication via the one or more ports, to increase fluid communication via the one or more ports, to decrease fluid communication via the one or more ports, or combinations thereof.

An eighty-fifth embodiment, which is the wellbore servicing system of one of the seventy-sixth through the eighty-fourth embodiments, further comprising a production packer, wherein the production packer communicates with the logging controller node via an NFC signal.

An eighty-sixth embodiment, which is the wellbore servicing system of one of the seventy-sixth through the eighty-fifth embodiments, wherein the two or more sensing, tool nodes are configured to send information via the NFC signal and to receive information via the NFC signal.

An eighty-seventh embodiment, which is the wellbore servicing system of one of the seventy-sixth through the eighty-sixth embodiments, wherein the logging controller node is configured to send information via the NFC signal and to receive information via the NFC signal.

An eighty-eighth embodiment, which is a wellbore servicing method comprising positioning two or more sensing, tool nodes within a wellbore, and wherein each of the sensing, tool nodes are configured to selectively allow, disallow, or alter a route of fluid communication between an axial flowbore thereof and an exterior thereof via one or more ports, and wherein each of the sensing, tool nodes are further configured to monitor at least one wellbore parameter, moving a logging controller node through the wellbore such that the logging controller node comes into communication with the sensing, tool nodes, wherein the controller node communicates with the sensing, tool nodes via a near field communication (NFC) signal, wherein data associated with the at least one wellbore parameter is transferred from the sensing, tool node to the logging controller node via an NFC signal, and wherein one or more commands are transferred from the logging controller node to the sensing, tool node via an NFC signal.

An eighty-ninth embodiment, which is the wellbore servicing method of the eighty-eighth embodiment, wherein each of the sensing, tool nodes is configured to allow, disallow, or alter the route of fluid communication based on data received from the logging controller node, wherein the data received from the logging controller node comprises data associated with a wellbore parameter collected by another sensing, tool node.

A ninetieth embodiment, which is the wellbore servicing method of one of the eighty-eighth through the eighty-ninth embodiments, wherein each of the sensing, tool nodes is configured to allow, disallow, or alter the route of fluid communication based on a command received from the logging controller node, wherein the command received from the logging controller node was communicated to the logging controller node by another logging controller node.

A ninety-first embodiment, which is the wellbore servicing method of one of the eighty-eighth through the ninetieth embodiments, wherein when moving the logging controller node through the wellbore, a second logging controller node communicates one or more commands to the logging controller node, wherein the commands include instructions regarding the configuration of one or more of the sensing, tool nodes.

A ninety-second embodiment, which is the wellbore servicing method of one of the eighty-eighth through the ninety-first embodiments, wherein the wellbore parameter comprises temperature, pressure, flow rate, or flow composition.

A ninety-third embodiment, which is the wellbore servicing method of one of the eighty-eighth through the ninety-second embodiments, wherein the wellbore parameter comprises one or more parameters associated with the sensing, tool nodes.

A ninety-fourth embodiment, which is the wellbore servicing method of the ninety-third embodiment, wherein the one or more parameters associated with the sensing, tool nodes comprises battery power, configuration, mode of operation, operational history, or actuation status.

A ninety-fifth embodiment, which is the wellbore servicing method of one of the eighty-eighth through the ninety-fourth embodiments, wherein when moving the logging controller node through the wellbore, a production packer receives one or more commands from the logging controller node, wherein the one or more commands comprise instructions effective to actuate the production packer.

A ninety-sixth embodiment, which is a wellbore servicing system comprising a controller node disposed within a wellbore, and a tool node configured for movement through the wellbore, wherein the tool node communicates with the controller node via a near field communication (NFC) signal, wherein prior to communication with the controller node, the tool node will not perform at least one function and, after communication with the controller node, the tool node will selectively perform the at least one function.

A ninety-seventh embodiment, which is the wellbore servicing system of the ninety-sixth embodiment, wherein the tool node is configured to perforate a portion of a wellbore or a tubular string.

A ninety-eighth embodiment, which is the wellbore servicing system of one of the ninety-sixth through the ninety-seventh embodiments, wherein the tool node comprises a perforating gun.

A ninety-ninth embodiment, which is the wellbore servicing system of the ninety-eighth embodiment, wherein the perforating gun comprises a selectively detonatable explosive charge.

A one-hundredth embodiment, which is the wellbore servicing system of the ninety-ninth embodiment, wherein, prior to communication with the controller node, the explosive charge cannot be detonated and, after communication with the controller node, the explosive charge can be detonated.

A one-hundred and first embodiment, which is the wellbore servicing system of one of the ninety-sixth through the one-hundredth embodiments, wherein the controller node is incorporated within a tubular string in the wellbore.

A one-hundred and second embodiment, which is the wellbore servicing system of one of the ninety-sixth through the one-hundred and first embodiments, wherein the controller node is configured to communicate an arm command or a disarm command to the tool node.

A one-hundred and third embodiment, which is the wellbore servicing system of one of the ninety-sixth through the one-hundred and second embodiments, wherein the tool node is a member attached to a coil-tubing string or a member attached to a wire.

A one-hundred and fourth embodiment, which is the wellbore servicing system of one of the ninety-sixth through the one hundred and third embodiments, further comprising one or more additional controller nodes disposed within the wellbore.

A one-hundred and fifth embodiment, which is the wellbore servicing system of the one-hundred and fourth embodiment, wherein each controller node is configured to communicate with only a particular tool node.

A one-hundred and sixth embodiment, which is the wellbore servicing system of one of the ninety-sixth through the one-hundred and fifth embodiments, wherein the controller node is configured to send information via the NFC signal and to receive information via the NFC signal.

A one-hundred and seventh embodiment, which is the wellbore servicing system of one of the ninety-sixth through the one-hundred and sixth embodiments, wherein the tool node is configured to send information via the NFC signal and to receive information via the NFC signal.

A one-hundred and eighth embodiment, which is a wellbore servicing method comprising positioning a controller node within a wellbore, and moving a tool node through the wellbore such that the tool node comes into communication with the controller node, wherein the tool node communicates with the controller node via a near field communication (NFC) signal, wherein prior to communication with the controller node, the tool node will not perform at least one function and, after communication with the controller node, the tool node will selectively perform the at least one function.

A one-hundred and ninth embodiment, which is the wellbore servicing method of the one-hundred and eighth embodiment, wherein the controller node communicates one or more commands to the tool node.

A one-hundred and tenth embodiment, which is the wellbore servicing method of the one-hundred and ninth embodiment, wherein one of the one or more commands comprises an arm command.

A one-hundred and eleventh embodiment, which is the wellbore servicing method of one of the one-hundred and ninth through the one-hundred and tenth embodiments, wherein one of the one or more commands comprises a disarm command.

A one-hundred and twelfth embodiment, which is the wellbore servicing method of one of the one-hundred and eighth through the one-hundred and eleventh embodiments, wherein the tool node transitions from a disarmed configuration to an armed configuration in response to the one or more commands from the controller node.

A one-hundred and thirteenth embodiment, which is the wellbore servicing method of the one-hundred and twelfth embodiment, wherein the tool node transitions from the armed configuration to the disarmed configuration in response to an additional one or more commands from a second controller node within the wellbore.

A one-hundred and fourteenth embodiment, which is the wellbore servicing method of one of the one-hundred and eighth through the one-hundred and thirteenth embodiments, wherein the tool node comprises a perforating gun comprising a selectively detonatable explosive charge.

A one-hundred and fifteenth embodiment, which is the wellbore servicing method of the one-hundred and fourteenth embodiment, wherein, prior to communication with the controller node, the explosive charge cannot be detonated and, after communication with the controller node, the explosive charge can be detonated.

A one-hundred and sixteenth embodiment, which is the wellbore servicing method of the one-hundred and fifteenth embodiment, further comprising positioning the perforating gun proximate to a portion of the wellbore and/or a tubular string into which one or more perforations are to be introduced.

A one-hundred and seventeenth embodiment, which is the wellbore servicing method of the one-hundred and sixteenth embodiment, further comprising causing the explosive charge to detonate.

A one-hundred and eighteenth embodiment, which is the wellbore servicing method of one of the one-hundred and sixteenth through the one-hundred and seventeenth embodiments, wherein the controller node is positioned within the wellbore proximate to a portion of the wellbore and/or a tubular string into which one or more perforations are to be introduced.

A one-hundred and nineteenth embodiment, which is a wellbore servicing system comprising one or more tool nodes disposed within a wellbore, and a transitory sensing node configured to be communicated through at least a portion of the wellbore, wherein the transitory sensing node is configured to measure at least one wellbore parameter, and wherein the transitory sensing node communicates with the one or more tool nodes via a near field communication (NFC) signal.

A one-hundred and twentieth embodiment, which is the wellbore servicing system of the one-hundred and nineteenth embodiment, wherein the transitory sensing node is a ball or dart.

A one-hundred and twenty-first embodiment, which is the wellbore servicing system of one of the one-hundred and nineteenth through the one-hundred and twentieth embodiments, wherein the wellbore parameter comprises temperature, pressure, flow rate, or flow direction.

A one-hundred and twenty-second embodiment, which is the wellbore servicing system of one of the one-hundred and nineteenth through the one-hundred and twenty-first embodiments, where communication between the one or more tool nodes and the transitory sensing node is effective to orient the transitory sensing node within the wellbore.

A one-hundred and twenty-third embodiment, which is the wellbore servicing system of one of the one-hundred and nineteenth through the one-hundred and twenty-second embodiments, further comprising a logging node.

A one-hundred and twenty-fourth embodiment, which is the wellbore servicing system of the one-hundred twenty-third embodiment, wherein the logging node is disposed within the wellbore and uphole of at least one of the one or more tool nodes.

A one-hundred and twenty-fifth embodiment, which is the wellbore servicing system of one of the one-hundred and twenty-third through the one-hundred and twenty-fourth embodiments, wherein the logging node is positioned exterior to the wellbore.

A one-hundred and twenty-sixth embodiment, which is the wellbore servicing system of one of the one-hundred and nineteenth through the one-hundred and twenty-fifth embodiments, wherein the one or more tool nodes are configured to send information via the NFC signal and to receive information via the NFC signal.

A one-hundred and twenty-seventh embodiment, which is the wellbore servicing system of one of the one-hundred and nineteenth through the one-hundred and twenty-sixth embodiments, wherein the transitory sensing node is configured to send information via the NFC signal and to receive information via the NFC signal.

A one-hundred and twenty-eighth embodiment, which is a wellbore servicing method comprising positioning one or more tool nodes within a wellbore, moving a transitory sensing node through the wellbore such that the transitory sensing node comes into communication with at least one of the one or more tool nodes, wherein the transitory sensing node is configured to measure at least one wellbore parameter during movement through at least a portion of the wellbore, and wherein the transitory sensing node communicates with at least one of the one or more tool nodes via a near field communication (NFC) signal.

A one-hundred and twenty-ninth embodiment, which is the wellbore servicing system of the one-hundred and twenty-eighth embodiment, where communication between at least one of the one or more tool nodes and the transitory sensing node is effective to orient the transitory sensing node within the wellbore.

A one-hundred and thirtieth embodiment, which is the wellbore servicing method of one of the one-hundred and twenty-eighth through the one-hundred and twenty-ninth embodiments, further comprising removing the transitory sensing node from the wellbore and downloading the data associated with the at least one wellbore parameter to another device.

A one-hundred and thirty-first embodiment, which is the wellbore servicing method of one of the one-hundred and twenty-eighth through the one-hundred and thirtieth embodiments, further comprising moving the transitory sensing node through the wellbore, wherein the transitory sensing node comes into communication with a logging node located uphole from at least one of the one or more tool nodes, wherein the transitory sensing node communicates with the logging node via NFC, wherein at least a portion of the data associated with the at least one wellbore parameter is transferred to the logging node via NFC.

A one-hundred and thirty-second embodiment, which is the wellbore servicing method of one of the one-hundred and twenty-eighth through the one-hundred and thirty-first embodiments, further comprising moving the transitory sensing node through the wellbore, wherein the transitory sensing node comes into communication with a logging node located uphole from at least one of the one or more tool nodes, wherein the transitory sensing node communicates with the logging node via NFC, wherein the transitory sensing node transitions from a low-power mode to an active mode in response to communicating with the logging node.

A one-hundred and thirty-third embodiment, which is the wellbore servicing method of the one-hundred and thirty-second embodiment, further comprising retrieving the transitory sensing node from the wellbore, wherein the transitory sensing node comes into communication with the logging node, wherein the transitory sensing node communicates with the logging node via NFC, wherein the transitory sensing node transitions from the active mode to the low-power mode in response to communicating with the logging node.

A one-hundred and thirty-fourth embodiment, which is the wellbore servicing method of one of the one-hundred and twenty-eighth through the one-hundred and thirty-third embodiments, wherein the wellbore parameter comprises temperature, pressure, flow rate, or flow direction.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A wellbore servicing system comprising:
   two sensing, tool nodes,
     wherein each of the sensing, tool nodes is configured to selectively allow, disallow, or alter a route of fluid communication between an axial flowbore thereof and an exterior thereof via a port, and
     wherein each of the sensing, tool nodes is further configured to monitor a wellbore parameter; and
   a logging controller node wherein the logging controller node communicates with each of the sensing, tool nodes via a near field communication (NFC) signal,
     wherein the logging controller node is configured to communicate information sent from a first sensing tool node of the sensing, tool nodes to a second sensing tool node of the sensing, tool nodes, wherein the information is based on data received from at least one of the second sensing tool node and the logging controller node.

2. The wellbore servicing system of claim 1, wherein the sensing, tool nodes are incorporated within a production string disposed within the wellbore.

3. The wellbore servicing system of claim 1, the wellbore parameter comprises any one of: temperature, pressure, flow rate, flow composition, and combinations thereof.

4. The wellbore servicing system of claim 1, wherein the sensing, tool nodes are each configured to monitor a parameter associated with the sensing, tool nodes.

5. The well bore servicing system of claim 4, wherein the parameter associated with the sensing, tool nodes comprises any one of: battery power, configuration, mode of operation, operational history, and actuation status.

6. The well bore servicing system of claim 1, further comprising a second logging controller node, wherein the second logging controller node is disposed within the wellbore and uphole of the sensing, tool nodes.

7. The wellbore servicing system of claim 1, wherein each of the sensing, tool nodes comprises:
   a housing comprising said port and generally defining a flow passage; and
   a sliding sleeve, wherein the sliding sleeve is movable relative to the housing.

8. The wellbore servicing system of claim 7, wherein movement of the sliding sleeve relative to the housing is effective to allow fluid communication via the port, to disallow fluid communication via the port, to increase fluid communication via the port, to decrease fluid communication via the port, or combinations thereof.

9. The wellbore servicing system of claim 1, further comprising a production packer, wherein the production packer communicates with the logging controller node via an NFC signal.

10. The wellbore servicing system of claim 1, wherein the sensing, tool nodes are configured to send information via the NFC signal and to receive information via the NFC signal.

11. The wellbore servicing system of claim 1, wherein the logging controller node is configured to send information via the NFC signal and to receive information via the NFC signal.

12. A well bore servicing method comprising:
   positioning two sensing, tool nodes within a wellbore, and
     wherein each of the sensing, tool nodes are configured to selectively allow, disallow, or alter a route of fluid communication between an axial flowbore thereof and an exterior thereof via a port; and
     wherein each of the sensing, tool nodes are further configured to monitor a wellbore parameter;
   moving a first logging controller node through the wellbore such that the first logging controller node comes into communication with a first sensing, tool node,
     wherein the first logging controller node communicates with the first sensing, tool node via a near field communication (NFC) signal;
     wherein data associated with the wellbore parameter is transferred from the first sensing, tool node to the first logging controller node via an NFC signal; and
     wherein one or more commands are transferred from the first logging controller node to the first sensing, tool node via an NFC signal, wherein the one or more commands are based on data received from at least one of a second sensing, tool node and a second logging controller node.

13. The wellbore servicing method of claim 12, wherein each of the sensing, tool nodes is configured to allow, disallow, or alter the route of fluid communication based on data received from the first logging controller node, wherein the data received from the first logging controller node comprises data associated with a wellbore parameter collected by the second sensing, tool node.

14. The wellbore servicing method of claim 12, wherein each of the sensing, tool nodes is configured to allow, disallow, or alter the route of fluid communication based on a command received from the first logging controller node, wherein the command received from the first logging controller node was communicated to the first logging controller node by the second logging controller node.

15. The wellbore servicing method of claim 12, wherein when moving the first logging controller node through the wellbore, a second logging controller node communicates one or more commands to the first logging controller node, wherein the commands include instructions regarding the configuration of one or more of the sensing, tool nodes.

16. The wellbore servicing method of claim 12, wherein the wellbore parameter comprises one of: temperature, pressure, flow rate, and flow composition.

17. The well bore servicing method of claim 12, wherein the sensing, tool nodes are each further configured to monitor a parameter associated with the sensing, tool nodes.

18. The wellbore servicing method of claim 17, wherein the parameter associated with the sensing, tool nodes comprises any one of: battery power, configuration, mode of operation, operational history, and actuation status.

19. The wellbore servicing method of claim 12, wherein when moving the first logging controller node through the wellbore, a production packer receives a command from the first logging controller node, wherein the command comprises instructions effective to actuate the production packer.

* * * * *